(12) United States Patent
Goldring et al.

(10) Patent No.: US 11,067,443 B2
(45) Date of Patent: Jul. 20, 2021

(54) SPECTROMETRY SYSTEM WITH VISIBLE AIMING BEAM

(71) Applicant: VERIFOOD, LTD., Herzliya (IL)

(72) Inventors: Damian Goldring, Tel Aviv (IL); Dror Sharon, Benei Atarot (IL); Sagee Rosen, Netzer Sireni (IL); Ittai Nir, Tel Aviv (IL); Uri Kinrot, Hod HaSharon (IL); Omer Keilaf, Kfar Saba (IL); Guy Brodetzki, Rehovot (IL); Amir Levy, Tel Aviv (IL); Elad Heiman, Tel Aviv (IL); Idan Bakish, Petah-Tikva (IL)

(73) Assignee: VERIFOOD, LTD., Herzliya (IL)

( * ) Notice: Subject to any disclaimer, the term of this patent is extended or adjusted under 35 U.S.C. 154(b) by 0 days.

(21) Appl. No.: 16/450,695

(22) Filed: Jun. 24, 2019

(65) Prior Publication Data

US 2020/0049555 A1  Feb. 13, 2020

Related U.S. Application Data

(63) Continuation of application No. 15/667,360, filed on Aug. 2, 2017, now abandoned, which is a
(Continued)

(51) Int. Cl.
*G01J 3/10* (2006.01)
*G01J 3/02* (2006.01)
*G01J 3/28* (2006.01)

(52) U.S. Cl.
CPC ........... *G01J 3/0289* (2013.01); *G01J 3/0205* (2013.01); *G01J 3/0208* (2013.01); *G01J 3/0229* (2013.01);
(Continued)

(58) Field of Classification Search
CPC ............................. G01J 3/0291; G01J 3/2803
See application file for complete search history.

(56) References Cited

U.S. PATENT DOCUMENTS

| 679,577 A | 7/1901 | Schaffner |
| 4,145,131 A * | 3/1979 | Yevick .................. G02B 27/06 |
| | | 359/628 |

(Continued)

FOREIGN PATENT DOCUMENTS

| CN | 1437702 A | 8/2003 |
| CN | 1846114 A | 10/2006 |

(Continued)

OTHER PUBLICATIONS

Co-pending U.S. Appl. No. 15/857,283, filed Dec. 28, 2017.
(Continued)

*Primary Examiner* — Maurice C Smith
(74) *Attorney, Agent, or Firm* — Wilson Sonsini Goodrich & Rosati

(57) ABSTRACT

A handheld spectrometer can be configured with a visible aiming beam to allow the user to determine the measured region of the object. When the visible aiming beam comprises the spectrometer measurement beam, the spectrometer measurement beam comprises sufficient energy for the user to see the measurement beam illuminating the object. When the visible aiming beam comprises a separate beam, the visible aiming beam comprises sufficient energy for the user to see a portion of the aiming beam reflected from the object. The visible aiming beam and measurement beam can be arranged to at least partially overlap on the sample, such that the user has an indication of the area of the sample being measured.

15 Claims, 36 Drawing Sheets

Related U.S. Application Data continuation of application No. PCT/IL2016/050130, filed on Feb. 4, 2016.

(60) Provisional application No. 62/277,558, filed on Jan. 12, 2016, provisional application No. 62/258,341, filed on Nov. 20, 2015, provisional application No. 62/190,524, filed on Jul. 9, 2015, provisional application No. 62/161,728, filed on May 14, 2015, provisional application No. 62/154,585, filed on Apr. 29, 2015, provisional application No. 62/112,553, filed on Feb. 5, 2015.

(52) U.S. Cl.
CPC ........... G01J 3/0272 (2013.01); G01J 3/0291 (2013.01); G01J 3/10 (2013.01); G01J 3/2803 (2013.01); *G01J 2003/2806* (2013.01); *G01N 2201/0221* (2013.01)

(56) References Cited

U.S. PATENT DOCUMENTS

| | | |
|---|---|---|
| 4,884,860 A | 12/1989 | Brown |
| 5,059,795 A | 10/1991 | Izumi |
| 5,469,252 A | 11/1995 | Doles et al. |
| 5,966,212 A | 10/1999 | Hendler et al. |
| 6,031,233 A | 2/2000 | Levin et al. |
| 6,031,619 A | 2/2000 | Wilkens et al. |
| 6,069,696 A | 5/2000 | McQueen et al. |
| 6,072,576 A | 6/2000 | McDonald et al. |
| 6,212,312 B1 | 4/2001 | Grann et al. |
| 6,333,501 B1 | 12/2001 | Labrenz |
| 6,437,345 B1 | 8/2002 | Bruno-Raimondi et al. |
| 6,441,375 B1 | 8/2002 | Joseph et al. |
| 6,456,373 B1 | 9/2002 | Wienecke et al. |
| 6,483,583 B1 | 11/2002 | Wright et al. |
| 6,555,597 B1 | 4/2003 | Weikard et al. |
| 6,615,142 B1 | 9/2003 | Hovde |
| 6,639,666 B2 | 10/2003 | Li |
| 6,700,661 B1 | 3/2004 | Cadell et al. |
| 6,717,669 B2 | 4/2004 | Ruiz |
| 6,836,325 B2 | 12/2004 | Maczura et al. |
| 6,864,978 B1 | 3/2005 | Hazen et al. |
| 6,958,479 B2 | 10/2005 | Burling-Claridge et al. |
| 7,009,702 B2 | 3/2006 | Caruso et al. |
| 7,038,774 B2 | 5/2006 | Hazen et al. |
| 7,068,366 B2 | 6/2006 | Burk et al. |
| 7,075,643 B2 | 7/2006 | Holub |
| 7,084,974 B1 | 8/2006 | Barwicz et al. |
| 7,145,650 B2 | 12/2006 | Wang et al. |
| 7,151,600 B2 | 12/2006 | Imura |
| 7,158,225 B2 | 1/2007 | Tedesco et al. |
| 7,235,766 B2 | 6/2007 | Shur et al. |
| 7,236,243 B2 | 6/2007 | Beecroft et al. |
| 7,245,372 B2 | 7/2007 | Han |
| 7,248,370 B2 | 7/2007 | Jones |
| 7,251,037 B2 | 7/2007 | Jones |
| 7,262,839 B2 | 8/2007 | Treado et al. |
| 7,286,233 B2 | 10/2007 | Pizzi |
| 7,339,665 B2 | 3/2008 | Imura |
| 7,414,724 B2 | 8/2008 | Eckert et al. |
| 7,420,663 B2 | 9/2008 | Wang et al. |
| 7,426,446 B2 | 9/2008 | Hagler |
| 7,433,042 B1 | 10/2008 | Cavanaugh et al. |
| 7,436,511 B2 | 10/2008 | Ruchti et al. |
| 7,489,396 B1 | 2/2009 | Vrhel et al. |
| 7,528,957 B2 | 5/2009 | Lewis et al. |
| 7,535,617 B2 | 5/2009 | Gupta et al. |
| 7,649,627 B2 | 1/2010 | Yamamoto |
| 7,667,740 B2 | 2/2010 | Hofer |
| 7,697,136 B2 | 4/2010 | Imura |
| 7,767,969 B2 | 8/2010 | Nagai et al. |
| 7,805,319 B2 | 9/2010 | Badinelli |
| 7,817,273 B2 | 10/2010 | Bahatt et al. |
| 7,868,296 B2 | 1/2011 | Haran et al. |
| 7,876,435 B2 | 1/2011 | Becker-Ross et al. |
| 7,881,892 B2 | 2/2011 | Soyemi et al. |
| 7,897,923 B2 | 3/2011 | Shelley et al. |
| 7,907,282 B2 | 3/2011 | Coates |
| 7,929,130 B2 | 4/2011 | Dirk |
| 7,986,193 B2 | 7/2011 | Krah |
| 7,999,933 B2 | 8/2011 | McClure |
| 8,027,041 B1 | 9/2011 | Mitchell et al. |
| 8,060,383 B2 | 11/2011 | Badinelli |
| 8,125,633 B2 | 2/2012 | Whelan et al. |
| 8,144,322 B2 | 3/2012 | Nagashima et al. |
| 8,149,415 B2 | 4/2012 | Sanders et al. |
| 8,169,607 B2 | 5/2012 | Sano et al. |
| 8,169,608 B2 | 5/2012 | Sano et al. |
| 8,247,774 B2 | 8/2012 | Chou et al. |
| 8,269,174 B2 | 9/2012 | Gardner, Jr. et al. |
| 8,274,739 B2 | 9/2012 | Lee et al. |
| 8,284,401 B2 | 10/2012 | Choi et al. |
| 8,330,945 B2 | 12/2012 | Choi et al. |
| 8,462,420 B2 | 6/2013 | Lee et al. |
| 8,477,305 B2 | 7/2013 | Shibayama et al. |
| 8,526,002 B2 | 9/2013 | Deflores et al. |
| 8,542,359 B2 | 9/2013 | Choi, II et al. |
| 8,593,628 B2 | 11/2013 | Shimbo et al. |
| 8,604,412 B2 | 12/2013 | Shibayama et al. |
| 8,654,327 B2 | 2/2014 | Bohle et al. |
| 8,665,440 B1 * | 3/2014 | Kompaniets .......... G01N 21/31 356/402 |
| 8,675,188 B2 | 3/2014 | Liu et al. |
| 8,711,360 B2 | 4/2014 | Funamoto |
| 8,711,362 B2 | 4/2014 | Funamoto |
| 8,735,820 B2 | 5/2014 | Mertens |
| 8,742,320 B2 | 6/2014 | Shibayama et al. |
| 8,760,645 B2 | 6/2014 | Misener et al. |
| 8,773,659 B2 | 7/2014 | McClure |
| 8,786,854 B2 | 7/2014 | Miyazono |
| 8,848,187 B2 | 9/2014 | Uematsu et al. |
| 8,862,445 B2 | 10/2014 | Priore et al. |
| 8,867,033 B2 | 10/2014 | Carron et al. |
| 8,868,387 B2 | 10/2014 | Den Boef et al. |
| 8,873,046 B2 | 10/2014 | Miyazono |
| 8,937,717 B2 | 1/2015 | Preston et al. |
| 8,976,357 B2 | 3/2015 | Uematsu et al. |
| 9,030,662 B2 | 5/2015 | Lee et al. |
| 9,060,113 B2 | 6/2015 | Rhoads et al. |
| 9,063,011 B2 | 6/2015 | Chen et al. |
| 9,074,933 B2 | 7/2015 | Yokino et al. |
| 9,128,055 B2 | 9/2015 | Sekino et al. |
| 9,163,986 B2 | 10/2015 | Bouckaert |
| 9,173,508 B2 | 11/2015 | Tornwall et al. |
| 9,182,280 B1 | 11/2015 | Gardner et al. |
| 9,234,800 B2 | 1/2016 | Kawamata et al. |
| 9,239,264 B1 | 1/2016 | Demers |
| D750,988 S | 3/2016 | Damian |
| D751,435 S | 3/2016 | Damian |
| 9,291,504 B2 | 3/2016 | Goldring et al. |
| 9,297,821 B2 | 3/2016 | Walter et al. |
| 9,301,626 B2 | 4/2016 | Tornwall et al. |
| 9,310,564 B2 | 4/2016 | Martinelli et al. |
| 9,377,396 B2 | 6/2016 | Goldring et al. |
| 9,383,258 B2 | 7/2016 | Goldring et al. |
| 9,383,308 B2 | 7/2016 | Bradley et al. |
| 9,395,244 B2 | 7/2016 | Kurokawa et al. |
| 9,417,180 B2 | 8/2016 | Seo et al. |
| 9,448,114 B2 | 9/2016 | Goldring et al. |
| 9,448,165 B2 | 9/2016 | Gulati et al. |
| 9,453,794 B2 | 9/2016 | Gulati et al. |
| 9,464,934 B2 | 10/2016 | Priore et al. |
| 9,488,468 B2 | 11/2016 | Tsujii et al. |
| 9,488,523 B2 | 11/2016 | Yokino et al. |
| 9,500,523 B2 | 11/2016 | Golring et al. |
| 9,508,765 B2 | 11/2016 | Owa et al. |
| 9,518,917 B2 | 12/2016 | Scherer et al. |
| 9,546,902 B2 | 1/2017 | Kovacich et al. |
| 9,546,904 B2 | 1/2017 | Pawluczyk et al. |
| 9,557,220 B2 | 1/2017 | Yasui et al. |
| 9,562,848 B2 | 2/2017 | Goldring et al. |
| 9,568,363 B2 | 2/2017 | Yu et al. |

(56) References Cited

U.S. PATENT DOCUMENTS

| | | |
|---|---|---|
| 9,574,942 B2 | 2/2017 | Goldring et al. |
| 9,587,982 B2 | 3/2017 | Goldring et al. |
| 9,933,305 B2 | 4/2018 | Goldring et al. |
| 9,952,098 B2 | 4/2018 | Goldring et al. |
| 10,203,246 B2 | 2/2019 | Rosen et al. |
| 10,254,215 B2 | 4/2019 | Wilk et al. |
| 10,323,982 B2 | 6/2019 | Goldring et al. |
| 10,330,531 B2 | 6/2019 | Goldring et al. |
| 10,502,679 B2 | 12/2019 | Aphek |
| 2001/0009972 A1 | 7/2001 | Doi et al. |
| 2002/0039186 A1 | 4/2002 | Rosenberg et al. |
| 2002/0131044 A1 | 9/2002 | Kobayashi et al. |
| 2002/0131047 A1 | 9/2002 | Zarrabian et al. |
| 2002/0145728 A1 | 10/2002 | Adams et al. |
| 2002/0163641 A1 | 11/2002 | Shroder |
| 2002/0191127 A1 | 12/2002 | Roberts et al. |
| 2002/0193671 A1 | 12/2002 | Ciurczak et al. |
| 2003/0122080 A1 | 7/2003 | Burling-Claridge et al. |
| 2004/0019462 A1 | 1/2004 | Gehrlein et al. |
| 2004/0136577 A1 | 7/2004 | Rao et al. |
| 2004/0213459 A1 | 10/2004 | Ishimaru et al. |
| 2005/0037505 A1 | 2/2005 | Samsoondar |
| 2005/0117151 A1 | 6/2005 | Han |
| 2005/0128477 A1 | 6/2005 | Caruso et al. |
| 2005/0149598 A1 | 7/2005 | Mendlovic et al. |
| 2005/0151975 A1 | 7/2005 | Melnyk |
| 2005/0196046 A1 | 9/2005 | Hudnut et al. |
| 2005/0248758 A1 | 11/2005 | Carron et al. |
| 2006/0086901 A1 | 4/2006 | Price et al. |
| 2006/0124656 A1 | 6/2006 | Popovich, Jr. et al. |
| 2006/0132760 A1 | 6/2006 | Imura |
| 2006/0146315 A1 | 7/2006 | Treado |
| 2006/0279732 A1 | 12/2006 | Wang et al. |
| 2006/0280096 A1 | 12/2006 | Riley et al. |
| 2007/0230932 A1 | 10/2007 | Tanaka et al. |
| 2007/0236697 A1 | 10/2007 | Zribi et al. |
| 2008/0061236 A1 | 3/2008 | Meredith et al. |
| 2008/0073510 A1 | 3/2008 | Finlay |
| 2008/0112853 A1 | 5/2008 | Hall |
| 2008/0137328 A1 | 6/2008 | Lee et al. |
| 2008/0151241 A1 | 6/2008 | Lindfors et al. |
| 2008/0204578 A1 | 8/2008 | Scheuch et al. |
| 2008/0265146 A1 | 10/2008 | Coates |
| 2008/0277625 A1 | 11/2008 | Nakamura et al. |
| 2008/0297379 A1 | 12/2008 | Yang et al. |
| 2008/0297791 A1 | 12/2008 | Imura |
| 2008/0316323 A1* | 12/2008 | Morita .............. A61B 5/1172 348/222.1 |
| 2009/0051910 A1 | 2/2009 | Imura |
| 2009/0201577 A1 | 8/2009 | Laplante et al. |
| 2009/0213361 A1 | 8/2009 | Vander Rhodes et al. |
| 2009/0294637 A1 | 12/2009 | Kusano et al. |
| 2010/0045616 A1 | 2/2010 | Li et al. |
| 2010/0078564 A1 | 4/2010 | McAllister et al. |
| 2010/0080351 A1 | 4/2010 | Hession-Kunz et al. |
| 2010/0085537 A1 | 4/2010 | Ramella-Roman et al. |
| 2010/0110442 A1 | 5/2010 | Adibi et al. |
| 2010/0128370 A1 | 5/2010 | Chen et al. |
| 2010/0134794 A1 | 6/2010 | Odegard et al. |
| 2010/0165337 A1 | 7/2010 | Dirk |
| 2010/0191493 A1 | 7/2010 | Brown et al. |
| 2010/0201979 A1 | 8/2010 | Momtahan et al. |
| 2010/0271352 A1 | 10/2010 | Nakano et al. |
| 2010/0284005 A1 | 11/2010 | Malinen et al. |
| 2010/0292581 A1 | 11/2010 | Howard et al. |
| 2010/0309454 A1 | 12/2010 | Zhang |
| 2011/0037975 A1 | 2/2011 | McClure |
| 2011/0082449 A1 | 4/2011 | Melsky et al. |
| 2011/0194019 A1* | 8/2011 | Shyu .............. H04N 5/2254 348/360 |
| 2011/0255745 A1 | 10/2011 | Hodder et al. |
| 2011/0261252 A1 | 10/2011 | Chen |
| 2011/0280038 A1 | 11/2011 | Jeong et al. |
| 2011/0285471 A1 | 11/2011 | Vromans et al. |
| 2011/0318717 A1 | 12/2011 | Adamowicz |
| 2012/0001083 A1 | 1/2012 | Knapp |
| 2012/0018829 A1 | 1/2012 | Beck et al. |
| 2012/0019819 A1 | 1/2012 | Messerchmidt |
| 2012/0053426 A1 | 3/2012 | Webster et al. |
| 2012/0088486 A1 | 4/2012 | Messerchmidt |
| 2012/0099102 A1 | 4/2012 | Bello |
| 2012/0154801 A1 | 6/2012 | Carron et al. |
| 2012/0286046 A1 | 11/2012 | Ciurczak et al. |
| 2013/0021611 A1 | 1/2013 | Tsurutani |
| 2013/0107260 A1 | 5/2013 | Nozawa |
| 2013/0155402 A1 | 6/2013 | Walton et al. |
| 2013/0182250 A1 | 7/2013 | McClure |
| 2013/0258341 A1 | 10/2013 | Day et al. |
| 2013/0271760 A1 | 10/2013 | Froigneux et al. |
| 2014/0002817 A1 | 1/2014 | Ross et al. |
| 2014/0046630 A1 | 2/2014 | Smith et al. |
| 2014/0052555 A1 | 2/2014 | MacIntosh |
| 2014/0061486 A1 | 3/2014 | Bao et al. |
| 2014/0064479 A1 | 3/2014 | Manikandan et al. |
| 2014/0168636 A1 | 6/2014 | Funamoto et al. |
| 2014/0204377 A1 | 7/2014 | Day et al. |
| 2014/0211199 A1 | 7/2014 | Kuo et al. |
| 2014/0268112 A1 | 9/2014 | Foord et al. |
| 2014/0293091 A1 | 10/2014 | Rhoads et al. |
| 2014/0320858 A1 | 10/2014 | Goldring et al. |
| 2014/0333932 A1 | 11/2014 | Uematsu et al. |
| 2014/0354991 A1 | 12/2014 | Li et al. |
| 2015/0036138 A1 | 2/2015 | Watson et al. |
| 2015/0055132 A1 | 2/2015 | Ricketts et al. |
| 2015/0062577 A1 | 3/2015 | Hartwell et al. |
| 2015/0069239 A1 | 3/2015 | Kester et al. |
| 2015/0103354 A1 | 4/2015 | Saptari |
| 2015/0108333 A1 | 4/2015 | Bouckaert |
| 2015/0116707 A1 | 4/2015 | Tatsuda |
| 2015/0119661 A1 | 4/2015 | Gilbert et al. |
| 2015/0153225 A1 | 6/2015 | Baudelet |
| 2015/0204833 A1 | 7/2015 | O'Brien et al. |
| 2015/0292948 A1 | 10/2015 | Goldring et al. |
| 2015/0300879 A1 | 10/2015 | Goldring et al. |
| 2015/0323383 A1 | 11/2015 | Pastore et al. |
| 2015/0369725 A1 | 12/2015 | Carvalho Sousa et al. |
| 2016/0018260 A1 | 1/2016 | Samuels |
| 2016/0033328 A1 | 2/2016 | Walters |
| 2016/0091369 A1 | 3/2016 | Sakurai et al. |
| 2016/0103069 A1 | 4/2016 | Umapathy et al. |
| 2016/0177366 A1 | 6/2016 | Auner et al. |
| 2016/0223400 A1 | 8/2016 | Carron et al. |
| 2016/0231171 A1 | 8/2016 | Assefa et al. |
| 2016/0238449 A1 | 8/2016 | Goldring et al. |
| 2016/0245700 A1 | 8/2016 | Uematsu et al. |
| 2016/0258813 A1 | 9/2016 | Kuri |
| 2016/0263910 A1 | 9/2016 | Kanai et al. |
| 2016/0282182 A1 | 9/2016 | Kanai et al. |
| 2016/0290863 A1 | 10/2016 | Goldring et al. |
| 2016/0299004 A1 | 10/2016 | Thamm |
| 2016/0299061 A1 | 10/2016 | Goldring et al. |
| 2016/0305820 A1 | 10/2016 | Zollars et al. |
| 2016/0313184 A1 | 10/2016 | Owechko |
| 2016/0334274 A1 | 11/2016 | Xu |
| 2016/0356646 A1 | 12/2016 | Wiegand et al. |
| 2016/0356647 A1 | 12/2016 | Wiegand et al. |
| 2016/0356704 A1 | 12/2016 | Kim et al. |
| 2017/0003167 A1 | 1/2017 | Ave |
| 2017/0010160 A1 | 1/2017 | Rosen et al. |
| 2017/0027447 A1 | 2/2017 | Sutin et al. |
| 2017/0038257 A1 | 2/2017 | Liu et al. |
| 2017/0160131 A1 | 6/2017 | Goldring et al. |
| 2017/0234729 A1 | 8/2017 | Goldring et al. |
| 2017/0309763 A1 | 10/2017 | Sweeney et al. |
| 2018/0003558 A1 | 1/2018 | Goldring et al. |
| 2018/0031468 A1 | 2/2018 | Aphek |
| 2018/0085003 A1 | 3/2018 | Goldring et al. |
| 2018/0120155 A1 | 5/2018 | Rosen et al. |
| 2018/0172510 A1 | 6/2018 | Rosen et al. |
| 2018/0180478 A1 | 6/2018 | Goldring et al. |
| 2019/0011313 A1 | 1/2019 | Goldring et al. |
| 2019/0033130 A1 | 1/2019 | Goldring et al. |
| 2019/0033132 A1 | 1/2019 | Goldring et al. |
| 2019/0041265 A1 | 2/2019 | Rosen et al. |

(56) References Cited

U.S. PATENT DOCUMENTS

| | | |
|---|---|---|
| 2019/0056315 A1 | 2/2019 | Kinrot et al. |
| 2019/0310134 A1 | 10/2019 | Goldring et al. |
| 2020/0292385 A1 | 9/2020 | Goldring et al. |

FOREIGN PATENT DOCUMENTS

| | | |
|---|---|---|
| CN | 101501465 A | 8/2009 |
| CN | 102369421 A | 3/2012 |
| CN | 102435311 A | 5/2012 |
| EP | 2783193 A1 | 10/2014 |
| EP | 3028020 A2 | 6/2016 |
| EP | 3090239 A2 | 11/2016 |
| JP | H0792022 A | 4/1995 |
| JP | 2001236583 A | 8/2001 |
| JP | 2002277326 A | 9/2002 |
| JP | 2004294361 A | 10/2004 |
| JP | 2005148018 A | 6/2005 |
| JP | 2007218878 A | 8/2007 |
| JP | 2008286522 A | 11/2008 |
| JP | 2009104547 A | 5/2009 |
| JP | 2011198801 A | 10/2011 |
| WO | WO-9953350 A1 | 10/1999 |
| WO | WO-2005008198 A2 | 1/2005 |
| WO | WO-2010027982 A2 | 3/2010 |
| WO | WO-2010036906 A1 | 4/2010 |
| WO | WO-2013065035 A1 | 5/2013 |
| WO | WO-2013082272 A1 | 6/2013 |
| WO | WO-2013106307 A1 | 7/2013 |
| WO | WO-2013148461 A1 | 10/2013 |
| WO | WO-2013150290 A1 | 10/2013 |
| WO | WO-2013162850 A1 | 10/2013 |
| WO | WO-2013163268 A1 | 10/2013 |
| WO | WO-2013165887 A1 | 11/2013 |
| WO | WO-2013184226 A1 | 12/2013 |
| WO | WO-2014014534 A2 | 1/2014 |
| WO | WO-2014033783 A1 | 3/2014 |
| WO | WO-2014014534 A3 | 4/2014 |
| WO | WO-2014064447 A1 | 5/2014 |
| WO | WO-2014102629 A1 | 7/2014 |
| WO | WO-2014129305 A1 | 8/2014 |
| WO | WO-2014139003 A1 | 9/2014 |
| WO | WO-2014192007 A1 | 12/2014 |
| WO | WO-2015009602 A1 | 1/2015 |
| WO | WO-2015015493 A2 | 2/2015 |
| WO | WO-2015015493 A3 | 3/2015 |
| WO | WO-2015038372 A1 | 3/2015 |
| WO | WO-2015042617 A1 | 3/2015 |
| WO | WO-2015058166 A2 | 4/2015 |
| WO | WO-2015058166 A3 | 6/2015 |
| WO | WO-2015101992 A2 | 7/2015 |
| WO | WO-2015101992 A3 | 9/2015 |
| WO | WO-2015138028 A2 | 9/2015 |
| WO | WO-2015138028 A3 | 11/2015 |
| WO | WO-2016022283 A1 | 2/2016 |
| WO | WO-2016033224 A1 | 3/2016 |
| WO | WO-2016059946 A1 | 4/2016 |
| WO | WO-2016063284 A2 | 4/2016 |
| WO | WO-2016124659 A1 | 8/2016 |
| WO | WO-2016125164 A2 | 8/2016 |
| WO | WO-2016125165 A2 | 8/2016 |
| WO | WO-2016162865 A1 | 10/2016 |
| WO | WO-2016125165 A3 | 12/2016 |
| WO | WO-2016196727 A2 | 12/2016 |
| WO | WO-2016196727 A3 | 1/2017 |
| WO | WO-2017051424 A1 | 3/2017 |
| WO | WO-2018015951 A1 | 1/2018 |

OTHER PUBLICATIONS

Co-pending U.S. Appl. No. 15/858,340, filed Dec. 29, 2017.
Co-pending U.S. Appl. No. 15/867,245, filed Jan. 10, 2018.
Co-pending U.S. Appl. No. 16/232,959, filed Dec. 26, 2018.
Co-pending U.S. Appl. No. 16/657,847, filed Oct. 18, 2019.
Co-pending U.S. Appl. No. 16/744,062, filed Jan. 15, 2020.
Co-pending U.S. Appl. No. 16/746,588, filed Jan. 17, 2020.
European search report and search opinion dated Feb. 7, 2017 for EP Application No. 14831451.1.
European search report and search opinion dated Jul. 24, 2015 for EP Application No. 12845773.6.
European search report and search opinion dated Aug. 7, 2017 for EP Application No. 15733267.7.
"Extended European Search Report and Search Opinion dated Dec. 13, 2017 for European Patent Application No. EP15733267.7".
International search report and written opinion dated Jan. 26, 2015 for PCT Application No. IL2014/050688.
International search report and written opinion dated Mar. 22, 2013 for PCT Application No. IL2012/000367.
International search report and written opinion dated Jul. 14, 2015 for PCT Application No. PCT/IL2015/050002.
Acktar Advanced Coatings Website. Accessed Jun. 3, 2015. http://www.acktar.com/.
Anoplate Website. Accessed Jun. 3, 2015. http://www.anoplate.com/capabilities/anoblack_ni.html.
Avian Technologies Website. Accessed Jun. 3, 2015. http://www.aviantechnologies.com/products/coatings/diffuse_black.php.
Co-pending U.S. Appl. No. 15/479,105, filed Apr. 4, 2017.
Co-pending U.S. Appl. No. 15/667,360, filed Aug. 2, 2017.
Co-pending U.S. Appl. No. 15/713,198, filed Sep. 22, 2017.
Co-pending U.S. Appl. No. 15/901,627, filed Feb. 21, 2018.
Co-pending U.S. Appl. No. 15/905,578, filed Feb. 26, 2018.
Co-pending U.S. Appl. No. 16/389,723, filed Apr. 19, 2019.
Co-pending U.S. Appl. No. 16/437,826, filed Jun. 11, 2019.
"Interference Filter Handbook," published by JDS Uniphase (Second Edition), Sep. 2006, p. 195-202 and 213-214.
International search report and written opinion dated Aug. 25, 2016 for PCT Application No. PCT/IL2016/050130.
"International search report and written opinion dated Sep. 7, 2016 for PCT Application IL-2016050129".
"International search report and written opinion dated Oct. 13, 2016 for PCT Application IL-2016050362".
U.S. Appl. No. 15/667,360 Office Action dated Jun. 14, 2018.
U.S. Appl. No. 15/667,360 Office Action dated Mar. 25, 2019.

\* cited by examiner

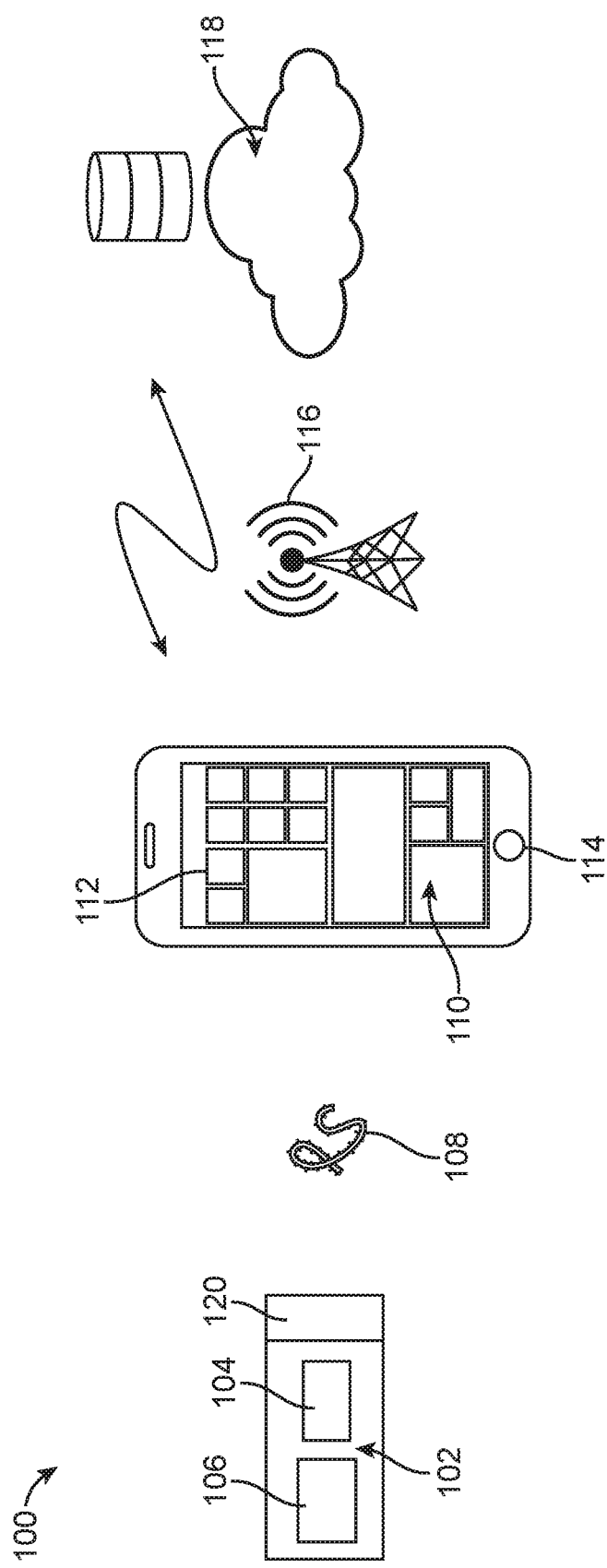

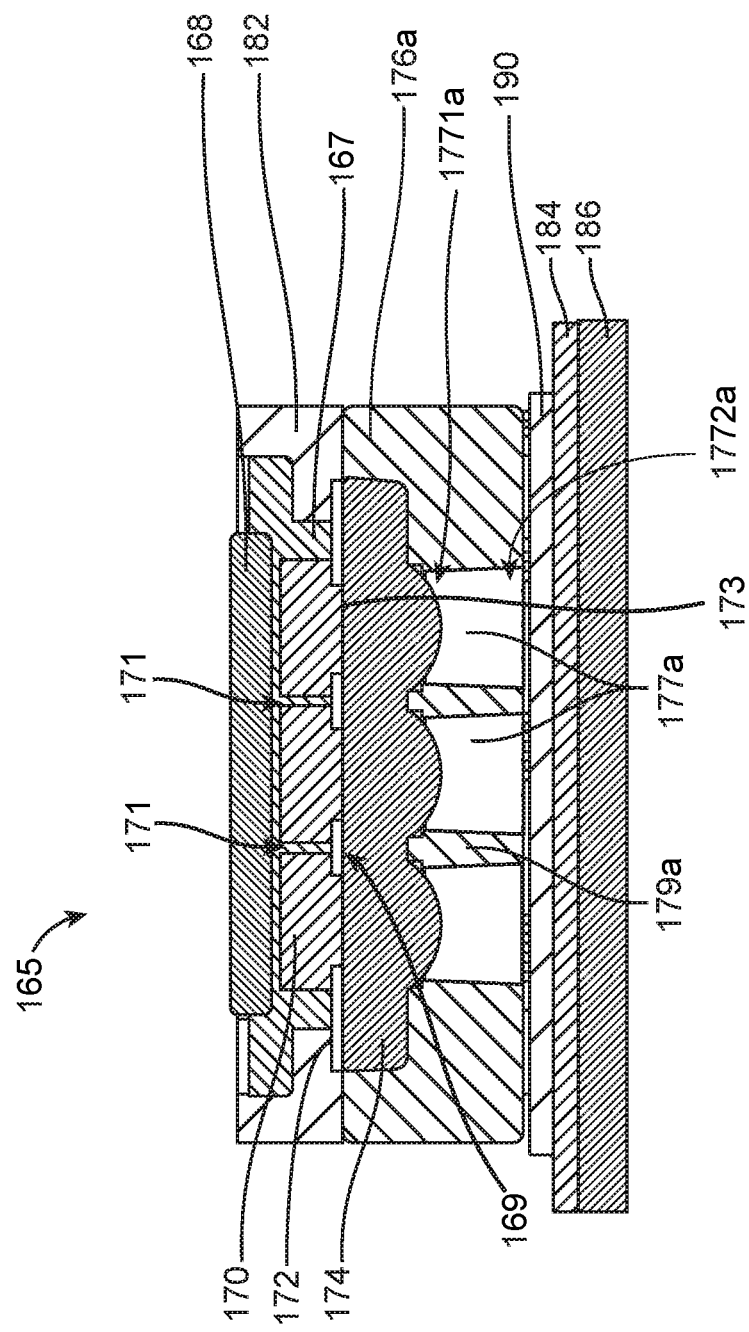

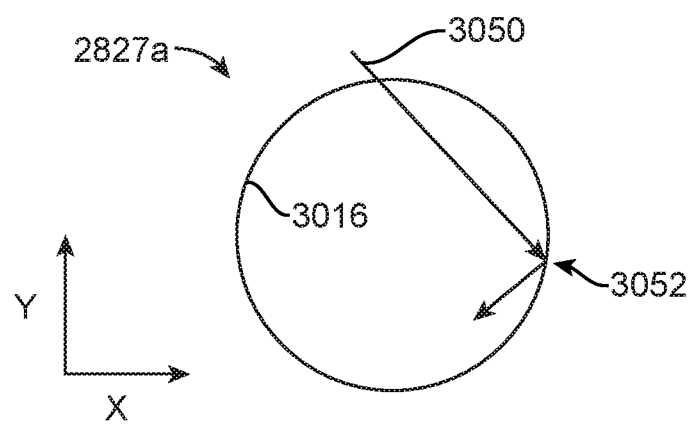
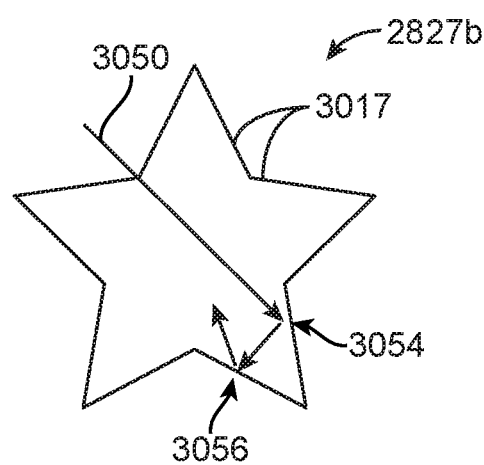
FIG. 30B  FIG. 30C
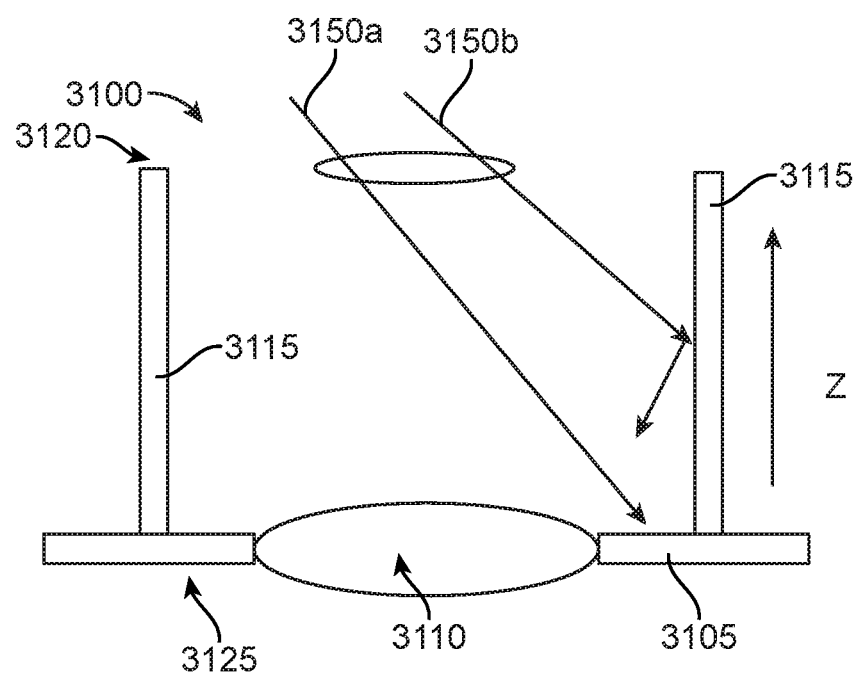
FIG. 31

SPECTROMETRY SYSTEM WITH VISIBLE AIMING BEAM

CROSS-REFERENCE

The present application is a continuation of U.S. patent application Ser. No. 15/667,360, filed Aug. 2, 2017, entitled "SPECTROMETRY SYSTEM WITH VISIBLE AIMING BEAM", which is a continuation of International Patent Application No. PCT/IL2016/050130, filed Feb. 4, 2016, entitled "SPECTROMETRY SYSTEM WITH VISIBLE AIMING BEAM", which claims the benefit of U.S. Provisional Application Ser. No. 62/112,553, filed on Feb. 5, 2015, entitled "SPECTROMETRY SYSTEM WITH VISIBLE AIMING BEAM", U.S. Provisional Application Ser. No. 62/154,585, filed on Apr. 29, 2015, entitled "SPECTROMETRY SYSTEM WITH VISIBLE AIMING BEAM", U.S. Provisional Application Ser. No. 62/161,728, filed on May 14, 2015, entitled "SPECTROMETRY SYSTEM WITH VISIBLE AIMING BEAM", U.S. Provisional Application Ser. No. 62/190,524, filed on Jul. 9, 2015, entitled "SPECTROMETRY SYSTEM WITH VISIBLE AIMING BEAM", U.S. Provisional Application Ser. No. 62/258,341, filed on Nov. 20, 2015, entitled "SPECTROMETRY SYSTEM WITH VISIBLE AIMING BEAM", and U.S. Provisional Application Ser. No. 62/277,558, filed on Jan. 12, 2016, entitled "SPECTROMETRY SYSTEM WITH VISIBLE AIMING BEAM", the entire disclosures of each of which are incorporated herein by reference.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BACKGROUND OF THE INVENTION

Spectrometers are used for many purposes. For example, spectrometers are used in the detection of defects in industrial processes, satellite imaging, and laboratory research. However, these instruments have typically been too large and too costly for the consumer market.

Spectrometers detect radiation from a sample and process the resulting signal to obtain and present information about the sample that includes spectral, physical and chemical information about the sample. These instruments generally include some type of spectrally selective element to separate wavelengths of radiation received from the sample, and a first-stage optic, such as a lens, to focus or concentrate the radiation onto an imaging array.

The prior spectrometers can be less than ideal in at least some respects. Prior spectrometers having high resolution can be larger than ideal for use in many portable applications. Although prior spectrometers with decreased size have been proposed, the prior spectrometers having decreased size and optical path length can have less than ideal resolution, sensitivity and less accuracy than would be ideal. Also, the cost of prior spectrometers can be greater than would be ideal. The prior spectrometers can be somewhat bulky, difficult to transport and the optics can require more alignment than would be ideal in at least some instances.

Further, data integration of prior spectrometers with measured objects can be less than ideal in at least some instances. For example, although prior spectrometers can provide a spectrum of a measured object, the spectrum may be of little significance to at least some users. It would be helpful if a spectrum of a measured object could be associated with attributes of the measured object that are useful to a user. For example, although prior spectrometers may be able to measure sugar, it would be helpful if a spectrometer could be used to determine the sweetness of an object such as an apple. Many other examples exist where spectral data alone does not adequately convey relevant attributes of an object, and it would be helpful to provide attributes of an object to a user in response to measured spectral data.

Prior spectrometer methods and apparatus may have less than ideal aiming characteristics. Prior illumination apparatus for spectrometers may have less specificity and accuracy than would be ideal. Further the prior spectrometer illumination devices may output more light energy than would be ideal. Also, in some situations it can be difficult for a user to know what area of an object is being measured.

In light of the above, an improved spectrometer and interpretation of spectral data that overcomes at least some of the above mentioned deficiencies of the prior spectrometers would be beneficial. Ideally, such a spectrometer would be compact, easy to aim, integrated with a consumer device such as a cellular telephone, sufficiently rugged and low in cost to be practical for end-user spectroscopic measurements of items, and convenient to use. Further, it would be helpful to provide data comprising attributes of measured objects related to the spectral data of the objects to many people.

SUMMARY OF THE INVENTION

The present disclosure provides improved spectrometer methods and apparatus. A spectrometer may be used to determine one or more spectra of an object, and the one or more spectra may be associated with one or more attributes of the object that are relevant to the user. While the spectrometer can take many forms, in many instances the spectrometer comprises a hand held spectrometer with wavelength multiplexing in which a plurality of wavelengths are used to illuminate the object and measure the one or more spectra. The handheld spectrometer can be configured with a visible aiming beam to allow the user to determine the measured region of the object. The visible aiming beam may comprise the spectrometer measurement beam, or a separate beam. When the visible aiming beam comprises the spectrometer measurement beam, the spectrometer measurement beam comprises sufficient energy for the user to see the measurement beam illuminating the object. When the visible aiming beam comprises a separate beam, the visible aiming beam comprises sufficient energy for the user to see a portion of the aiming beam reflected from the object. The visible aiming beam and measurement beam can be arranged to at least partially overlap on the sample, such that the user has an indication of the area of the sample being measured. The spectrometer may comprise a field of view, and the measurement beam illuminating the sample may occupy only a portion of the field of view of the spectrometer, such that the region of the sample measured is defined with the measurement beam. The measurement beam may overlap with the visible aiming beam such that the visible aiming beam identifies the measurement area of the sample for the user. This identification of the area of the sample to be measured can help the user aim the hand held spectrometer and provide improved measurement accuracy with decreased artifacts. The measurement beam can be coupled to the aiming beam in one or more of many ways with one or more of many configurations, such as a coaxial configuration in which the measurement bean and aiming beam extend coaxially together along a shared optical axis.

The spectral data of the object can be used to determine one or more attributes of the object. In many instances, the spectrometer is coupled to a database of spectral information that can be used to determine the attributes of the object. The spectrometer system may comprise a hand held communication device coupled to a spectrometer, in which the user can input and receive data related to the measured object with the hand held communication device. The configurations disclosed herein allow many users to share object data with many people, in order to provide many people with actionable intelligence in response to spectral data.

In one aspect, an apparatus to measure spectra of a sample comprises a detector and a light source. The detector has a field of view to measure the spectra of the sample within the field of view. The light source is configured to direct an optical beam to the sample within the field of view, wherein a portion of the optical beam reflected from the sample is visible to a user. The portion of the optical beam reflected from the sample visible to the user may define a measurement area of the sample.

The apparatus may further comprise a casing supported with the detector and the light source. The detector and the light source may be arranged to fit within the casing. The casing may be sized to fit within a hand of the user, to allow the user to aim the spectrometer at the sample and measure the sample. The apparatus may further comprise a user input supported with the casing. The user input may be arranged for the user to aim the spectrometer and measure the sample with the user input manipulated with the hand holding the spectrometer. The apparatus may further comprise circuitry coupled to the detector and the light source. The circuitry may be configured to transmit the optical beam in response to the user input with the hand holding the hand held spectrometer.

The light source of the apparatus may be configured in order to provide the optical beam incident on the sample with an illuminance ($E_v$) within a range from about 20 lux (lm/m$^2$) to about 100,000 lux (lm/m$^2$). The light source may be configured to provide the optical beam incident on the sample with an irradiance within a range from about 0.1 mW/cm$^2$ to about 100 mW/cm$^2$.

The portion of the optical beam visible to the user may comprise a portion of a measurement beam to measure the spectra of the sample. The portion of the optical beam visible to the user may further comprise an aiming beam comprising one or more wavelengths corresponding to one or more colors visible to the user. The one or more colors visible to the user may comprise one or more of red, orange, yellow, blue, green, indigo or violet. The portion of the beam visible to the user may comprise a combination of visible wavelengths of light.

The optical beam may comprise an aiming beam and a measurement beam arranged to illuminate the sample within the field of view of the detector. The detector may comprise one or more filters to inhibit transmission of the aiming beam and to transmit the measurement beam. The one or more filters may comprise a plurality of optical filters to inhibit transmission of a portion of the aiming beam reflected from the sample and to transmit a portion of the measurement beam reflected from the sample. The detector may comprise a plurality of optical channels, each of the plurality of optical filters corresponding to an optical channel, and each optical channel comprising a field of view. The field of view of the detector may comprise a plurality of overlapping fields of view of a plurality of optical channels, wherein the aiming beam and the measurement beam may be arranged to overlap with the plurality of overlapping fields of view on the object.

The apparatus may further comprise a second light source to direct a measurement beam toward the sample, the first light source comprising an aiming beam. The measurement beam may comprise an infrared beam and the aiming beam may comprise a visible light beam.

The apparatus may further comprise one or more optics coupled to the light source to direct the optical beam toward the sample. The one or more optics may comprise one or more of a mirror, a beam splitter, a lens, a curved reflector, or a parabolic reflector to direct the optical beam toward the sample. The light source may comprise a visible light source to generate an aiming beam and a measurement beam light source to generate a measurement beam, wherein the one or more optics may be arranged to receive the aiming beam and the measurement beam and direct the aiming beam and the measurement beam toward the sample with the aiming beam and the measurement beam overlapping on the sample. The measurement beam light source may comprise a phosphorescent plate, and the visible light source may comprise one or more of a laser diode or an LED emitting visible light energy having one or more wavelengths within a range from about 400 to 800 nm. The phosphorescent plate and the one or more of the laser diode or the LED may be arranged coaxially in order to transmit the measurement beam and the aiming beam along a common optical axis. The phosphorescent plate may be positioned to receive the visible light energy from the one or more of the laser diode or the LED. The aiming beam may comprise a portion of the visible light energy transmitted through the phosphorescent plate, and the measurement light beam may comprise light energy generated with the phosphorescent plate.

The measurement beam may be configured to illuminate a measurement area of the sample, and the aiming beam may be configured to illuminate a visible area of the sample overlapping with the measurement area, in order to display the measurement area to the user. The visible area may comprise from about 50% to about 150% or from about 75% to about 125% of the measurement area. The visible area may comprise at least about 90%, at least about 95%, or at least about 99% of of the measurement area. The one or more optics and the aiming beam and the measurement beam may be arranged to direct the aiming beam extending along an aiming beam axis and the measurement beam extending along a measurement beam axis toward the sample, wherein the aiming beam axis may be co-axial with the measurement beam axis.

The detector and the light source may comprise components of a spectrometer having a volume within a range from about 1 cm$^3$ to about 200 cm$^3$. The detector and the light source may comprise components of a spectrometer having dimensions within a range from about 0.1 cm×0.1 cm×2 cm to about 5 cm×5 cm×10 cm. The detector and the light source may comprise components of a spectrometer having a weight within a range from about 1 g to about 100 g. The detector and the light source may comprise components of a spectrometer having an optical resolution of less than 10 nm. The light source may emit electromagnetic energy comprising one or more of ultraviolet, visible, near infrared, or infrared light energy.

In another aspect, a method of measuring spectra of a sample comprises providing a detector having a field of view to measure the spectra of the sample within the field of view. The method further comprises providing a light source to direct an optical beam to the sample within the field of view, wherein a portion of the optical beam reflected from the sample is visible to a user.

The accuracy and reliability of measurements made by the spectrometer may be improved by providing a spectrometer system configured to reduce the system's sensitivity to the spatial distribution of light on the diffuser. To reduce the dependence of detected intensity distributions of incident light on spatial variations of the light intensity on the diffuser near a diffuser plane, a filter assembly comprising a diffuser and an optical filter may be provided with the spectrometer system. The filter assembly may comprise two or more of an optical substrate, an optical filter such as an interference filter, and a diffuser, integrated into a single optical component. The optical substrate can, for example, comprise a bulk visible light filter, configured to block out wavelengths that are outside the operational range of the spectrometer. In addition to improving the accuracy and reliability of the spectrometer measurements, by integrating the functions of a visible light filter, diffuser, and/or optical filter into a single optical component, the total cost of production and the size of the spectrometer can be reduced. The filter assembly may further comprise a lens or a lens array coupled directly thereto. In a spectrometer system comprising a plurality of optical channels, the filter assembly may be coupled to an aperture array comprising a plurality of apertures having different sizes, so as to balance the intensity of incident light transmitted through the filters across the different channels of the system.

The light beam may comprise a modulated light beam, and the circuitry can be coupled to the light source and detector and configured to measure the sample with the modulated light beam, in order to inhibit noise from ambient light sources. The modulated light beam may comprise visible light, and the light beam can be modulated with frequencies away from a frequency peak of the ambient light. The modulated light beam may comprise a modulation frequency within a range from about 10 Hz to about 45 Hz, or within a range from about 65 Hz to about 90 Hz, for example. Alternatively or in combination, the circuitry can be configured to measure the sample with one or more dark field samples and one or more pulsed samples to inhibit ambient light noise. The modulated light beam is well suited for use in combination with many spectrometers, such as spectrometers comprising a filter array or spectrometers comprising a plurality of light sources having different wavelengths, and combinations thereof.

The spectrometer module of the compact spectrometer may comprise a support array configured to increase the spectral range of the spectrometer. The support array can be disposed between the lens array and the image sensor to provide a plurality of isolated optical channels extending from a lens of the lens array and a corresponding sensor area of the image sensor. Each channel of the support array may be defined by a first opening facing the lens array, a second opening facing the image sensor, and a channel wall extending therebetween. The support array may be configured such that the channel wall extends all the way to the image sensor, such that crosstalk between adjacent optical channels can be inhibited, for example minimized. Inhibiting the crosstalk between channels can allow the sampling of a larger portion of the image sensor without detecting stray light, such that the area of the image generated on the image sensor by light from each channel can be increased substantially, for example maximized. Alternatively or in combination, each channel of the support array may be configured to have a round-shaped first opening facing the lens array and a rectangular or square-shaped opening facing the image sensor. Such a configuration can provide rectangular or square-shaped images of light on the image sensor. The rectangular or square-shaped images can collect additional spectral information compared to round-shaped images. The additional spectral information can comprise information from light having higher angles of incidence, enabling the sensor area corresponding to each optical channel to detect an extended spectral range of incident light.

In another aspect, an apparatus to measure spectra of a sample comprises a filter array comprising a plurality of filters, a lens array comprising a plurality of lenses, an image sensor comprising a plurality of sensor areas, and at least one diffuser. The filter array may be configured to receive light from the sample, the lens array configured to receive light transmitted through the filter array, and the image sensor configured to receive light transmitted through the lens array. The diffuser may be configured to spatially distribute the light from the sample substantially evenly across a front surface of the apparatus.

The at least one diffuser may comprise three or more diffusers arranged sequentially along an optical path of the light from the sample. The at least one diffuser may comprise a lateral diffuser configured to receive input light having a first lateral distribution and transmit output light having a second lateral distribution greater than the first lateral distribution. The lateral diffuser may comprise a plurality of scattering structures. The plurality of scattering structures may comprise a refractive index that is greater than a refractive index of a support material surround the plurality of scattering structures. The lateral diffuser may comprise a plurality of non-overlapping scattering structures. The plurality of scattering structures comprises a plurality of particles, a plurality of pores, or a combination thereof. The plurality of scattering structures may have a size and a density per unit volume, the lateral diffuser may comprise a thickness, and the thickness of the lateral diffuser and the size and density of the plurality of scattering structures mat be arranged such that a majority of light exiting the lateral diffuser is scattered by at least two light scattering structures.

In another aspect, an apparatus to measure spectra of a sample comprises a diffuser, a filter array comprising a plurality of filters, a lens array comprising a plurality of lenses, and an image sensor comprising a plurality of sensor areas. The apparatus further comprises an aperture array disposed between the diffuser and the lens array, and a support array disposed between the lens array and the image sensor. The diffuser may be configured to receive light from the sample, the filter array configured to receive light transmitted through the diffuser, the lens array configured to receive light transmitted through the filter array, and the image sensor configured to receive light transmitted through the lens array. The aperture array may comprise a plurality of apertures configured to pass light from the diffuser to the lens array, and the support array may comprise a plurality of channels configured to pass light from the lens array to the image sensor. The aperture array and the support array may be collectively configured to selectively pass light from the sample incident on a front surface of the apparatus at an angle of incidence within a predetermined range.

The aperture array may comprise a first aperture array layer and a second aperture array layer. The first aperture array layer may be disposed between the diffuser and the filter array, and may comprise a first plurality of apertures. The second aperture array layer may be disposed between the filter array and the lens array, and comprise a second plurality of apertures aligned with the first plurality of apertures. The first and second aperture layers may be arranged to block light having an angle of incidence outside the predetermined range from passing through to the lens array.

Each of the first plurality of apertures may have a first diameter, each of the second plurality of apertures may have a second diameter, and the first aperture layer array and the second aperture array layer may be separated by a separation distance. One or more of the first diameter, the second diameter, and the separation distance may be arranged to block light have the angle of incident outside the predetermined range. The first diameter may be greater than the second diameter, the second diameter may be greater than the first diameter, or the first diameter and the second diameter may be equal.

The filter array may comprise an opaque material disposed between adjacent filters of the plurality of filters. The opaque material may be configured to prevent cross-talk of light between the adjacent filters.

A side wall of each of the plurality of channels of the support array may be configured to reduce an intensity of light by at least about 90% after a single reflection of the light from the side wall. Each of the plurality of channels of the support array may be shaped substantially as a frustum, wherein a top opening of the channel is smaller than a bottom opening of the channel. Each channel may comprise a continuous, rounded side wall, or each channel may comprise two or more side walls connected at an angle relative to one another. Each channel may comprise three or more straight side walls connected at one or more angles relative to one another, such that a horizontal cross-section of the channel forms a polygon. The two or more side walls may be arranged such that light entering the channel is reflected from the two or more side walls at least two times before exiting the channel. A side wall of each of the plurality of channels of the support array may be configured to provide substantially specular reflection of light from the side wall, or substantially diffusive reflection of light from the side wall.

Each of the plurality of channels of the support array may comprise one or more side walls extending from a top end of the channel to a bottom end of the channel, and a bottom wall extending over the bottom end. The bottom wall may comprise a central opening therethrough, wherein an area of the central opening is smaller than a cross-sectional area of the channel at the bottom end. The one or more side walls and the bottom wall may be arranged to selectively allow the light having the angle of incidence within the predetermined range to pass through the central opening and exit the channel.

The apparatus may further comprise an angle limiting layer disposed between the diffuser and the filter array, wherein the angle limiting layer is configured to selectively allow the light having the angle of incidence within the predetermined range to pass therethrough. The angle limiting layer may comprise a micro-louver film having a plurality of light transmissive sections and a plurality of light blocking sections arranged alternatingly along a length of the micro-louver film. One or more of a thickness of the micro-louver film and a distance between adjacent light blocking sections may be configured to selectively allows the light having the angle of incidence within the predetermined range to pass through to the filter array. The angle limiting layer may comprises a prism film having an input surface configured to receive light and an output surface configured to output the light, the output surface comprising a plurality of microstructures configured to modify an angle of transmission of the output light. The plurality of microstructures may be configured to output light selectively comprising the light having the angle of incidence within the predetermined range. The plurality of microstructures may be further configured to redirect light having an angle of incidence greater than a predetermined threshold value to adjacent microstructures or back towards the diffuser. The plurality of microstructures may comprise a plurality of pyramid shaped structures.

BRIEF DESCRIPTION OF THE DRAWINGS

FIG. 2 shows a schematic diagram of a spectrometer system, in accordance with configurations.

FIG. 24A shows a cross-sectional view of an optical subassembly comprising an exemplary support array.

FIGS. 30B and 30C illustrate horizontal cross-sections of exemplary configurations of the channel of FIG. 30A.

FIG. 31 illustrates a configuration of a support array channel comprising a bottom wall having a central opening.

DETAILED DESCRIPTION OF THE INVENTION

Figure 1A:
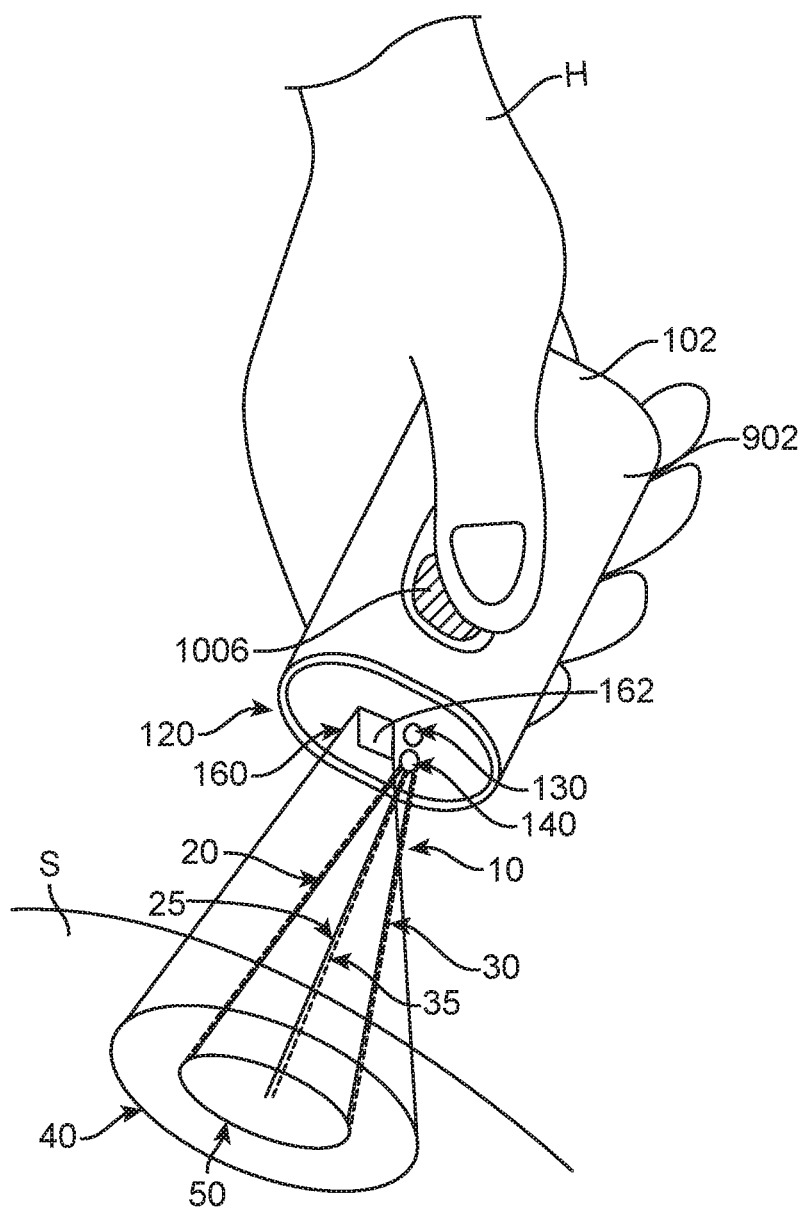
FIGS. 1A and 1B show an isometric view of a compact spectrometer, in accordance with configurations.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figure and described in the specification, but only as indicated in the accompanying claims, with the proper scope determined only by the broadest interpretation of said claims.

A better understanding of the features and advantages of the present disclosure will be obtained by reference to the following detailed description that sets forth illustrative embodiments, in which the principles of embodiments of the present disclosure are utilized, and the accompanying drawings.

The configurations disclosed herein can be combined in one or more of many ways to provide improved spectrometer methods and apparatus. One or more components of the configurations disclosed herein can be combined with each other in many ways. A spectrometer as described herein can be used to generate spectral data of the object, and the spectral data of the object transmitted to a cloud based server in order to determine one or more attributes of the object. Alternatively or in combination, data of the cloud based server can be made available to both users and non-users of the spectrometers in order to provide useful information related to attributes of measured objects. The data of the cloud based server can be made available to users and non-users in many ways, for example with downloadable apps capable of connecting to the cloud based server and downloading information related to spectra of many objects.

The configurations disclosed herein are also capable of providing a database of attributes of many objects related to spectral data. A mobile communication device can be configured for a user to input attributes of one or more measured objects in order to construct a database based on spectral data of many measured objects.

As used herein, like characters refer to like elements. As used herein, the term "light" encompasses electromagnetic radiation having wavelengths in one or more of the ultraviolet, visible, or infrared portions of the electromagnetic spectrum. As used herein, the term "dispersive" is used, with respect to optical components, to describe a component that is designed to separate spatially, the different wavelength components of a polychromatic beam of light. Non-limiting examples of "dispersive" optical elements by this definition include diffraction gratings and prisms. The term specifically excludes elements such as lenses that disperse light because of non-idealities such as chromatic aberration or elements such as interference filters that have different transmission profiles according to the angle of incident radiation. The term also excludes the filters and filter matrixes described herein. As used herein, the term "store" encompasses a structure that stores objects, such as a crate or building.

The dimensions of an optical beam as described herein can be determined in one or more of many ways. The size of the beam may comprise a full width half maximum of the beam, for example. The measurement beam may comprise blurred edges, and the measurement area of the beam defining the measurement area of the sample may comprise a portion of the beam extending beyond the full width half maximum of the beam, for example. The dimensions of the aiming beam can be similarly determined.

Overview of Compact Spectrometer System

Figure 1B:
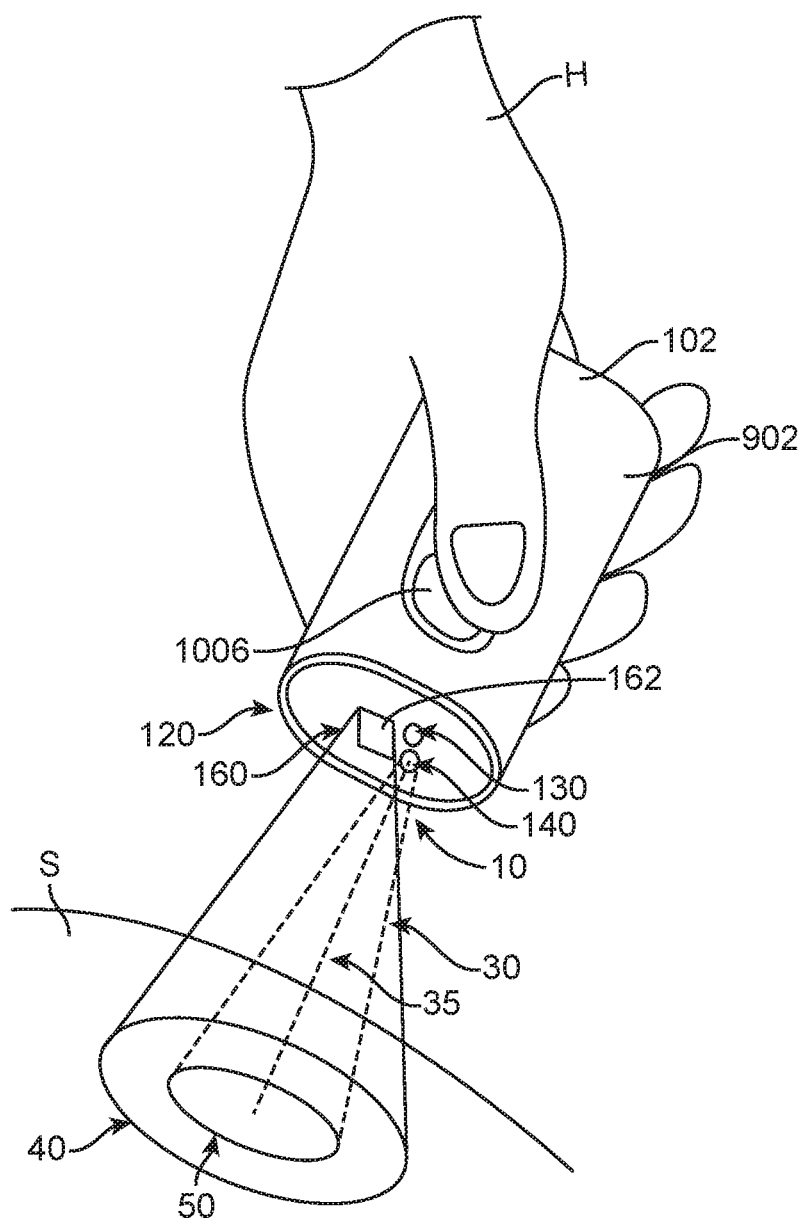

FIGS. 1A and 1B show an isometric view of a compact spectrometer 102, in accordance with configurations. The spectrometer 102 can be used as a general purpose material analyzer for many applications, as described in further detail herein. In particular, the spectrometer 102 can be used to identify materials or objects, provide information regarding certain properties of the identified materials, and accordingly provide users with actionable insights regarding the identified materials. The spectrometer 102 comprises a spectrometer head 120 configured to be directed towards a sample material S. The spectrometer head 120 comprises a spectrometer module 160, configured to obtain spectral information associated with the sample material S. The spectrometer head 120 may also comprise a sensor module 130, which may, for example, comprise a temperature sensor. The spectrometer may comprise simple means for users to control the operation of the spectrometer, such as operating button 1006. The compact size of the spectrometer 102 can provide a hand held device that can be directed (e.g., pointed) at a material to rapidly obtain information about the material. For example, as shown in FIGS. 1A and 1B, the spectrometer 102 may be sized to fit inside the hand H of a user.

FIG. 2 shows a schematic diagram of a spectrometer system, in accordance with configurations. In many instances, the spectrometer system 100 comprises a spectrometer 102 as described herein and a hand held device 110 in wireless communication 116 with a cloud based server or storage system 118. The spectrometer 102 can acquire the data as described herein. The hand held spectrometer 102 may comprise a processor 106 and communication circuitry 104 coupled to the spectrometer head 120 having spectrometer components as described herein. The spectrometer can transmit the data to the hand held device 110 with communication circuitry 104 with a communication link, such as a wireless serial communication link, for example Bluetooth™. The hand held device can receive the data from the spectrometer 102 and transmit the data to the cloud based storage system 118. The data can be processed and analyzed by the cloud based server 118, and transmitted back to the hand held device 110 to be displayed to the user. In addition, the analyzed spectral data and/or related additional analysis results may be dynamically added to a universal database operated by the cloud server 118, where spectral data associated with sample materials may be stored. The spectral data stored on the database may comprise data generated by one or more users of the spectrometer system 100, and/or pre-loaded spectral data of materials with known spectra. The cloud server may comprise a memory having the database stored thereon.

The spectrometer system may allow multiple users to connect to the cloud based server 118 via their hand held devices 110, as described in further detail herein. In some instances, the server 118 may be configured to simultaneously communicate with up to millions of hand held devices 110. The ability of the system to support a large number of users and devices at the same time can allow users of the system to access, in some instances in real-time, large amounts of information relating to a material of interest. Access to such information may provide users with a way of making informed decisions relating to a material of interest.

The hand held device 110 may comprise one or more components of a smart phone, such as a display 112, an interface 114, a processor, a computer readable memory and communication circuitry. The device 110 may comprise a substantially stationary device when used, such as a wireless communication gateway, for example.

The processor 106 may comprise a tangible medium embodying instructions, such as a computer readable memory embodying instructions of a computer program. Alternatively or in combination the processor may comprise logic such as gate array logic in order to perform one or more logic steps.

Figure 3:
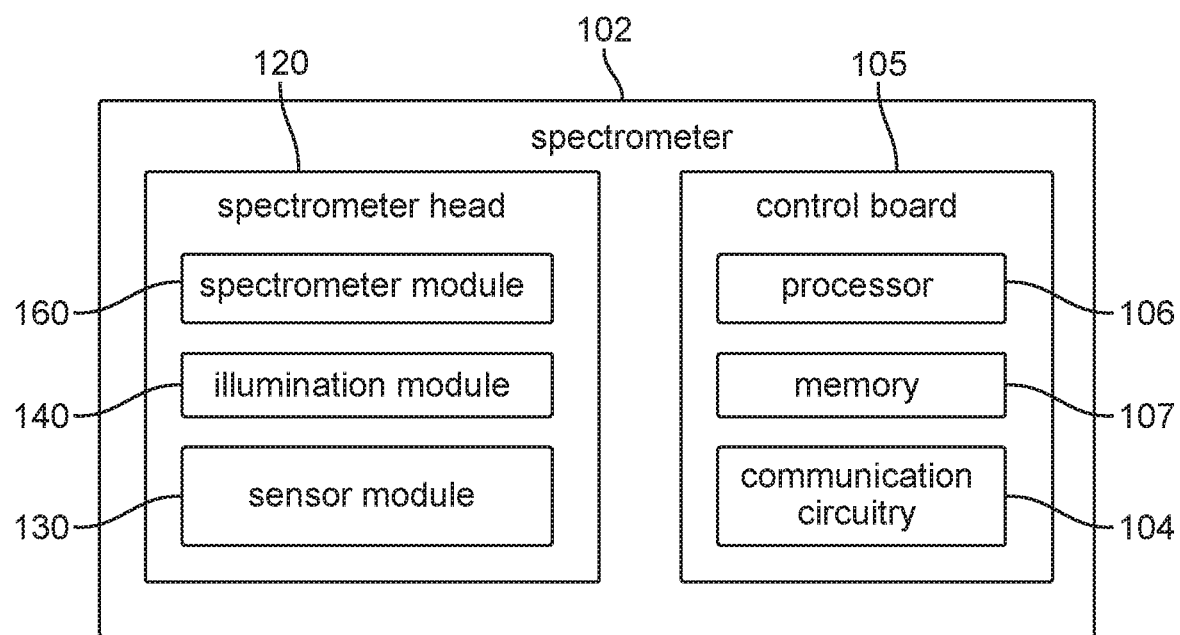
FIG. 3 shows a schematic diagram of the compact spectrometer of FIGS. 1A and 1B, in accordance with configurations.

FIG. 3 shows a schematic diagram of a compact spectrometer of FIGS. 1A and 1B. The spectrometer 102 may comprise a spectrometer head 120 and a control board 105. The spectrometer head 120 may comprise one or more of a spectrometer module 160 and an illumination module 140, which together can be configured to measure spectroscopic information relating to a sample material as described in further detail herein. The spectrometer head 120 may further comprise one or more of a sensor module 130, which can be configured to measure non-spectroscopic information relating to a sample material, such as ambient temperature. The control board 105 may comprise one or more of a processor 106, communication circuitry 104, and memory 107. Components of the control board 105 can be configured to transmit, store, and/or analyze data, as described in further detail herein.

The sensor module 130 can enable the identification of the sample material based on non-spectroscopic information in addition to the spectroscopic information measured by the spectrometer module 160. Such a dual information system may enhance the accuracy of detection or identification of the material.

The sensor element of sensor module 130 may comprise any sensor configured to generate a non-spectroscopic signal associated with at least one aspect of the environment, including the material being analyzed. For example, the sensor element may comprise one or more of a camera, temperature sensor, electrical sensor (capacitance, resistance, conductivity, inductance), altimeter, GPS unit, turbidity sensor, pH sensor, accelerometer, vibration sensor, biometric sensor, chemical sensor, color sensor, clock, ambient light sensor, microphone, penetrometer, durometer, barcode reader, flowmeter, speedometer, magnetometer, and another spectrometer.

The output of the sensor module 130 may be associated with the output of the spectrometer module 160 via at least one processing device of the spectrometer system. The processing device may be configured to receive the outputs of the spectrometer module and sensor module, analyze both outputs, and based on the analysis provide information relating to at least one characteristic of the material to a display unit. A display unit may be provided on the device in order to allow display of such information.

The spectrometer module 160 may comprise one or more lens elements. Each lens can be made of two surfaces, and each surface may be an aspheric surface. In designing the lens for a fixed-focus system, it may be desirable to reduce the system's sensitivity to the exact location of the optical detector on the z-axis (the axis perpendicular to the plane of the optical detector), in order to tolerate larger variations and errors in mechanical manufacturing. To do so, the point-spread-function (PSF) size and shape at the nominal position may be traded off with the depth-of-field (DoF) length. For example, a larger-than-optimal PSF size may be chosen in return for an increase in the DoF length. One or more of the aspheric lens surfaces of each lens of a plurality of lenses can be shaped to provide the increased PSF size and the increased DoF length for each lens. Such a design may help reduce the cost of production by enabling the use of mass production tools, since mass production tools may not be able to meet stringent tolerance requirements associated with systems that are comparatively more sensitive to exact location of the optical detector.

In some cases, the measurement of the sample may be performed using scattered ambient light. In some cases, the spectrometer system may comprise a light or illumination source, such as illumination module 140. The light source can be of any type (e.g., laser, light-emitting diode, etc.) known in the art appropriate for the spectral measurements to be made. The light source may emit from 350 nm to 1100 nm. The light source may emit from 0.1 mW to 500 mW. The wavelength(s) and intensity of the light source can depend on the particular use to which the spectrometer will be put.

The spectrometer may also include a power source, such as a battery or power supply. In some instances the spectrometer is powered by a power supply from a consumer hand held device (e.g. a cell phone). In some instances the spectrometer has an independent power supply. In some instances a power supply from the spectrometer can supply power to a consumer hand held device.

The spectrometer as described herein can be adapted, with proper choice of light source, detector, and associated optics, for a use with a wide variety of spectroscopic techniques. Non-limiting examples include Raman, fluorescence, and IR or UV-VIS reflectance and absorbance spectroscopies. Because, as described herein, a compact spectrometer system can separate a Raman signal from a fluorescence signal, the same spectrometer may be used for both spectroscopies. The spectrometer may not comprise a monochromator.

Referring again to FIGS. 1A and 1B, a user may initiate a measurement of a sample material S using the spectrometer 102 by interacting with a user input supported with a casing or container 902 of the spectrometer. The user input may, for example, comprise an operating button 1006. The casing or container 902 may be sized to fit within a hand H of a user, allowing the user to hold and aim the spectrometer at the sample material, and manipulate the user input with the same hand H to initiate measurement of the sample material. The casing or container 902 can house the different parts of the spectrometer such as the spectrometer module 160, illumination module 140, and sensor module 130. The spectrometer module may comprise a detector or sensor to measure the spectra of the sample material within a field of view 40 of the detector. The detector may be configured to have a wide field of view. The illumination module may comprise a light source configured to direct an optical beam 10 to the sample material S within the field of view 40. The light source may be configured to emit electromagnetic energy, comprising one or more of ultraviolet, visible, near infrared, or infrared light energy. The light source may comprise one or more component light sources. The illumination module may further comprise one or more optics coupled to the light source to direct the optical beam 10 toward the sample material S. The one or more optics may comprise one or more of a mirror, a beam splitter, a lens, a curved reflector, parabolic reflector, or parabolic concentrator, as described in further detail herein. The spectrometer 102 may further comprise a circuitry coupled to the detector and the light source, wherein the circuitry is configured to transmit the optical beam 10 in response to user interactions with the user input using hand H holding the spectrometer.

When a user initiates a measurement of a sample material S using the spectrometer 102, for example by pressing the operating button 1006 with hand H, the spectrometer emits an optical beam 10 toward the sample material within the field of view 40. When the optical beam 10 hits the sample material S, the light may be partially absorbed and/or partially reflected by the sample material; alternatively or in combination, optical beam 10 may cause the sample material to emit light in response. The detector of the spectrometer module 160 may be configured to sense at least a portion of the optical beam 10 reflected back by the sample and/or light emitted by the sample in response to the optical beam 10, and consequently generate the spectral data of the sample material as described in further detail herein.

The spectrometer 102 may be configured to begin measurement of a sample material S with just ambient light, without the optical beam 10. After completing the measurement with ambient light only, the illumination module 140 of the spectrometer 102 can generate the optical beam 10, and the spectrometer module 160 can begin measurement of the sample material with the optical beam 10. In this case, there may be a brief time lapse between the initiation of a measurement, for example by a user pressing the operating button 1006, and the generation of the optical beam 10 and the visible portions thereof. The ambient light-only measurement can be used to reduce or eliminate the contribution of ambient light in the spectral data of the sample material S. For example, the measurement made with ambient light only can be subtracted from the measurement made with the optical beam 10.

A portion of the optical beam 10 that is reflected from the sample material S may be visible to the user; this visible, reflected portion of optical beam 10 may define the measurement area 50 of the sample material S. The measurement area 50 of the sample may at least partially overlap with and fall within the field of view 40 of the detector of the spectrometer. The area covered by the field of view 40 may be larger than the visible area of the sample illuminated by the optical beam 10, or the measurement area 50 defined by the visible portion of the optical beam 10. Alternatively, the field of view may be smaller than the optical beam, for example. In many configurations, the field of view 40 of the detector of the spectrometer module is larger than the area illuminated by the optical beam 10, and hence the measurement area 50 is defined by the optical beam 10 rather than by the field of view 40 of the detector.

The visible portion of optical beam 10 may comprise one or more wavelengths corresponding to one or more colors visible to the user. For example, the visible portion of optical beam 10 may comprise one or more wavelengths corresponding to the colors red, orange, yellow, blue, green, indigo, violet, or a combination thereof. The visible portion of optical beam 10 reflected from the sample material S may comprise about 0.1% to about 10%, about 1% to about 4%, or about 2% to about 3% of optical beam 10. The visible portion of optical beam 10 may comprise light operating with power in a range from about 0.1 mW to about 100 mW, about 1 mW to about 75 mW, about 1 mW to about 50 mW, about 5 mW to about 40 mW, about 5 mW to about 30 mW, about 5 mW to about 20 mW, or about 10 mW to about 15 mW. The visible portion of optical beam 10 incident on the sample may have an intensity in a range from about 0.1 mW to about 100 mW, about 1 mW to about 75 mW, about 1 mW to about 50 mW, about 5 mW to about 40 mW, about 5 mW to about 30 mW, about 5 mW to about 20 mW, or about 10 mW to about 15 mW. The visible portion of optical beam 10 incident on the sample may have an intensity or total light output in a range from about 0.001 lumens to about 10 lumens, about 0.001 lumens to about 5 lumens, about 0.005 lumens to about 10 lumens, about 0.01 lumens to about 10 lumens, about 0.005 lumens to about 5 lumens, about 0.05 lumens to about 5 lumens, about 0.1 lumens to about 5 lumens, about 0.2 lumens to about 1 lumens, or about 0.5 lumens to about 5 lumens.

The optical beam 10 incident on the sample S may have an area of about 0.5 to about 2 $cm^2$, or about 1 $cm^2$. Accordingly, the optical beam 10 incident on the sample S may have an irradiance within a range from about 0.1 $mW/cm^2$ to about 100 $mW/cm^2$, about 1 $mW/cm^2$ to about 75 $mW/cm^2$, about 1 $mW/cm^2$ to about 50 $mW/cm^2$, about 5 $mW/cm^2$ to about 40 $mW/cm^2$, about 5 $mW/cm^2$ to about 30 $mW/cm^2$, about 5 $mW/cm^2$ to about 20 $mW/cm^2$, or about 10 $mW/cm^2$ to about 15 $mW/cm^2$. The optical beam 10 incident on the sample S may have an illuminance ($E_v$) within a range from about 20 lux (lumens/$m^2$) to about 100,000 lux, about 200 lux to about 75,000 lux, about 400 lux to about 50,000 lux, about 2,000 lux to about 25,000 lux, about 2,000 lux to about 15,000 lux, about 4,000 lux to about 15,000 lux, or about 4,000 lux to about 6,000 lux.

The light output of the visible portion of optical beam 10 may vary depending on the type of light source. In some cases, the visible light output of optical beam 10 may vary due to the different luminous efficacies of different types of light source. For example, blue light-emitting diode (LED) may have an efficacy of about 40 lumens/W, a red LED may have an efficacy of about 70 lumens/W, and a green LED may have an efficacy of about 90 lumens/W. Accordingly, the visible light output of optical beam 10 may vary depending on the color or wavelength range of the light source.

The light output of the visible portion of optical beam 10 may also vary due to the nature of interactions between the different components of a light source. For example, the light source may comprise a light source combined with an optical element configured to shift the wavelength of the light produced by the first light source, as described in further detail herein. In this embodiment, the visible light output of the visible portion of optical beam 10 may vary depending on the amount of the light produced by the light source that is configured to pass through the optical element without being absorbed or wavelength-shifted, as described in further detail herein.

As shown in FIG. 1A, the optical beam 10 may comprise a visible aiming beam 20. The aiming beam 20 may comprise one or more wavelengths corresponding to one or more colors visible to the user, such as red, orange, yellow, blue, green, indigo, or violet. Alternatively or in combination, the optical beam 10 may comprise a measurement beam 30, configured to measure the spectra of the sample material. The measurement beam 30 may be visible, such that the measurement beam 30 comprises and functions as a visible aiming beam. As shown in FIG. 1B, the optical beam 10 may comprise a visible measurement beam 30 that comprises a visible aiming beam. The measurement beam 30 may comprise light in the visible spectrum, non-visible spectrum, or a combination thereof. The aiming beam 20 and the measurement beam 30 may be produced by the same light source or by different light sources within the illumination module 140, and can be arranged to illuminate the sample material S within the field of view 40 of the detector or sensor of the spectrometer 102. The visible aiming beam 20 and the optical beam 30 may be partially or completely overlapping, aligned, and/or coaxial.

The visible aiming beam 20 may comprise light in the visible spectrum, for example in a range from about 390 nm to about 800 nm, which the user can see reflected on a portion of the sample material S. The aiming beam 20 can provide basic visual verification that the spectrometer 102 is operational, and can provide visual indication to the user that a measurement is in progress. The aiming beam 20 can help the user visualize the area of the sample material being measured, and thereby provide guidance the user in adjusting the position and/or angle of the spectrometer 102 to position the measurement area 50 over the desired area of the sample material S. The aiming beam 20 may be configured with circuitry to be emitted throughout the duration of a measurement, and automatically turn off when the measurement of the sample material S is complete; in this case, the aiming beam 20 can also provide visual indication to the user of how long the user should hold the spectrometer 102 pointed at the sample material S.

The visible aiming beam 20 and the measurement beam 30 may be produced by the same light source, wherein the visible aiming beam 20 comprises a portion of the measurement beam 30. Alternatively, the aiming beam 20 may be produced by a first light source, and the measurement beam 30 may be produced by a second light source. For example, the measurement beam 30 may comprise an infrared beam and the aiming beam 20 may comprise a visible light beam.

The measurement beam 30 may be configured to illuminate the measurement area 50 of the sample S, and the aiming beam 20 may be configured to illuminate an area of the sample overlapping with the measurement area, thereby displaying the measurement area to the user. The visible area illuminated by the visible aiming beam 20 may comprise from about 50% to about 150% or about 75% to about 125% of the measurement area, or at least about 90%, at least about 95%, or at least about 99% of the measurement area.

One or more optics of the illumination module, such as a lens or a parabolic reflector, may be arranged to receive the aiming beam 20 and the measurement beam 30 and direct the aiming beam and measurement beam toward the sample material S, with the aiming beam and measurement beam overlapping on the sample. The aiming beam 20 may be arranged to be directed along an aiming beam axis 25, while the measurement beam 30 may be arranged to be directed along a measurement beam axis 35. The aiming beam axis 25 may be co-axial with measurement beam axis 35.

The sensor or detector of the spectrometer module 160 may comprise one or more filters configured to transmit the measurement beam 30 but inhibit transmission of the aiming beam 20. In many configurations, the spectrometer module comprises one filter configured to inhibit transmission of visible light, thereby inhibiting transmission of portions of the aiming beam 20 and measurement beam 30 reflected from the sample that comprise visible light. In some configurations, the spectrometer module 160 may comprise a plurality of optical filters configured to inhibit transmission of a portion of the aiming beam 20 reflected the sample material S, and to transmit a portion of the measurement beam 30 reflected from the sample. In configurations of the spectrometer module comprising a plurality of optical channels, the spectrometer module may comprise a plurality of filters wherein each optical filter corresponds to an optical channel. Each filter may be configured to inhibit transmission of light within a specific range and/or within a specific angle of incidence, wherein the filtered specific range or specific angle of incidence may be specific to the corresponding channel. In some configurations, each optical channel of the spectrometer module may comprise a field of view. The field of view 40 of the spectrometer module may comprise a plurality of overlapping fields of view of a plurality of optical channels. The aiming beam and the measurement beam may overlap with the plurality of overlapping fields of view on the sample S. In many configurations, a diffuser may be disposed between the plurality of optical filters and the incident light from the sample, in which each optical filter corresponds to an optical channel. In such configurations, the plurality of optical channels may comprise similar fields of view through the diffuser, with each field of view at least partially overlapping with the fields of view of other optical channels. With the diffuser, the spectrometer may comprise a wide field of view, for example ±90°.

Optionally, the visible aiming beam 20 may be produced by a light source separate from the illumination module 140. In this case, the separate light source may be configured to produce the aiming beam such that the aiming beam illuminates a portion of the sample material that overlaps with the measurement area 50 of the sample.

The compact size of the spectrometer 102 can provide a hand held device that can be directed (e.g., pointed) at a material to rapidly obtain information about the material. As shown in FIGS. 1A and 1B, the spectrometer 102 may have a size and weight such that the spectrometer can be held by a user with only one hand H. The spectrometer can have a size and weight such that the spectrometer can be portable. The spectrometer can have a weight of about 1 gram (g), 5 g, 10 g, 15 g, 20 g, 25 g, 30 g, 35 g, 40 g, 45 g, 50 g, 55 g, 60 g, 65 g, 70 g, 80 g. 85 g, 90 g, 95 g, 100 g, 110 g, 120 g, 130 g, 140 g, 150 g, 160 g, 170 g, 180 g, 190 g, or 200 g. The spectrometer can have a weight less than 1 g. The spectrometer can have a weight greater than 200 g. The spectrometer can have a weight that is between any of the two values given above. For example, the spectrometer can have a weight within a range from about 1 g to about 200 g, about 1 g to about 100 g, about 5 g to about 50 g, about 5 g to about 40 g, about 10 g to about 40 g, about 10 g to about 30 g, or about 20 g to about 30 g.

The spectrometer can have a total volume of at most about 200 cm$^3$, 150 cm$^3$, 100 cm$^3$, 95 cm$^3$, 90 cm$^3$, 85 cm$^3$, 80 cm$^3$, 75 cm$^3$, 70 cm$^3$, 65 cm$^3$, 60 cm$^3$, 55 cm$^3$, 50 cm$^3$, 45 cm$^3$, 40 cm$^3$, 35 cm$^3$, 30 cm$^3$, 25 cm$^3$, 20 cm$^3$, 15 cm$^3$, 10 cm$^3$, 5 cm$^3$, or 1 cm$^3$. The spectrometer can have a volume less than 1 cm$^3$. The spectrometer can have a volume greater than 100 cm$^3$. The spectrometer can have a volume that is between any of the two values given above. For example, the spectrometer may have a volume within a range from about 1 cm$^3$ to about 200 cm$^3$, about 40 cm$^3$ to about 200 cm$^3$, about 60 cm$^3$ to about 150 cm$^3$, about 80 cm$^3$ to about 120 cm$^3$, about 80 cm$^3$ to about 100 cm$^3$, or about 90 cm$^3$.

The spectrometer shape can comprise a rectangular prism, cylinder, or other three-dimensional shape. The spectrometer can have a length of at most about 500 mm, 400 mm, 300 mm, 200 mm, 250 mm, 100 mm, 95 mm, 90 mm, 85 mm, 80 mm, 75 mm, 70 mm, 65 mm, 60 mm, 55 mm, 50 mm, 45 mm, 40 mm, 35 mm, 30 mm, 25 mm, 20 mm, 15 mm, 10 mm, or 5 mm. The spectrometer can have a length less than 5 mm. The spectrometer can have a length greater than 500 mm. The spectrometer can have a length that is between any of the two values given above. For example, the spectrometer have a length within a range from about 10 mm to about 100 mm, about 25 mm to about 75 mm, or about 50 mm to about 70 mm. The spectrometer can have a width of at most about 500 mm, 400 mm, 300 mm, 200 mm, 250 mm, 100 mm, 95 mm, 90 mm, 85 mm, 80 mm, 75 mm, 70 mm, 65 mm, 60 mm, 55 mm, 50 mm, 45 mm, 40 mm, 35 mm, 30 mm, 25 mm, 20 mm, 15 mm, 10 mm, or 5 mm. The spectrometer can have a width less than 5 mm. The spectrometer can have a width greater than 500 mm. The spectrometer can have a width that is between any of the two values given above. For example, the spectrometer may have a width within a range from about 10 mm to about 75 mm, about 20 mm to about 60 mm, or about 30 mm to about 50 mm. The spectrometer can have a height of at most about 500 mm, 400 mm, 300 mm, 200 mm, 250 mm, 100 mm, 95 mm, 90 mm, 85 mm, 80 mm, 75 mm, 70 mm, 65 mm, 60 mm, 55 mm, 50 mm, 45 mm, 40 mm, 35 mm, 30 mm, 25 mm, 20 mm, 15 mm, 10 mm, or 5 mm. The spectrometer can have a height less than 5 mm. The spectrometer can have a height greater than 500 mm. The spectrometer can have a height that is between any of the two values given above. For example, the spectrometer may have a height within a range from about 1 mm to about 50 mm, about 5 mm to about 40 mm, or about 10 mm to about 20 mm. The spectrometer may, for example, have dimensions within a range from about 0.1 cm×0.1 cm×2 cm to about 5 cm×5 cm×10 cm. In the case of a cylindrical spectrometer the spectrometer can have a radius of at most about 500 mm, 400 mm, 300 mm, 200 mm, 250 mm, 100 mm, 95 mm, 90 mm, 85 mm, 80 mm, 75 mm, 70 mm, 65 mm, 60 mm, 55 mm, 50 mm, 45 mm, 40 mm, 35 mm, 30 mm, 25 mm, 20 mm, 15 mm, 10 mm, or 5 mm. The spectrometer can have a radius less than 5 mm. The spectrometer can have a radius greater than 500 mm. The spectrometer can have a radius that is between any of the two values given above.

One or more of the components of the spectrometer can be powered by a battery. The battery can be on-board the spectrometer. The battery can have a weight of at most about 50 g, 45 g, 40 g, 35 g, 30 g, 25 g, 20 g, 15 g, 10 g, 5 g, 1 g, or 0.1 g. The battery can have a weight less than 0.1 g. The battery can have a weight greater than 50 g. The battery can have a weight that is between any of the two values given above. For example, the batter may have a weight that is within a range from about 2 g to about 6 g, about 3 g to about 5 g, or about 4 g.

The compact spectrometer 102 may have an optical resolution of less than 10 nm, less than 5 nm, less than 4 nm, less than 3 nm, less than 2 nm, less than 1 nm, less than 0.5 nm, or less than 0.1 nm. The spectrometer can have an optical resolution that is between any of the two values given above. For example, the spectrometer may have an optical resolution that is within a range from about 0.1 nm to about 100 nm, about 1 nm to about 50 nm, about 1 nm to about 10 nm, or about 2 nm to about 5 nm. The spectrometer may have an optical resolution of approximately 5 nm, which is equivalent to approximately 100 cm$^{-1}$ at a wavelength of about 700 nm and equivalent to approximately 40 cm$^{-1}$ at a wavelength of about 1100 nm. The spectrometer may have an optical resolution that is between 100 cm$^{-1}$ and 40 cm$^{-1}$. The spectrometer can have a temporal signal-to-noise ratio (SNR) of about 1000 for a single sensor reading (without averaging, at maximum spectral resolution) for a wavelength of about 1000 nm, or an SNR of about 2500 for a wavelength of about 850 nm. The compact spectrometer, when configured to perform algorithmic processing or correction of measured spectral data, may be able to detect changes in normalized signals in the order of about $1\times10^{-3}$ to about $1\times10^{-4}$, or about $5\times10^{-4}$. The light source of the illumination module may be configured to have a stabilization time of less than 1 min, less than 1 s, less than 1 ms, or about 0 s.

Spectrometer Using Secondary Emission Illumination with Filter-Based Optics

Figure 4:
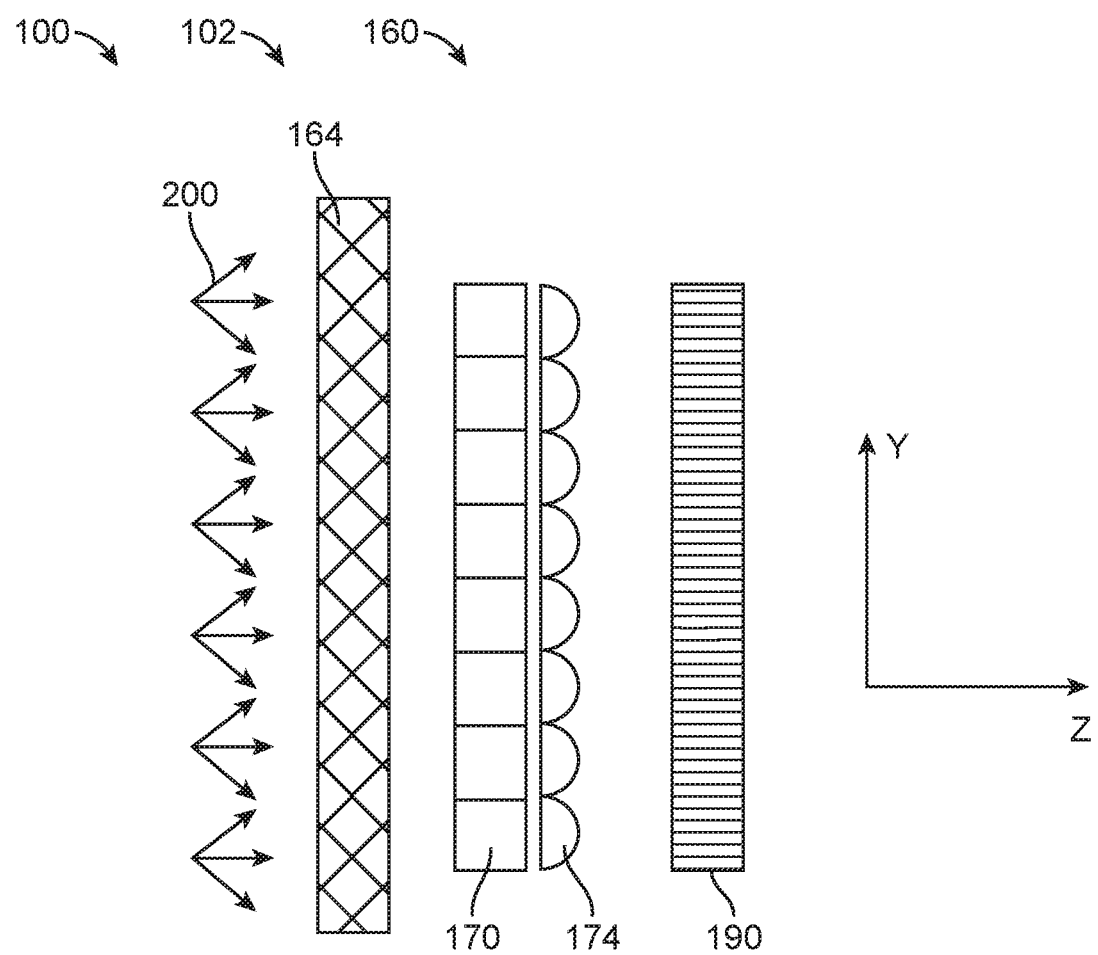
FIG. 4 shows a schematic diagram of an optical layout in accordance with configurations.

Reference is now made to FIG. 4, which illustrates non-limiting configurations of the compact spectrometer system 100 herein disclosed. The system comprises a spectrometer 102, which comprises various modules such as a spectrometer module 160. As illustrated, the spectrometer module 160 may comprise a diffuser 164, a filter matrix 170, a lens array 174 and a detector 190.

The spectrometer system may comprise a plurality of optical filters of filter matrix 170. The optical filter can be of any type known in the art. Non-limiting examples of suitable optical filters include Fabry-Perot (FP) resonators, cascaded FP resonators, and interference filters. For example, a narrow bandpass filter (≤10 nm) with a wide blocking range outside of the transmission band (at least 200 nm) can be used. The center wavelength (CWL) of the filter can vary with the incident angle of the light impinging upon it.

The central wavelength of the central band can vary by 10 nm or more, such that the effective range of wavelengths passed with the filter is greater than the bandwidth of the filter. In many instances, the central wavelength varies by an amount greater than the bandwidth of the filter. For example, the bandpass filter can have a bandwidth of no more than 10 nm and the wavelength of the central band can vary by more than 10 nm across the field of view of the sensor.

The spectrometer system may comprise a filter matrix. The filter matrix can comprise one or more filters, for example a plurality of filters. The use of a single filter can limit the spectral range available to the spectrometer. A filter can be an element that only permits transmission of a light signal with a predetermined incident angle, polarization, wavelength, and/or other property. For example, if the angle of incidence of light is larger than 30°, the system may not produce a signal of sufficient intensity due to lens aberrations and the decrease in the efficiency of the detector at large angles. For an angular range of 30° and an optical filter center wavelength (CWL) of ~850 nm, the spectral range available to the spectrometer can be about 35 nm, for example. As this range can be insufficient for some spectroscopy based applications, configurations with larger spectral ranges may comprise an optical filter matrix composed of a plurality of sub-filters. Each sub-filter can have a different CWL and thus covers a different part of the optical spectrum. The sub-filters can be configured in one or more of many ways and be tiled in two dimensions, for example.

Depending on the number of sub-filters, the wavelength range accessible to the spectrometer can reach hundreds of nanometers. In configurations comprising a plurality of sub-filters, the approximate Fourier transforms formed at the image plane (i.e. one per sub-filter) overlap, and the signal obtained at any particular pixel of the detector can result from a mixture of the different Fourier transforms.

The filter matrixes may be arranged in a specific order to inhibit cross talk on the detector of light emerging from different filters and to minimize the effect of stray light. For example, if the matrix is composed of 3×4 filters then there are 2 filters located at the interior of the matrix and 10 filters at the periphery of the matrix. The 2 filters at the interior can be selected to be those at the edges of the wavelength range. Without being bound by a particular theory, the selected inner filters may experience the most spatial cross-talk but be the least sensitive to cross-talk spectrally.

The spectrometer module may comprise a lens array 174. The lens array can comprise a plurality of lenses. The number of lenses in the plurality of lenses can be determined such that each filter of the filter array corresponds to a lens of the lens array. Alternatively or in combination, the number of lenses can be determined such that each channel through the support array corresponds to a lens of the lens array. Alternatively or in combination, the number of lenses can be selected such that each region of the plurality of regions of the image sensor corresponds to an optical channel and corresponding lens of the lens array and filter of the filter array.

The spectrometer system may comprise a detector 190, which may comprise an array of sensors. In many cases, the detector is capable of detecting light in the wavelength range of interest. The compact spectrometer system disclosed herein can be used from the UV to the IR, depending on the nature of the spectrum being obtained and the particular spectral properties of the sample being tested. The detector can be sensitive to one or more of ultraviolet wavelengths of light, visible wavelengths of light, or infrared wavelengths of light. In some cases, a detector that is capable of measuring intensity as a function of position (e.g. an array detector or a two-dimensional image sensor) is used.

In some instances the spectrometer does not comprise a cylindrical beam volume hologram (CVBH).

The detector can be located in a predetermined plane. The predetermined plane can be the focal plane of the lens array. Light of different wavelengths (X1, X2, X3, X4, etc.) can arrive at the detector as a series of substantially concentric circles of different radii proportional to the wavelength. The relationship between the wavelength and the radius of the corresponding circle may not be linear.

The detector may receive non-continuous spectra, for example spectra that can be unlike a dispersive element would create. The non-continuous spectra can be missing parts of the spectrum. The non-continuous spectrum can have the wavelengths of the spectra at least in part spatially out of order, for example. In some cases, first short wavelengths contact the detector near longer wavelengths, and second short wavelengths contact the detector at distances further away from the first short wavelengths than the longer wavelengths.

The detector may comprise a plurality of detector elements, such as pixels for example. Each detector element may be configured so as to receive signals of a broad spectral range. The spectral range received on a first and second pluralities of detector elements may extend at least from about 10 nm to about 400 nm. In many instances, spectral range received on the first and second pluralities of detector elements may extend at least from about 10 nm to about 700 nm. In many instances, spectral range received on the first and second pluralities of detector elements may extend at least from about 10 nm to about 1600 nm. In many instances, spectral range received on the first and second pluralities of detector elements may extend at least from about 400 nm to about 1600 nm. In many instances, spectral range received on the first and second pluralities of detector elements may extend at least from about 700 nm to about 1600 nm.

The spectrometer system may comprise a diffuser. In configurations in which the light emanating from the sample is not sufficiently diffuse, a diffuser can be placed in front of other elements of the spectrometer. The diffuser can be placed in a light path between a light emission and a detector and/or filter. Collimated (or partially collimated light) can impinge on the diffuser, which then produces diffuse light which then impinges on other aspects of the spectrometer, e.g. an optical filter.

In many cases, the lens array, the filter matrix, and the detector are not centered on a common optical axis. In many cases, the lens array, the filter matrix, and the detector are aligned on a common optical axis.

The principle of operation of compact spectrometer may comprise one or more of the following attributes. Light impinges upon the diffuser and at least a fraction of the light is transmitted through the diffuser. The light next impinges upon the filter matrix at a wide range of propagation angles and the spectrum of light passing through the sub-filters is angularly encoded. The angularly encoded light then passes through the lens array (e.g. Fourier transform focusing elements) which performs (approximately) a spatial Fourier transform of the angle-encoded light, transforming it into a spatially-encoded spectrum. Finally the light reaches the detector. The location of the detector element relative to the optical axis of a lens of the array corresponds to the wavelength of light, and the wavelength of light at a pixel location can be determined based on the location of the pixel relative to the optical axis of the lens of the array. The intensity of light recorded by the detector element such as a pixel as a function of position (e.g. pixel number or coordinate reference location) on the sensor corresponds to the resolved wavelengths of the light for that position.

In some cases, an additional filter is placed in front of the compact spectrometer system in order to block light outside of the spectral range of interest (i.e. to prevent unwanted light from reaching the detector).

In configurations in which the spectral range covered by the optical filters is insufficient, additional sub-filters with differing CWLs can be used.

In some instances, shutters allow for the inclusion or exclusion of light from part of the spectrometer 102. For example, shutters can be used to exclude particular sub-filters. Shutters may also be used to exclude individual lens.

Figure 5:
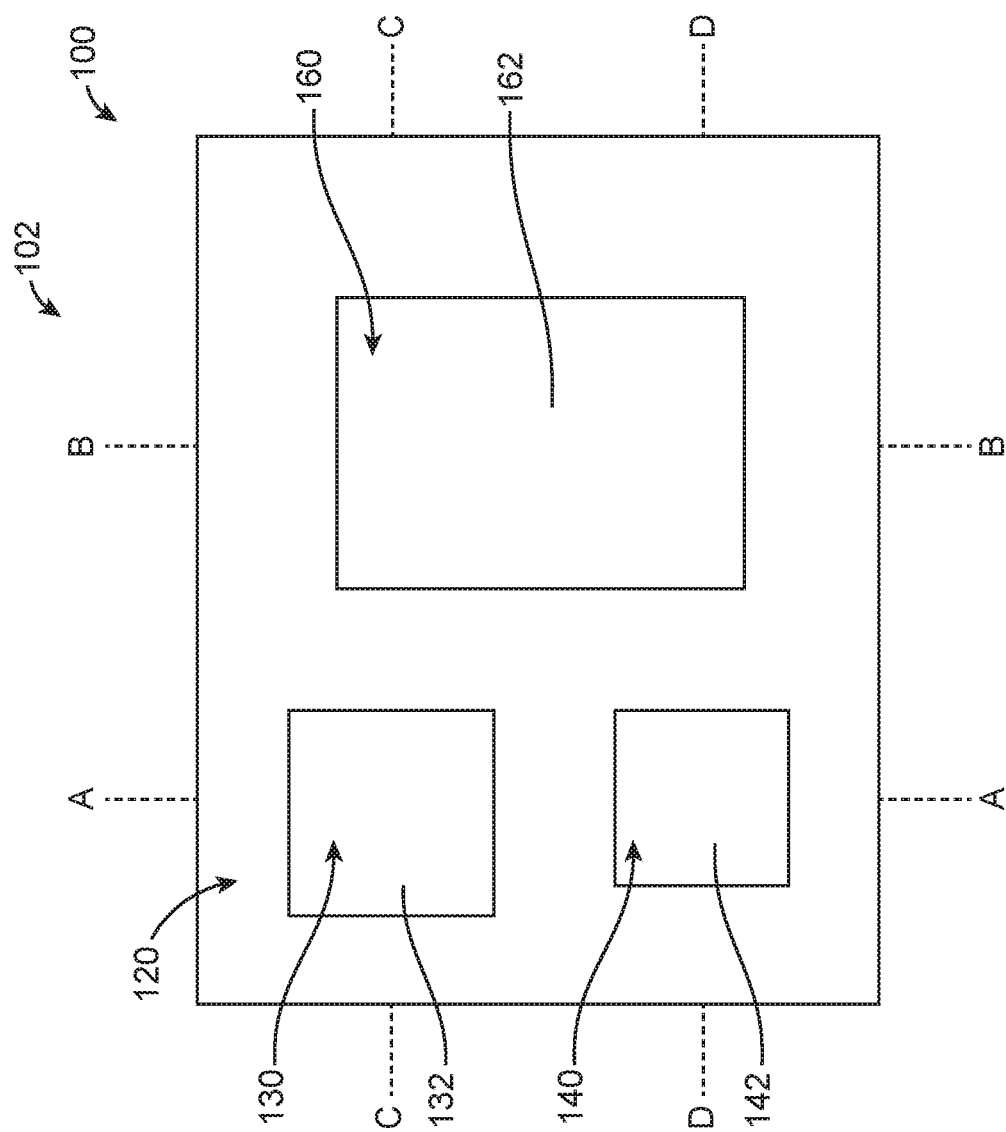
FIG. 5 shows a schematic diagram of a spectrometer head, in accordance with configurations.

FIG. 5 shows a schematic diagram of spectrometer head in accordance with configurations. In many cases, the spectrometer 102 comprises a spectrometer head 120. The spectrometer head comprises one or more of a spectrometer module 160, a temperature sensor module 130, and an illumination module 140. Each module, when present, can be covered with a module window. For example, the spectrometer module 160 can comprise a spectrometer window 162, the temperature sensor module 130 can comprise a sensor window 132, and the illumination module 140 can comprise an illumination window 142.

The illumination module and the spectrometer module may be configured to have overlapping fields of view at the sample. The overlapping fields of view can be provided in one or more of many ways. For example, the optical axes of the illumination source, the temperature sensor and the matrix array can extend in a substantially parallel configuration. Alternatively, one or more of the optical axes can be oriented toward another optical axis of another module.

Figure 6:
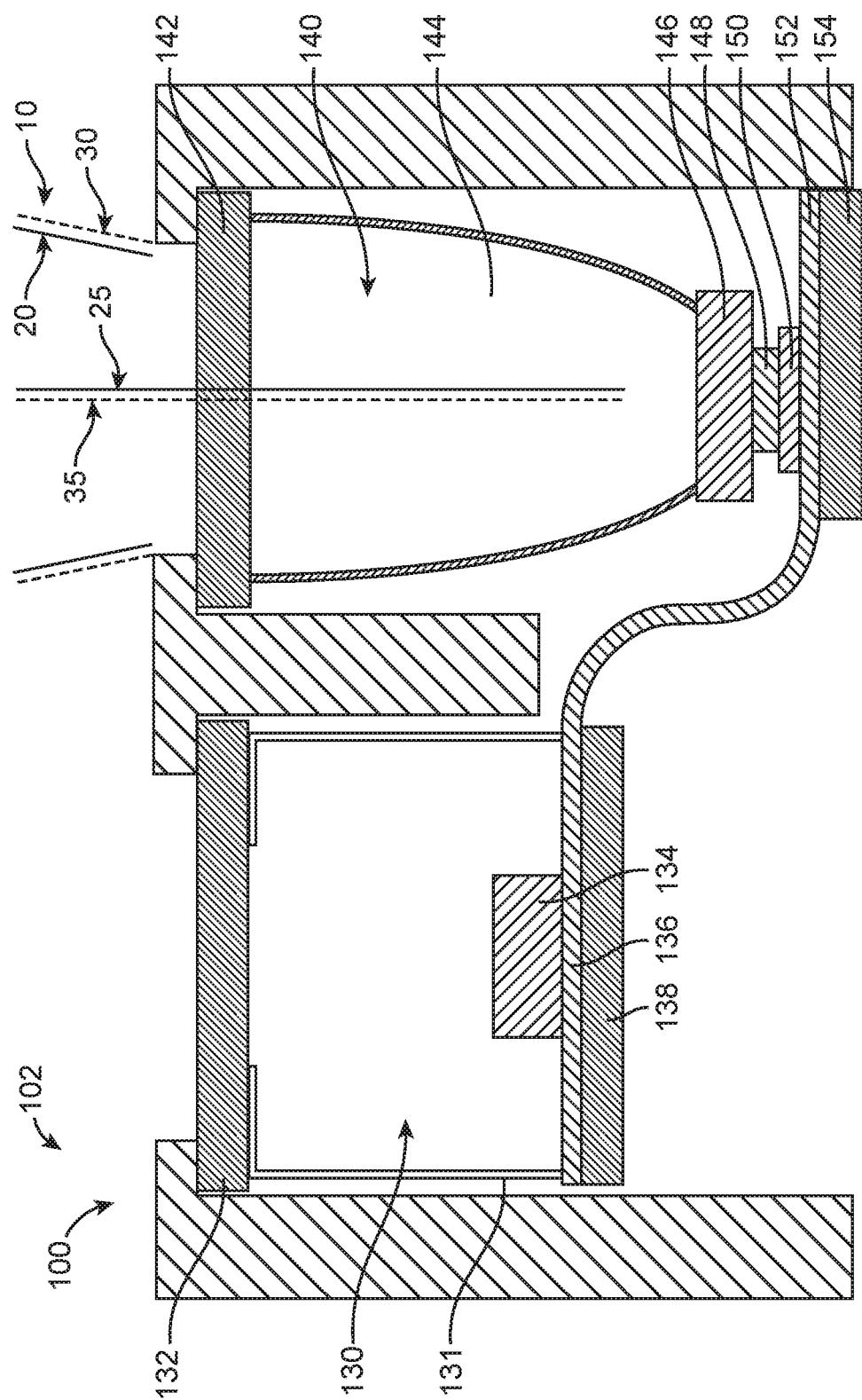
FIG. 6 shows a schematic drawing of cross-section A of the spectrometer head of FIG. 5, in accordance with configurations.

FIG. 6 shows a schematic drawing of cross-section A of the spectrometer head of FIG. 3, in accordance with configurations. In order to lessen the noise and/or spectral shift produced from fluctuations in temperature, a spectrometer head 120 comprising a temperature sensor module 130 can be used to measure and record the temperature during the measurement. The temperature sensor element can measure the temperature of the sample in response to infrared radiation emitted from the sample, and transmit the temperature measurement to a processor. Accurate and/or precise temperature measurement can be used to standardize or modify the spectrum produced. For example, different spectra of a given sample can be measured based on the temperature at which the spectrum was taken. A spectrum can be stored with metadata relating to the temperature at which the spectrum was measure. The temperature sensor module 130 may comprise a temperature sensor window 132. The temperature sensor window can seal the sensor module. The temperature sensor window 132 can be made of material that is substantially non-transmissive to visible light and transmits light in the infrared spectrum. The temperature sensor window 132 may comprise germanium, for example. The temperature sensor window can be about 0.2, 0.3, 0.4, 0.5, 0.6, 0.7, 0.8, 0.9 or 1.0 mm thick.

The temperature sensor can comprise a field of view (herein after "FoV") limiter. In many instances, the temperature sensor has a field of view oriented to overlap with a field of view of the detector and a field of view of an illuminator. For example, the field of view can be limited by an aperture formed in a material supporting the window 132 of temperature sensor module and the dimensions of the temperature sensor 134. In some instances, the temperature sensor module has a limited field of view and comprises a heat conductive metal cage disposed on a flex printed circuit board (PCB) 136. The PCB 136 can be mounted on a stiffener 138 in order to inhibit movement relative to the other modules on the sensor head. The flexible circuit board may be backed by stiffener 138 comprising a metal. The temperature sensor 134 can be a remote temperature sensor. The temperature sensor can give a temperature that is accurate to within about 5, 4, 3, 2, 1, 0.7, 0.4, 0.3, 0.2 or 0.1 degree Celsius of the ambient temperature of the sample. The temperature sensor may measure the ambient temperature with precision to 3, 2, 1, 0.5, or 0.1 degree Celsius.

The spectrometer head may comprise an illumination module 140. The illumination module can illuminate a sample with light. In some instances, the illumination module comprises an illumination window 142. The illumination window can seal the illumination module. The illumination window can be substantially transmissive to the light produced in the illumination module. For example, the illumination window can comprise glass. The illumination module can comprise a light source 148. The light source can comprise one or more light emitting diodes (LED). For example, the light source may comprise a blue LED, red LED, green LED, infrared LED, or a combination thereof.

The light source 148 can be mounted on a mounting fixture 150. The mounting fixture may comprise a ceramic package. For example, the light fixture can be a flip-chip LED die mounted on a ceramic package. The mounting fixture 150 can be attached to a flexible printed circuit board (PCB) 152 which can optionally be mounted on a stiffener 154 to reduce movement of the illumination module. The flex PCB of the illumination module and the PCT of temperature sensor modules may comprise different portions of the same flex PCB, which may also comprise portions of spectrometer PCB.

The wavelength of the light produced by the light source 148 can be shifted by a plate 146. Plate 146 can be a wavelength shifting plate. Plate 146 may comprise phosphor embedded in glass. Alternatively or in combination, plate 146 can comprise a nano-crystal, a quantum dot, or combinations thereof. The plate can absorb light from the light source and release light having a frequency lower than the frequency of the absorbed light. In some cases, a light source produces visible light, and plate 146 absorbs the light and emits near infrared light. The light source may be in close proximity to or directly touching the plate 146. The light source and associated packaging may be separated from the plate by a gap to limit heat transfer. For example, the gap between the light source and the plate can be at least 0.1, 0.2, 0.3, 0.4, 0.5, 0.6, 0.7, 0.8, 0.9, 1.0, 1.5, 2.0, 2.5, 3.0, 3.5, 4.0, 5.0, 6.0, 7.0, 8.0, 9.0, or 10.0 mm. Alternatively, the light source packaging may touch the plate 146 in order to conduct heat from the plate such that the light source packaging comprises a heat sink.

The illumination module can further comprise a light concentrator such as a parabolic concentrator 144 or a condenser lens in order to concentrate the light. The parabolic concentrator 144 may be a reflector. The parabolic concentrator 144 may comprise stainless steel or gold-plated stainless steel. The concentrator can concentrate light to a cone. For example, the light can be concentrated to a cone with a field of view of about 30-45, 25-50, or 20-55 degrees.

The illumination module may be configured to transmit light and the spectrometer module may be configured to receive light along optical paths extending substantially perpendicular to an entrance face of the spectrometer head. The modules can be configured such that light can be transmitted from one module to an object (such as a sample S) and reflected or scattered to another module which receives the light.

The optical axes of the illumination module and the spectrometer module may be configured to be non-parallel such that the optical axis representing the spectrometer module is at an offset angle to the optical axis of the illumination module. This non-parallel configuration can be provided in one or more of many ways. For example, one or more components can be supported on a common support and offset in relation to an optic such as a lens in order to orient one or more optical axes toward each other. Alternatively or in combination, a module can be angularly inclined with respect to another module. The optical axis of each module may be aligned at an offset angle of greater than 1, 2, 3, 4, 5, 6, 7, 8, 9, 10, 12, 14, 16, 18, 20, 25, 30, 35, 40, 45, or 50 degrees. The illumination module and the spectrometer module may be configured to be aligned at an offset angle of less than 1, 2, 3, 4, 5, 6, 7, 8, 9, 10, 12, 14, 16, 18, 20, 25, 30, 35, 40, 45, or 50 degrees. The illumination module and the spectrometer module can be configured to be aligned at an offset angle between than 1-10, 11-20, 21-30, 31-40 or 41-50 degrees. The offset angle of the modules may be set firmly and not adjustable, or the offset angle may adjustable. The offset angle of the modules may be automatically selected based on the distance of the spectrometer head from the sample. Two modules may have parallel optical axes. Two or more modules may have offset optical axes. In some instances, the modules can have optical axes offset such that they converge on a sample. The modules can have optical axes offset such that they converge at a set distance. For example, the modules can have optical axes offset such that they converge at a distance of about 10, 20, 30, 40, 50, 60, 70, 80, 90, 100, 150, 200, 250, 300, 350, 400, or 500 mm away.

Figure 7:
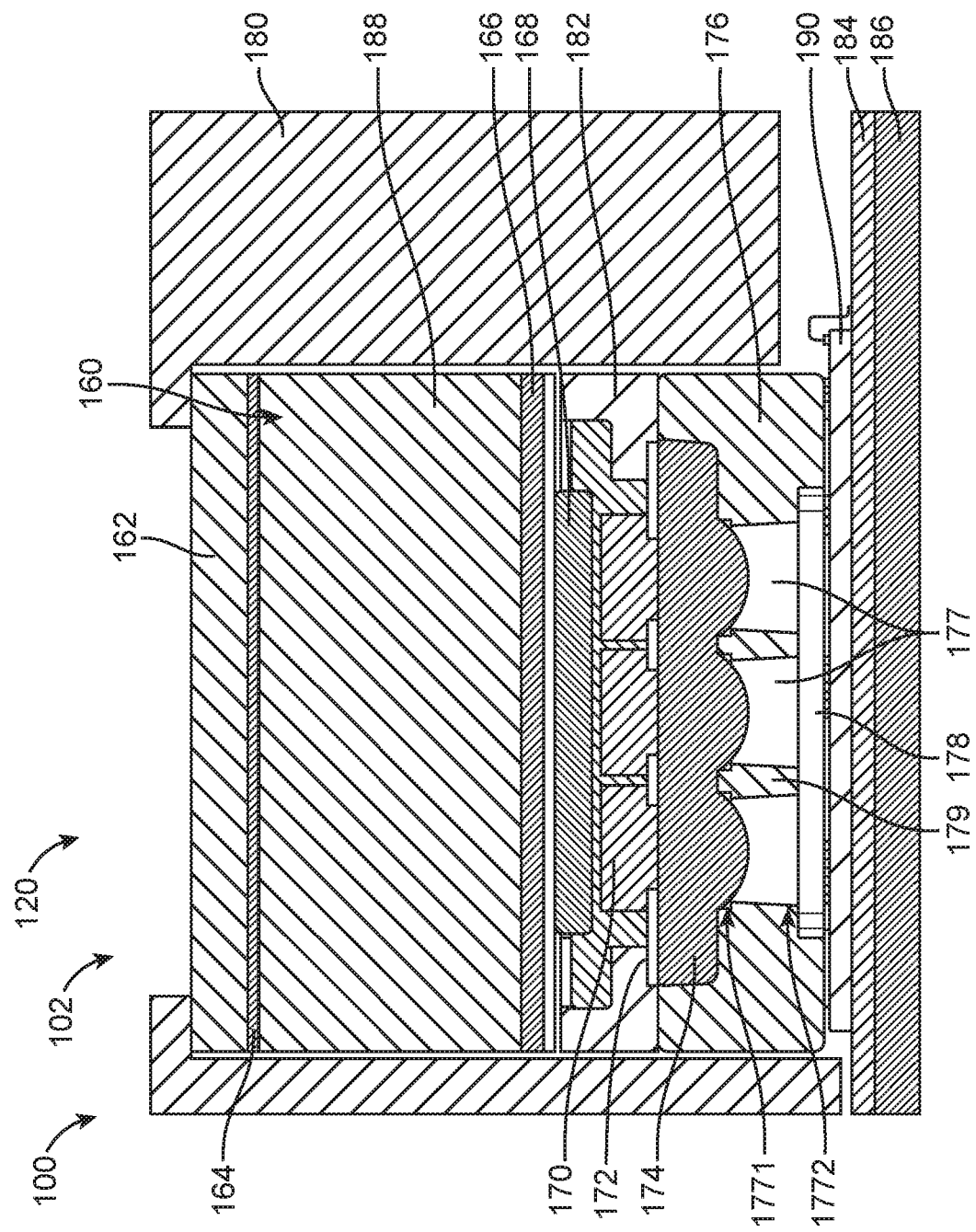
FIG. 7 shows a schematic drawing of cross-section B of the spectrometer head of FIG. 5, in accordance with configurations.

FIG. 7 shows a schematic drawing of cross-section B of the spectrometer head of FIGS. 3 and 4, in accordance with configurations. The spectrometer head 120 may comprise spectrometer module 160. The spectrometer module can be sealed by a spectrometer window 162. The spectrometer window 162 may be selectively transmissive to light with respect to the wavelength in order to analyze the spectral sample. For example, spectrometer window 162 can be an IR-pass filter. In some instances, the window 162 can be glass. The spectrometer module can comprise one or more diffusers. For example, the spectrometer module can comprise a first diffuser 164 disposed below the spectrometer window 162. The first diffuser 164 can distribute the incoming light. For example, the first diffuser can be a cosine diffuser. Optionally, the spectrometer module may comprise a light filter 188. Light filter 188 can be a thick IR-pass filter. For example, filter 188 can absorb light below a threshold wavelength. Filter 188 can absorb light with a wavelength below about 1000, 950, 900, 850, 800, 750, 700, 650, or 600 nm. The spectrometer module may further comprise a second diffuser 166. The second diffuser can generate Lambertian light distribution at the input of the filter matrix 170. The filter assembly can be sealed by a glass plate 168. Alternatively or in combination, the filter assembly can be further supported by a filter frame 182, which can attach the filter assembly to the spectrometer housing 180. The spectrometer housing 180 can hold the spectrometer window 162 in place and further provide mechanical stability to the module.

The first filter and the second filter can be arranged in one or more of many ways to provide a substantially uniform light distribution to the filters. The substantially uniform light distribution can be uniform with respect to an average energy to within about 25%, for example to within about 10%, for example. The first diffuser may distribute the incident light energy spatially on the second diffuser with a substantially uniform energy distribution profile. The first diffuser may make the light substantially homogenous with respect to angular distribution. The second diffuser can further diffuse the light energy of the substantially uniform energy distribution profile to a substantially uniform angular distribution profile, such that the light transmitted to each filter can be substantially homogenous both with respect to the spatial distribution profile and the angular distribution profile of the light energy incident on each filter. For example, the angular distribution profile of light energy onto each filter can be uniform to within about +/−25%, for example substantially uniform to within about +/−10%.

The spectrometer module comprises a filter matrix 170. The filter matrix can comprise one or more filters. In many instances, the filter matrix comprises a plurality of filters.

In some instances, each filter of the filter matrix 170 is configured to transmit a range of wavelengths distributed about a central wavelength. The range of wavelengths can be defined as a full width half maximum (hereinafter "FWHM") of the distribution of transmitted wavelengths for a light beam transmitted substantially normal to the surface of the filter as will be understood by a person of ordinary skill in the art. A wavelength range can be defined by a central wavelength and by a spectral width. The central wavelength can be the mean wavelength of light transmitted through the filter, and the band spectral width of a filter can be the difference between the maximum and the minimum wavelength of light transmitted through the filter. Each filter of the plurality of filters may be configured to transmit a range of wavelengths different from other filters of the plurality. The range of wavelengths overlaps with ranges of said other filters of the plurality and wherein said each filter comprises a central wavelength different from said other filters of the plurality.

The filter array comprises a substrate having a thickness and a first side and a second side, the first side oriented toward the diffuser, the second side oriented toward the lens array. In some instances, each filter of the filter array comprises a substrate having a thickness and a first side and a second side, the first side oriented toward the diffuser, the second side oriented toward the lens array. The filter array can comprise one or more coatings on the first side, on the second side, or a combination thereof. Each filter of the filter array can comprise one or more coatings on the first side, on the second side, or a combination thereof. In some instances, each filter of the filter array comprises one or more coatings on the second side, oriented toward the lens array. In some instances, each filter of the filter array comprises one or more coatings on the second side, oriented toward the lens array and on the first side, oriented toward the diffuser. The one or more coatings on the second side can be an optical filter. For example, the one or more coatings can permit a wavelength range to selectively pass through the filter. Alternatively or in combination, the one or more coatings can be used to inhibit cross-talk among lenses of the array. In some instances, the plurality of coatings on the second side comprises a plurality of interference filters, said each of the plurality of interference filters on the second side configured to transmit a central wavelength of light to one lens of the plurality of lenses. In some instances, the filter array comprises one or more coatings on the first side of the filter array. The one or more coatings on the first side of the array can comprise a coating to balance mechanical stress. In some instances, the one or more coatings on the first side of the filter array comprises an optical filter. For example, the optical filter on the first side of the filter array can comprise an IR pass filter to selectively pass infrared light. In many instances, the first side does not comprise a bandpass interference filter coating. In some instances, the first does not comprise a coating.

In many instances, the array of filters comprises a plurality of bandpass interference filters on the second side of the array. The placement of the fine frequency resolving filters on the second side oriented toward the lens array and apertures can inhibit cross-talk among the filters and related noise among the filters. In many instances, the array of filters comprises a plurality of bandpass interference filters on the second side of the array, and does not comprise a bandpass interference filter on the first side of the array.

In many instances, each filter defines an optical channel of the spectrometer. The optical channel can extend from the filter through an aperture and a lens of the array to a region of the sensor array. The plurality of parallel optical channels can provide increased resolution with decreased optical path length.

The spectrometer module can comprise an aperture array 172. The aperture array can prevent cross talk between the filters. The aperture array comprises a plurality of apertures formed in a non-optically transmissive material. In some instances, the plurality of apertures is dimensioned to define a clear lens aperture of each lens of the array, wherein the clear lens aperture of each lens is limited to one filter of the array. In some instances, the clear lens aperture of each lens is limited to one filter of the array.

In many instances the spectrometer module comprises a lens array 174. The lens array can comprise a plurality of lenses. The number of lenses can be determined such that each filter of the filter array corresponds to a lens of the lens array. Alternatively or in combination, the number of lenses can be determined such that each channel through the support array corresponds to a lens of the lens array. Alternatively or in combination, the number of lenses can be selected such that each region of the plurality of regions of the image sensor corresponds to an optical channel and corresponding lens of the lens array and filter of the filter array.

In many instances, each lens of the lens array comprises one or more aspheric surfaces, such that each lens of the lens array comprises an aspherical lens. In many instances, each lens of the lens array comprises two aspheric surfaces. Alternatively or in combination, one or more individual lens of the lens array can have two curved optical surfaces wherein both optical surfaces are substantially convex. Alternatively or in combination, the lenses of the lens array may comprise one or more diffractive optical surfaces.

In many instances, the spectrometer module comprises a support array 176. The support array 176 comprises a plurality of channels 177 defined with a plurality of support structures 179 such as interconnecting annuli. The plurality of channels 177 may define optical channels of the spectrometer. The support structures 179 can comprises stiffness to add rigidity to the support array 176. The support array may comprise a stopper to limit movement and fix the position the lens array in relation to the sensor array. The support array 176 can be configured to support the lens array 174 and fix the distance from the lens array to the sensor array in order to fix the distance between the lens array and the sensor array at the focal length of the lenses of the lens array. In many instances, the lenses of the array comprise substantially the same focal length such that the lens array and the sensor array are arranged in a substantially parallel configuration.

The support array 176 can extend between the lens array 174 and the stopper mounting 178. The support array 176 can serve one or more purposes, such as 1) providing the correct separation distance between each lens of lens array 170 and each region of the plurality of regions of the image sensor 190, and/or 2) preventing stray light from entering or exiting each channel, for example. In some instances, the height of each support in support array 176 is calibrated to the focal length of the lens within lens array 174 that it supports. In some instances, the support array 176 is constructed from a material that does not permit light to pass such as substantially opaque plastic. In some instances, support array 176 is black, or comprises a black coating to further reduce cross talk between channels. The spectrometer module can further comprise a stopper mounting 178 to support the support array. In many instances, the support array comprises an absorbing and/or diffusive material to reduce stray light, for example.

In many instances, the support array 176 comprises a plurality of channels having the optical channels of the filters and lenses extending therethrough. In some instances, the support array comprise a single piece of material extending from the lens array to the detector (i.e. CCD or CMOS array).

The lens array can be directly attached to the aperture array 172, or can be separated by an air gap of at least 1, 2, 3, 4, 5, 6, 7, 8, 9, 10, 12, 14, 16, 18, 20, 30, 40, or 50 micrometers. The lens array can be directly on top of the support array 178. Alternatively or in combination, the lens array can be positioned such that each lens is substantially aligned with a single support stopper or a single optical isolator in order to isolate the optical channels and inhibit cross-talk. In some instances, the lens array is positioned to be at a distance approximately equal to the focal length of the lens away from the image sensor, such that light coming from each lens is substantially focused on the image sensor.

In some instances, the spectrometer module comprises an image sensor 190. The image sensor can be a light detector. For example, the image sensor can be a CCD or 2D CMOS or other sensor, for example. The detector can comprise a plurality of regions, each region of said plurality of regions comprising multiple sensors. For example, a detector can be made up of multiple regions, wherein each region is a set of pixels of a 2D CMOS. The detector, or image sensor 190, can be positioned such that each region of the plurality of regions is directly beneath a different channel of support array 176. In many instances, an isolated light path is established from a single of filter of filter array 170 to a single aperture of aperture array 172 to a single lens of lens array 174 to a single stopper channel of support array 176 to a single region of the plurality of regions of image sensor 190. Similarly, a parallel light path can be established for each filter of the filter array 170, such that there are an equal number of parallel (non-intersecting) light paths as there are filters in filter array 170.

The image sensor 190 can be mounted on a flexible printed circuit board (PCB) 184. The PCB 184 can be attached to a stiffener 186. In some instances, the stiffener comprises a metal stiffener to prevent motion of the spectrometer module relative to the spectrometer head 120.

Figure 8:
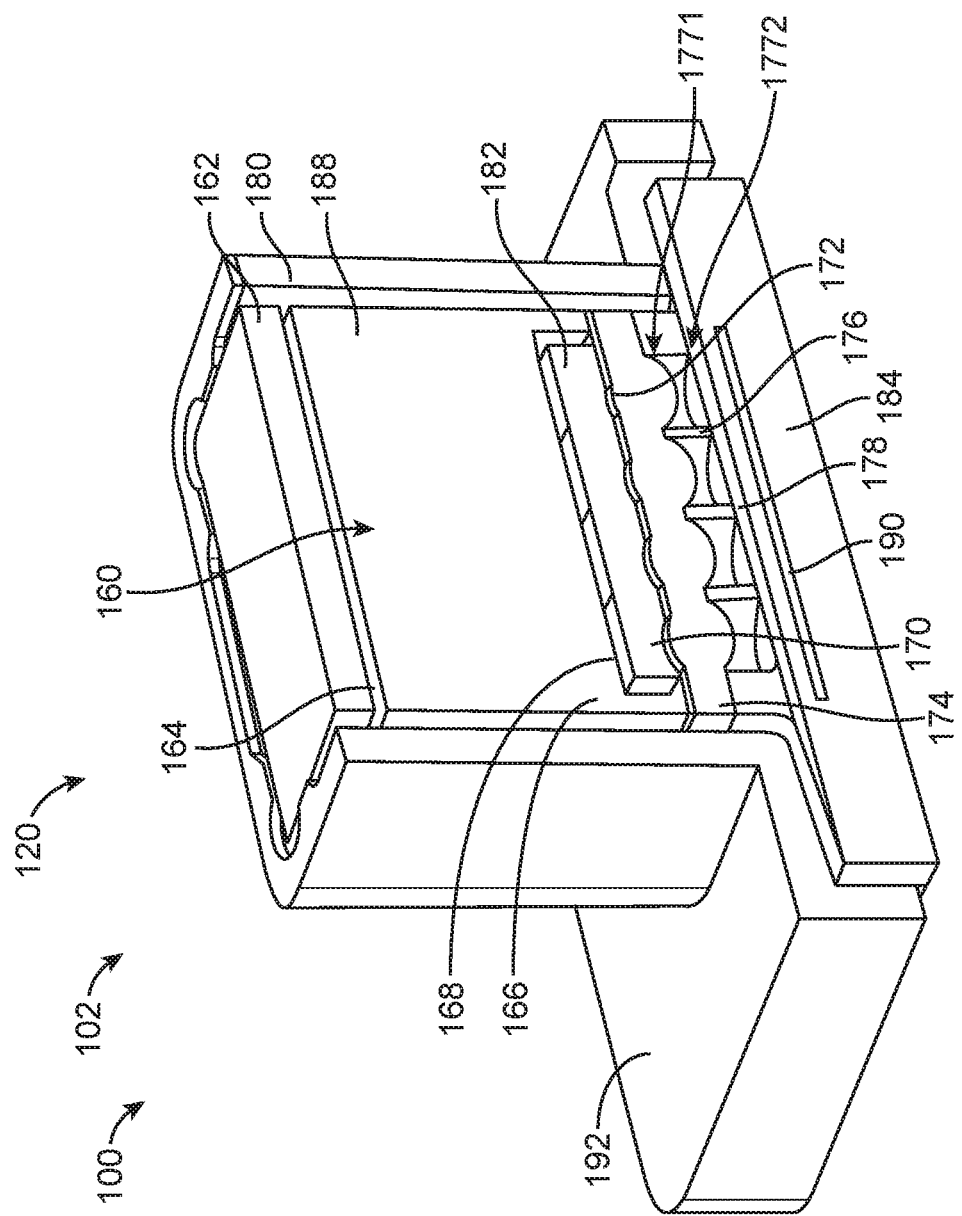
FIG. 8 shows an isometric view of a spectrometer module in accordance with configurations.

FIG. 8 shows an isometric view of a spectrometer module 160 in accordance with configurations. The spectrometer module 160 comprises many components as described herein. In many instances, the support array 176 can be positioned on a package on top of the sensor. In many instances, the support array can be positioned over the top of the bare die of the sensor array such that an air gap is present. The air gap can be less than 10, 9, 8, 7, 6, 5, 4, 3, 2 or 1 micrometer(s).

Figure 9:
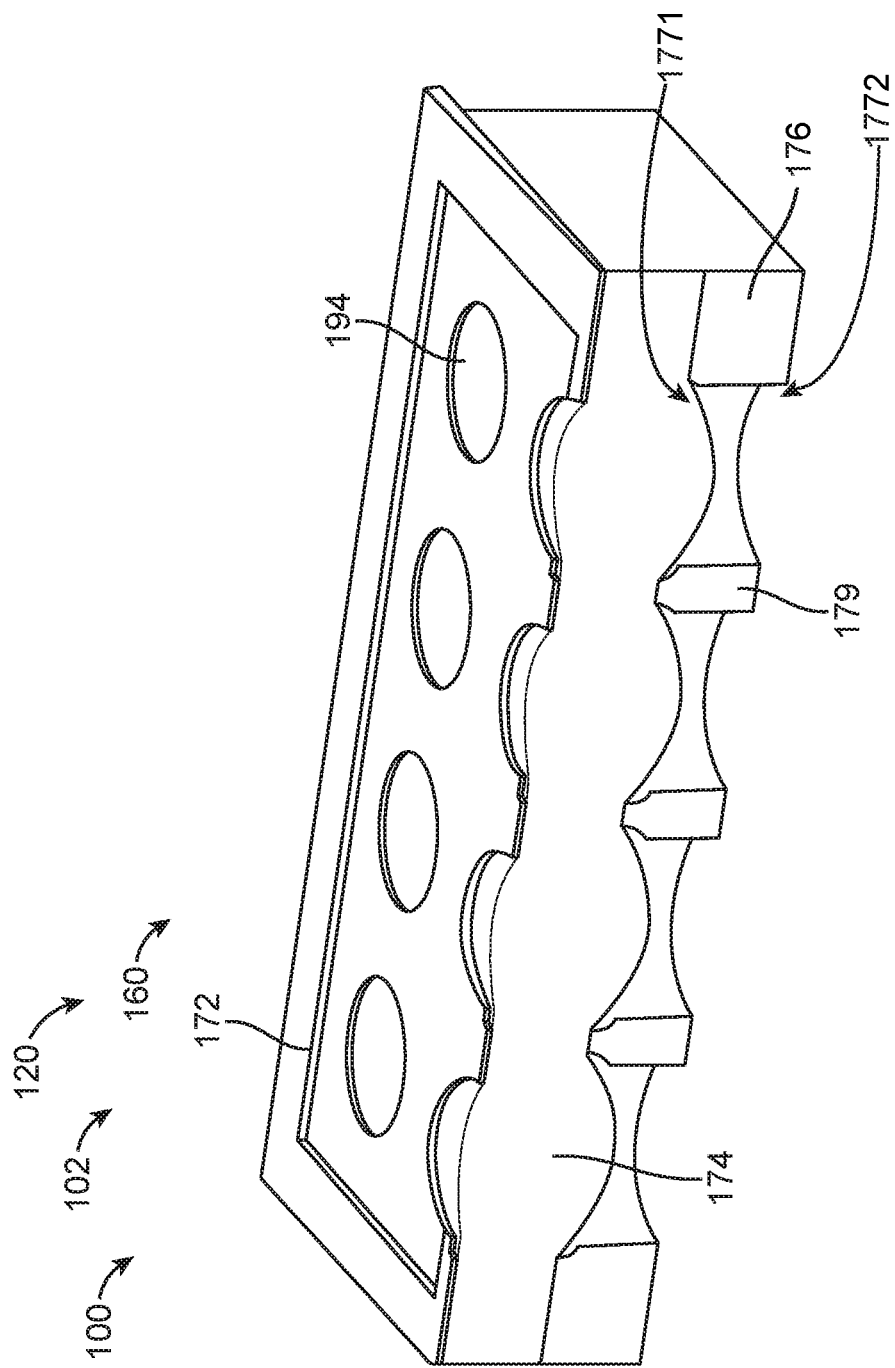
FIG. 9 shows the lens array within the spectrometer module, in accordance with configurations.

FIG. 9 shows the lens array 174 within the spectrometer module 160, in accordance with configurations. This isometric view shows the apertures 194 formed in a non-transmissive material of the aperture array 172 in accordance with configurations. In many instances, each channel of the support array 176 is aligned with a filter of the filter array 170, a lens of the lens array 174, and an aperture 194 of the aperture array in order to form a plurality of light paths with inhibited cross talk.

The glass-embedded phosphor of plate 146 may be a near-infrared (NIR) phosphor, capable of emitting infrared or NIR radiation in the range from about 700 nm to about 1100 nm.

The light filter 188 may be configured to block at least a portion of visible radiation included in the incident light.

In some cases, the first wavelength range of the first filter and the second wavelength range of the second filter fall within a wavelength range of about 400 nm to about 1100 nm. In some instances, the second wavelength range overlaps the first wavelength range by at least 2% of the second wavelength range. In some instances, the second wavelength range overlaps the first wavelength range by an amount of about 1% to about 5% of the second wavelength range. The overlap in the range of wavelengths of the filters may be configured to provide algorithmic correction of the gains across different channels, for example across the outputs of a first filter element and a second filter element.

The coating of the filter array and/or the support array may comprise a black coating configured to absorb most of the light that hits the coated surface. For example, the coating may comprise a coating commercially available from Anoplate (as described on http://www.anoplate.com/capabilities/anoblack_ni.html), Acktar (as described on the world wide web at the Acktar website, www.acktar.com), or Avian Technologies (as described on http://www.aviantechnologies.com/products/coatings/diffuse_black.php), or other comparable coatings.

The stopper and the image sensor may be configured to have matching coefficients of thermal expansion (CTE). For example, the stopper and the image sensor may be configured to have a matching CTE of about 7 $10^{-6}$ $K^{-1}$. In order to match the CTE between the stopper and the image sensor where the stopper and image sensor have different CTEs, a liquid crystal polymer, such as Vectra E130, may be applied between the stopper and the image sensor.

The lens may be configured to introduce some distortion in the output of the lens, in order to improve performance in analyzing the obtained spectral data. The filters described herein may typically allow transmission of a specific wavelength for a specific angle of propagation of the incident light beam. As the light transmitted through the filters pass through the lens, the output of the lens may generate concentric rings on the sensor for different wavelengths of incident light. With typical spherical lens performance, as the angle of incidence grows larger, the concentric ring for that wavelength becomes much thinner (for a typical light bandwidth of ~5 nm). Such variance in the thickness of the rings may cause reduced linearity and related performance in analyzing the spectral data. To overcome this non-linearity, some distortion may be introduced into the lens, so as to reduce the thickness of the rings that correspond to incident light having smaller angles of propagation, and increase the thickness of the rings that correspond to incident light having larger angles of propagation, wherein non-linearity of ring size related to incident angle is decreased. Lenses configured to produce such distortion in the output can produce a more even distribution of ring thicknesses along the supported range of angles of incidence, consequently improving performance in the analysis of the generated spectral data. The distortion can be provided with one or more aspheric lens profiles to increase the depth of field (DoF) and increase the size of the point spread function (PSF) as described herein.

Figure 10:
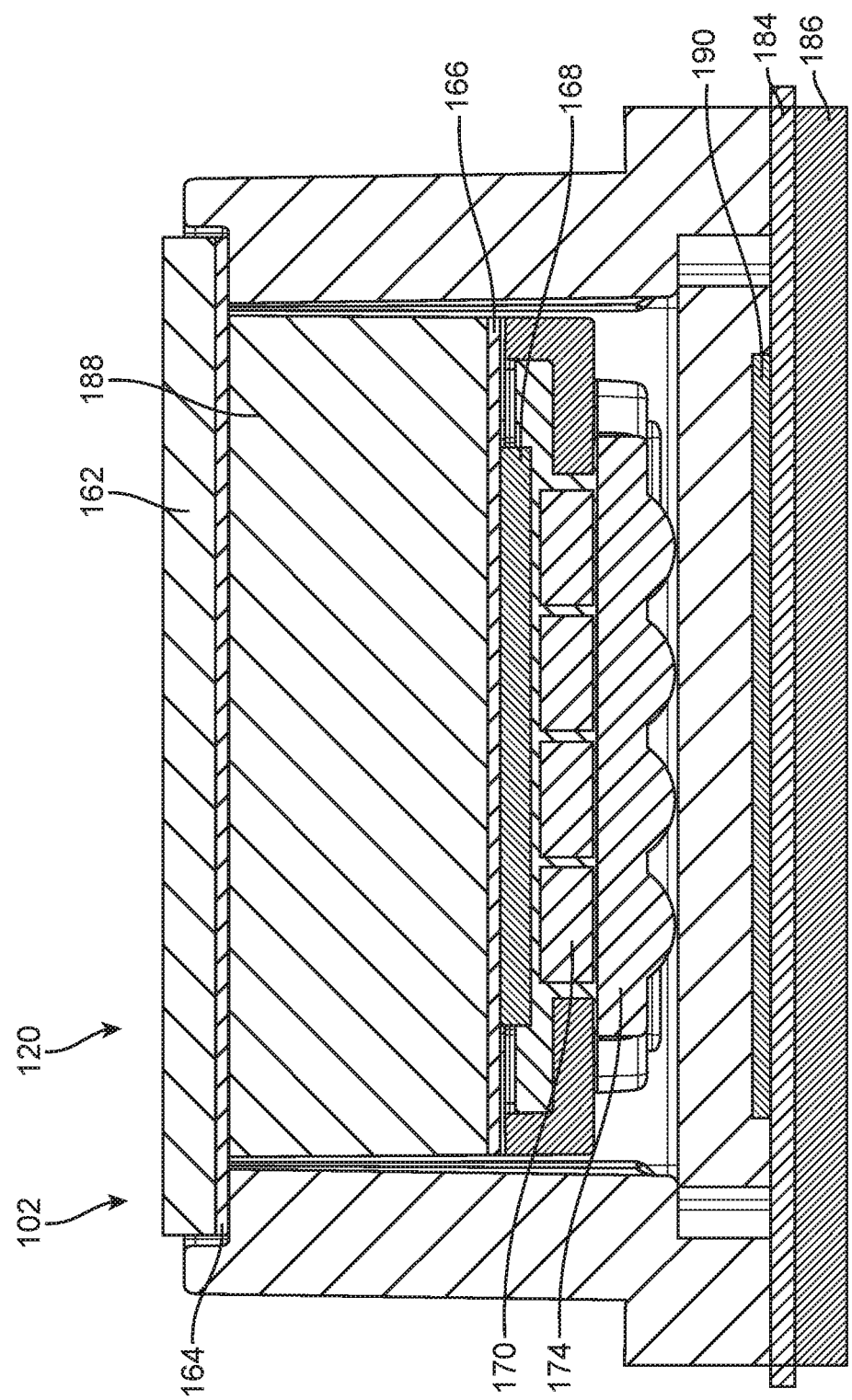
FIG. 10 shows a schematic diagram of an alternative embodiment of the spectrometer head, in accordance with configurations.

FIG. 10 shows a schematic drawing of a cross-section B of an alternative embodiment of the spectrometer head of FIG. 5. In some instances, the spectrometer module may be configured to purposefully induce cross-talk among sensor elements. For example, the spectrometer module may comprise the filter matrix and lens array as shown in FIG. 7, but omit one or more structural features that isolate the optical channels, such as the aperture array 172 or the isolated channels 177 of the support array 176. Without the isolated optical channels, light having a particular wavelength received by the first filter may result in a pattern of non-concentric rings on the detector. In addition, a first range of wavelengths associated with a first filter may partially overlap a second range of wavelengths associated with a second filter. Without the isolated optical channels, at least one feature in the pattern of light output by a first filter may be associated with at least one feature in the pattern of light output by a second filter. For example, when light comprising two different wavelengths, separated by at least five times the spectral resolution of the device, passes through the filter matrix, the light from at least two filters of the filter matrix may impinge on at least one common pixel of the detector. The spectrometer module may further comprise at least one processing device configured to stitch together light output by multiple filters to generate or reconstruct a spectrum associated with the incident light. Inducing cross-talk among sensor elements can have the advantage of increasing signal strength, and of reducing the structural complexity and thereby the cost of the optics.

Referring again to FIG. 6, the illumination module 140 can be configured to produce an optical beam 10, which may comprise a visible aiming beam 20 and a measurement beam 30. The aiming beam 20 and measurement beam 30 may be produced by the same light source 148, which may generate light including visible light. As described herein, the illumination module 140 may comprise a plate 146, such as a phosphor embedded glass plate. The plate may be configured to absorb a portion of the optical beam 10 produced by the light source 148, such that the absorbed light generates an electronic effect resulting in an emission of light with a wavelength different from the wavelength of the absorbed light. Alternatively or in combination, a portion of the optical beam 10 produced by light source 148 may be configured to be transmitted through plate 146 without being absorbed or wavelength-shifted. The unabsorbed, transmitted light can form the visible aiming beam 20, which can help the user visualize of the measurement area of a sample. A portion of the optical beam 10 may be wavelength-shifted by the plate 146 and can form the measurement beam 30, which may comprise light outside the visible spectrum and/or light in the visible spectrum, as described herein. For example, measurement beam 30 may comprise near infrared light. Parabolic concentrator 144 may be arranged to receive the aiming beam 20 and the measurement beam 30 and direct the aiming beam and measurement beam toward a sample material S. As described herein, the aiming beam 20 and measurement beam 30 may be partially or completely overlapping, aligned, or coaxial. For example, the aiming beam 20 may be arranged to be directed along an aiming beam axis 25, while the measurement beam 30 may be arranged to be directed along a measurement beam axis 35, and the aiming beam axis 25 may be co-axial with measurement beam axis 35. The aiming beam and measurement beam may overlap on the sample.

The power or visible light output of the aiming beam 20 may vary depending on the amount of optical beam 10 that is configured to pass through the plate 146 without being absorbed or wavelength-shifted. About 0.1% to about 10%, about 0.5% to about 5%, about 1% to about 4%, or about 2% to about 3% of optical beam 10 may be transmitted through plate 146 without being wavelength-shifted. The transmission of the optical beam 10 through plate 146 may be affected by the thickness of the plate 146. Further, the transmission of the optical beam 10 through plate 146 may be affected by the type of light source 148. For example, different types of light sources can be absorbed by the plate 146 at different efficiencies, consequently affecting the amount of light that is transmitted through the plate 146 without being wavelength-shifted. For a light source 148 comprising a blue LED and a plate 146 comprising phosphor-embedded glass, about 10 mW to about 15 mW (or about 0.4 to about 0.6 lumens) of light may transmit through the plate 146 to form the aiming beam 20. By comparison, light produced by a light source comprising a red LED may not absorb as efficiently by a phosphor-embedded glass plate, and consequently more light, for example about 15 mW to about 30 mW (or about 1 to about 2 lumens) of the light, may transmit through the plate to form the aiming beam 20.

The spectrometer module 160 may comprise one or more filters configured to transmit the measurement beam 30 but inhibit transmission of the aiming beam 20. In many configurations, the spectrometer module comprises one filter, such as light filter 188, configured to inhibit transmission of visible light, thereby inhibiting transmission of portions of the aiming beam 20 and measurement beam 30 reflected from the sample that comprise visible light. In some configurations, the spectrometer module may comprise a plurality of optical filters configured to inhibit transmission of a portion of the aiming beam 20 reflected the sample material S, and to transmit a portion of the measurement beam 30 reflected from the sample. For example, the plurality of optical filters may comprise the optical filters of the filter matrix 170, wherein each filter in the filter matrix 170 corresponds to an optical channel of the plurality of channels 177. Each filter may be configured to inhibit transmission of light within a specific range and/or within a specific angle of incidence, wherein the filtered specific range or specific angle of incidence may be specific to the corresponding channel. In some configurations, each optical channel may comprise a field of view. The field of view of the spectrometer module 160 may hence comprise a plurality of overlapping fields of view of the plurality of optical channels 177. The aiming beam 20 and the measurement beam 30 may overlap with the plurality of overlapping fields of view on the sample S.

Spectrometer Using Multiple Illumination Sources

Figure 11:
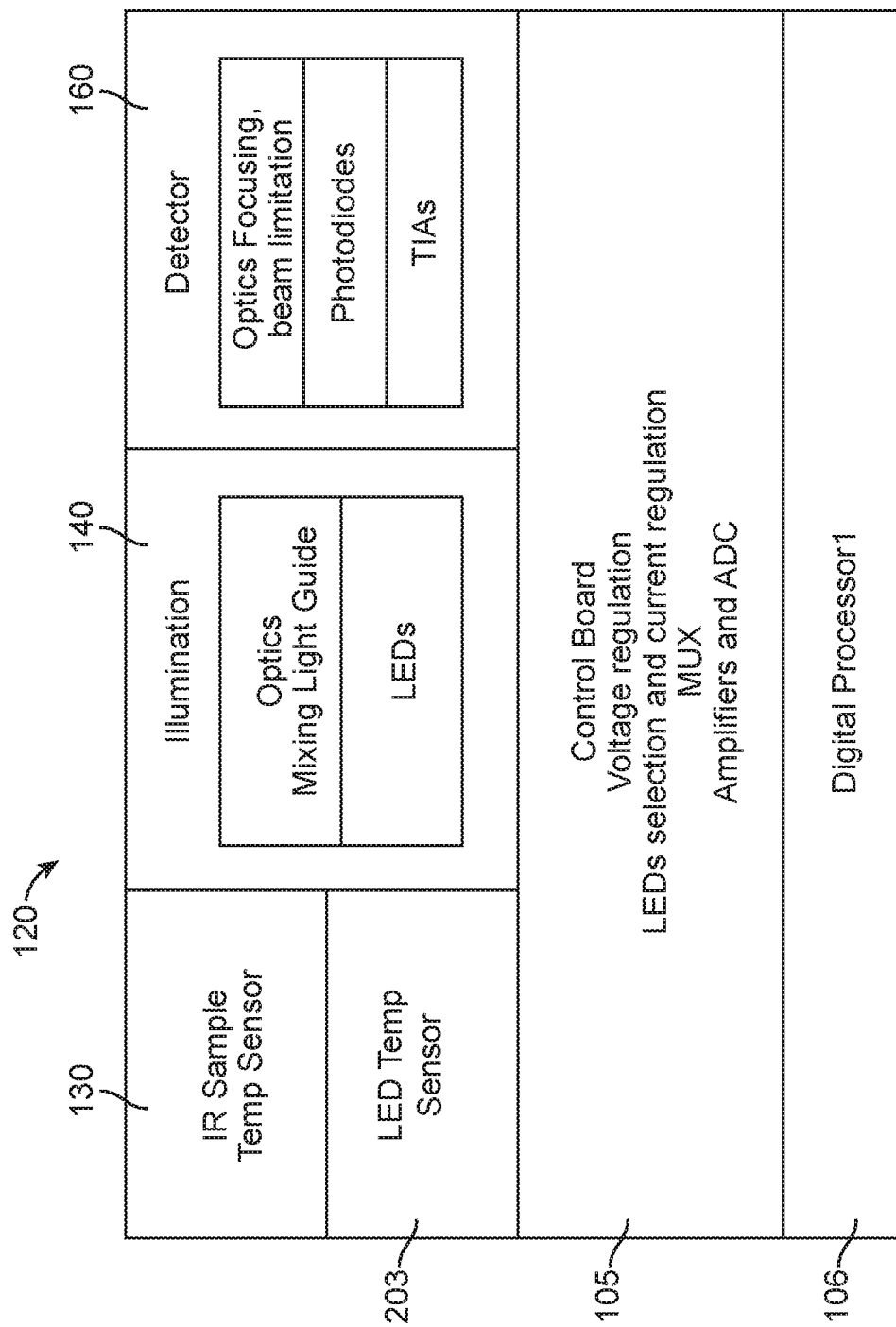
FIG. 11 shows a schematic diagram of an alternative embodiment of the spectrometer head, in accordance with configurations.

FIG. 11 shows a schematic diagram of an alternative embodiment of the spectrometer head 120. The spectrometer head 120 comprises an illumination module 140, a spectrometer module 160, a control board 105, and a processor 106. The spectrometer 102 further comprises a temperature sensor module 130 as described herein, configured to measure and record the temperature of the sample in response to infrared radiation emitted from the sample. In addition to the temperature sensor module 130, the spectrometer 102 may also comprise a separate temperature sensor 203 for measuring the temperature of the light source in the illumination module 140.

Figure 12:
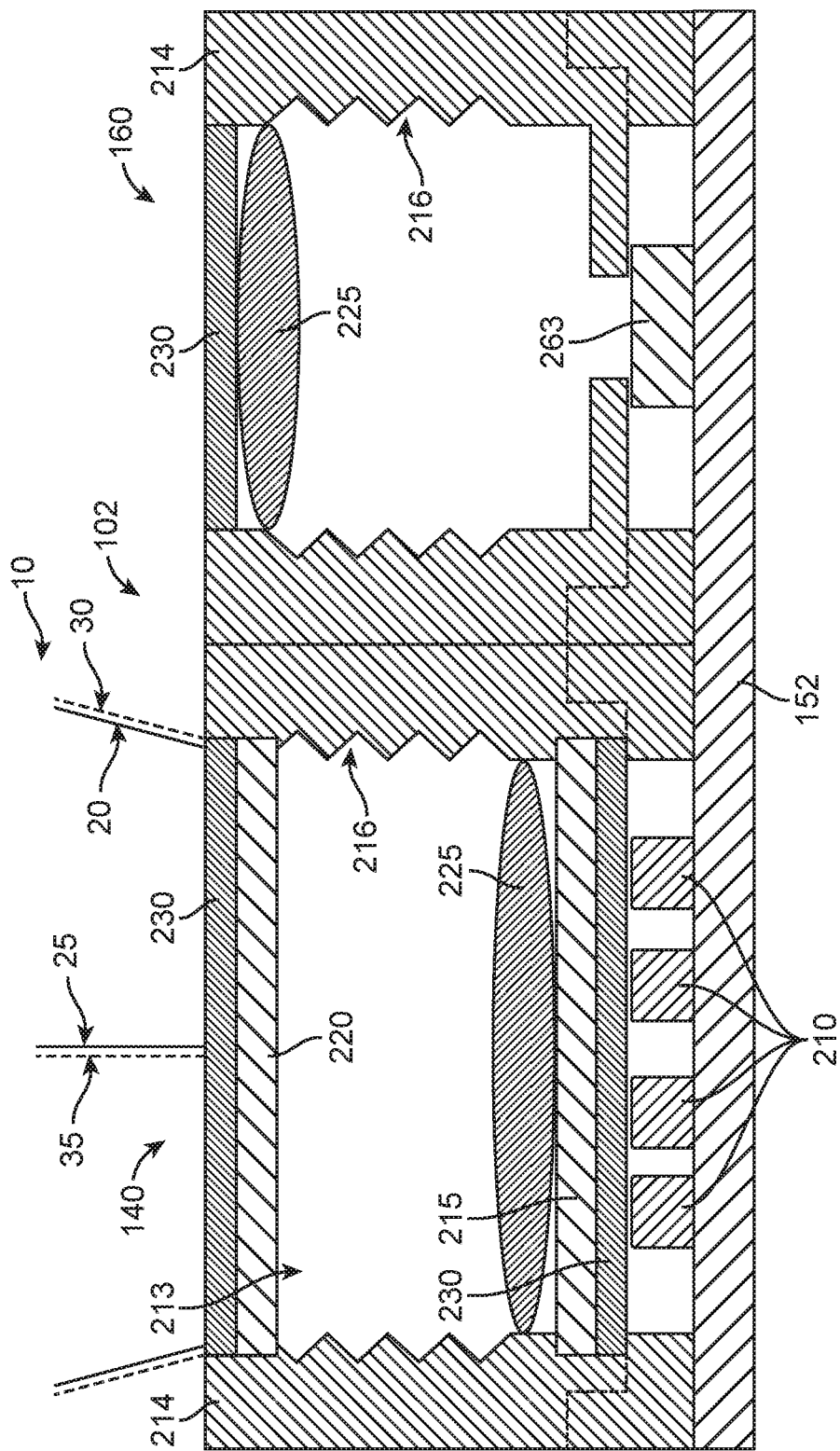
FIG. 12 shows a schematic diagram of a cross-section of the spectrometer head of FIG. 11.

FIG. 12 shows a schematic diagram of a cross-section of the spectrometer head of FIG. 11 (the sample temperature sensor 130 and the light source temperature sensor 203 are not shown). The spectrometer head comprises an illumination module 140 and a spectrometer module 160.

The illumination module 140 comprises at least two light sources, such as light-emitting diodes (LEDs) 210. The illumination module may comprise at least about 10 LEDs. The illumination module 140 further comprises a radiation diffusion unit 213 configured to receive the radiation emitted from the array of LEDs 210, and provide as an output illumination radiation for use in analyzing a sample material. The radiation diffusion unit may comprise one or more of a first diffuser 215, a second diffuser 220, and one lens 225 disposed between the first and second diffusers. The radiation diffusion unit may further comprise additional diffusers and lenses. The radiation diffusion unit may comprise a housing 214 to support the first diffuser and the second diffuser with fixed distances from the light sources. The inner surface of the housing 214 may comprise a plurality of light absorbing structures 216 to inhibit reflection of light from an inner surface of the housing. For example, the plurality of light absorbing structures may comprise one or more of a plurality of baffles or a plurality of threads, as shown in FIG. 12. A cover glass 230 may be provided to mechanically support and protect each diffuser. Alternatively or in combination with the LEDs, the at least two light sources may comprise one or more lasers.

The array of LEDs 210 may be configured to generate illumination light composed of multiple wavelengths. Each LED may be configured to emit radiation within a specific wavelength range, wherein the wavelength ranges of the plurality of LEDs may be different. The LEDs may have different specific power, peak wavelength and bandwidth, such that the array of LEDs generates illumination that spans across the spectrum of interest. There can be between a few LEDs and a few tens of LEDs in a single array.

Figure 13:
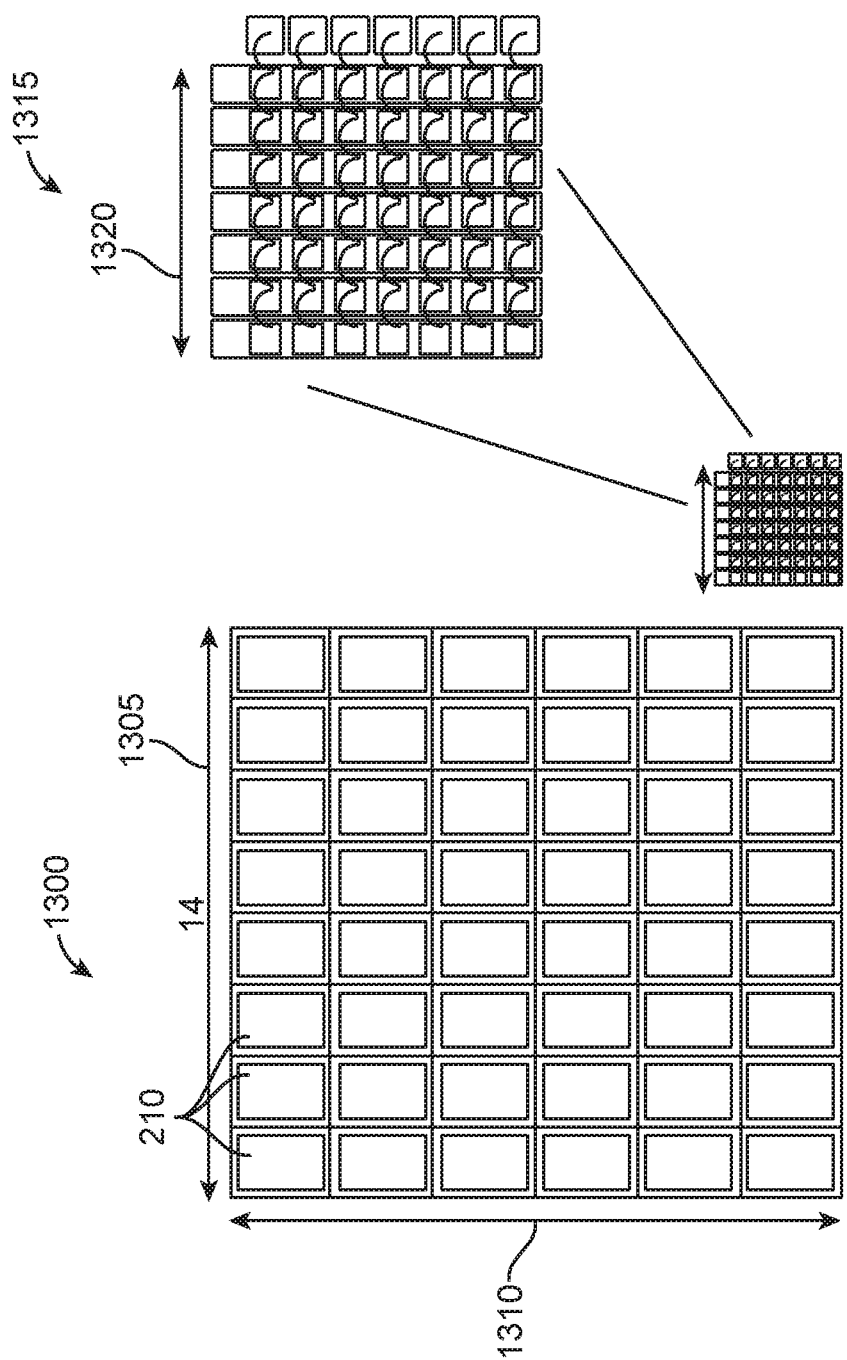
FIG. 13 shows an array of LEDs of the spectrometer head of FIG. 11 arranged in rows and columns, in accordance with configurations.

In some instances, the LED array is placed on a printed circuit board (PCB) 152. In order to reduce the size, cost and complexity of the PCB and LED driving electronics and reduce the number of interconnect lines, the LEDs may preferably be arranged in rows and columns, as shown in FIG. 13. The LED array may comprise a packaged LED array 1300 as shown, comprising a 2-dimensional array of LEDs 210, wherein the array may be about 14 mm in width 1305 and about 15 mm in length 1310, for example. The LED array may comprise a dice array 1315 as shown, which may be about 2.8 mm in width 1320 and comprise about 46 LEDs covering a spectral range of about 375 nm to about 1550 nm, for example. All anodes on the same row may be connected together and all cathodes on the same column may be connected together (or vice versa). For example, the LED in the center of the array may be turned on when a transistor connects the driving voltage to the anodes' fourth row and another transistor connects the cathodes' fourth column to a ground. None of the other LEDs is turned on at this state, as either its anodes are disconnected from power or its cathodes are disconnected from the ground. Preferably, the LEDs are arranged according to voltage groups, to simplify the current control and to improve spectral homogeneity (LEDs of similar wavelengths are placed close together). While bi-polar transistors are provided herein as examples, the circuit may also use other types of switches (e.g., field-effect transistors).

The LED currents can be regulated by various means as known to those skilled in the art. In some instances, Current Control Regulator (CCR) components may be used in series to each anode row and/or to each cathode column of the array. In some instances, a current control loop may be used instead of the CCR, providing more flexibility and feedback on the actual electrode currents. Alternatively, the current may be determined by the applied anode voltages, though this method should be used with care as LEDs can vary significantly in their current to voltage characteristics.

An optional voltage adjustment diode can be useful in reducing the difference between the LED driving voltages of LEDs sharing the same anode row, so that they can be driven directly from the voltage source without requiring a current control circuit. The optional voltage adjustment diode can also help to improve the stability and simplicity of the driving circuit. These voltage adjustment diodes may be selected according to the LEDs' expected voltage drops across the row, in opposite tendency, so that the total voltage drop variation along a shared row is smaller.

Referring to FIG. 12, the radiation diffusion unit 213, positioned above the LED array, is configured to mix the illumination emitted by each of the LEDs at different spatial locations and with different angular characteristics, such that the spectrum of illumination of the sample will be as uniform as possible across the measured area of the sample. What is meant by a uniform spectrum is that the relations of powers at different wavelengths do not depend on the location on the sample. However, the absolute power can vary. This uniformity is highly preferable in order to optimize the accuracy of the reflection spectrum measurement.

Figure 14:
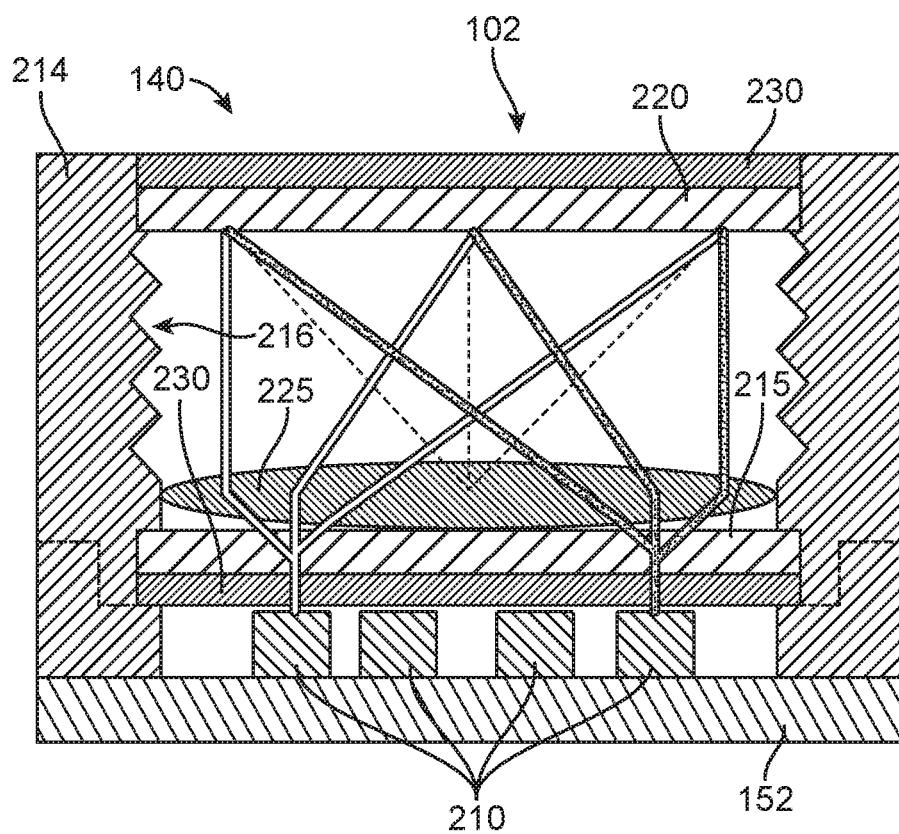
FIG. 14 shows a schematic diagram of a radiation diffusion unit of the spectrometer head of FIG. 11, in accordance with configurations.

The first diffuser 215, preferably mechanically supported and protected by a cover glass 230, may be placed above the array of LEDs 210. The diffuser may be configured to equalize the beam patterns of the different LEDs, as the LEDs will typically differ in their illumination profiles. Regardless of the beam shape of any LED, the light that passes through the first diffuser 215 can be configured to have a Lambertian beam profile, such that the emitted spectrum at each of the directions from first diffuser 215 is uniform. Ideally, the ratios between the illuminations at different wavelengths do not depend on the direction to the plane of the first diffuser 215, as observed from infinity. Such directions are indicated schematically by the dashed lines shown in FIG. 14, referring to the directions of rays at the output of the first diffuser 215 towards the first surface of lens 225.

The first diffuser 215 is preferably placed at the aperture plane of the lens 225. Thus, parallel rays can be focused by the lens to the same location on the focal plane of the lens, where the second diffuser 220 is placed (preferably supported and protected by cover glass 230). Since all illumination directions at the output of the first diffuser 215 have the same spectrum, the spectrum at the input plane of the second diffuser 220 can be uniform (though the absolute power may vary). The second diffuser 220 can then equalize the beam profiles from each of the locations in its plane, so that the output spectrum is uniform both in location and in direction, leading to uniform spectral illumination across the sample irrespective of the sample distance from the device (when the sample is close to the device it is more affected by the spatial variance of spectrum, and when the sample is far from the device it is more affected by the angular variation of the spectrum).

Figure 15B:
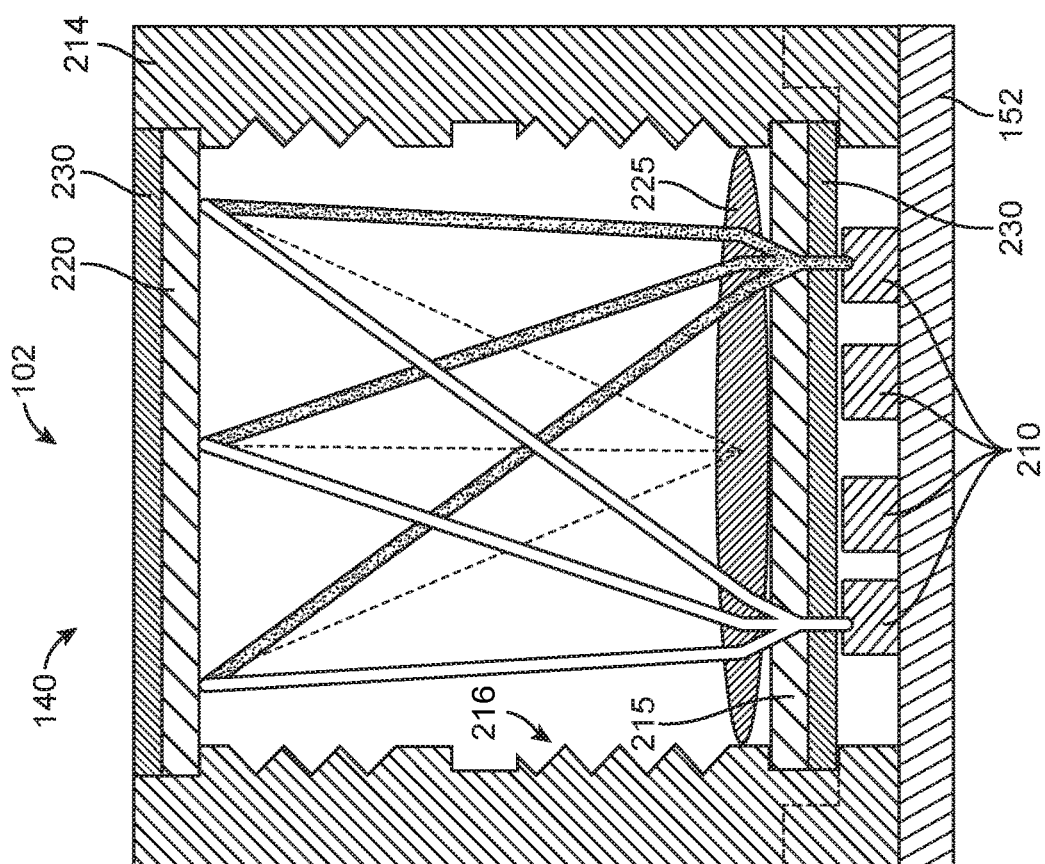
FIGS. 15A and 15B show examples of design options for the radiation diffusion unit of FIG. 13, in accordance with configurations.
Figure 15A:
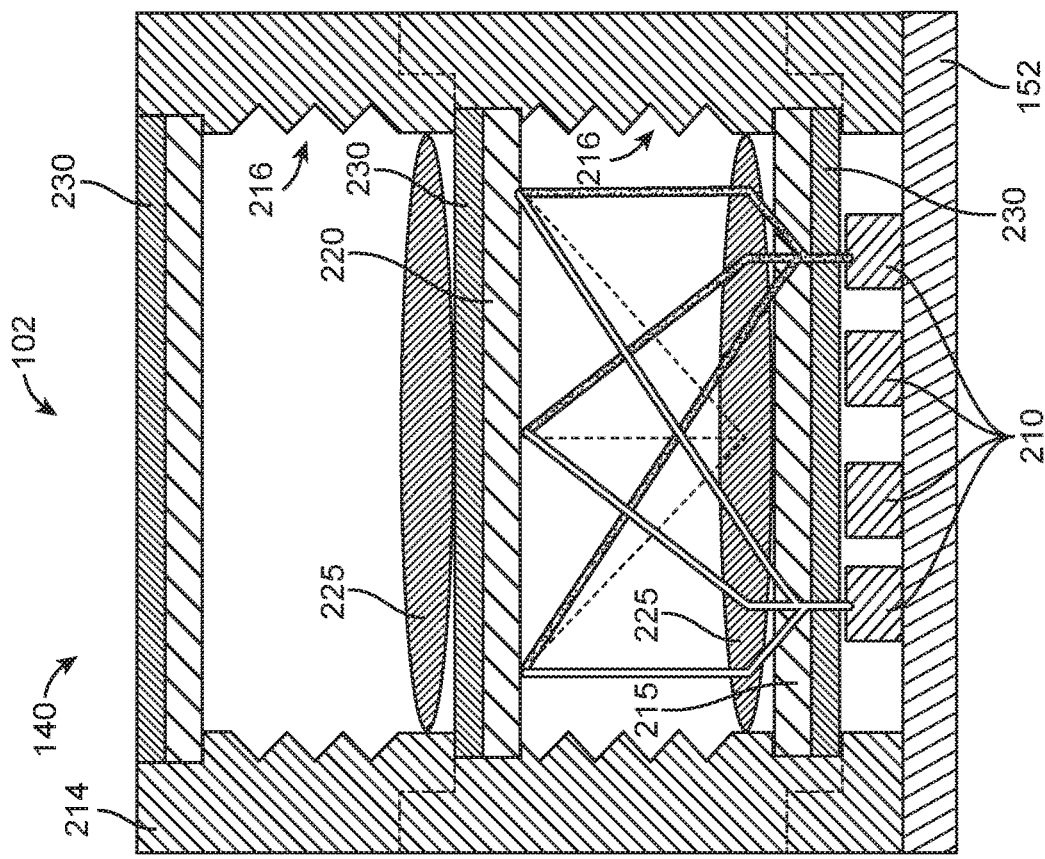

In designing the radiation diffusion unit 213 configured to improve spectral uniformity, size and power may be traded off in order to achieve the required spectral uniformity. For example, as shown in FIG. 15A, the radiation diffusion unit 213 may be duplicated (additional diffusers and lenses added), or as shown in FIG. 15B, the radiation diffusion unit 213 may be configured with a longer length between the first and second diffusers, in order to achieve increased uniformity while trading off power. Alternatively, if uniformity is less important, some elements in the optics can be omitted (e.g., first diffuser or lens), or simplified (e.g., weaker diffuser, simpler lens).

Referring back to FIG. 12, the spectrometer module 160 comprises one or more photodiodes 263 that are sensitive to the spectral range of interest. For example, a dual Si—InGaAs photodiode can be used to measure the sample reflection spectrum in the range of about 400 nm to about 1750 nm. The dual photodiode structure is composed of two different photodiodes positioned one above the other, such that they collect illumination from essentially the same locations in the sample.

The one or more photodiodes 263 are preferably placed at the focal plane of lens 225, as shown in FIG. 12. The lens 225 can efficiently collect the light from a desired area in the sample to the surface of the photodiode. Alternatively, other light collection methods known in the art can be used, such as a Compound Parabolic Concentrator.

The photodiode current can be detected using a trans-impedance amplifier. For the dual photodiode architecture embodiment, the photocurrent can first be converted from current to voltage using resistors with resistivity that provides high gain on the one hand to reduce noise, while having a wide enough bandwidth and no saturation on the other hand. An operational amplifier can be connected in photovoltaic mode amplification to the photodiodes, for minimum noise. Voltage dividers can provide a small bias to the operational amplifier (Op Amp) to compensate for possible bias current and bias voltage at the Op Amp input. Additional amplification may be preferable with voltage amplifiers.

In the embodiment of the spectrometer head shown in FIG. 12, each photodiode 263 is responsive to the illumination from typically many LEDs (or wavelengths). In order to identify the relative contribution of light from each of the LEDs, the LED current may be modulated, then the detected photocurrent of the photodiodes may be demodulated.

In some instances, the modulation/demodulation may be achieved by time division multiplexing (TDM). In TDM, each LED is switched "on" in a dedicated time slot, and the photocurrent sampled in synchronization to that time slot represents the contribution of the corresponding LED and its wavelength. Black level and ambient light is measured at the "off" times between "on" times.

In some instances, the modulation/demodulation may be achieved by frequency division modulation (FDM). In FDM, each LED is modulated at a different frequency. This modulation can be with any waveform, and preferably by square wave modulation for best efficiency and simplicity of the driving circuit. This means that at any given time, one or more of the LEDs can be "on" at the same time, and one of more of the LEDs can be "off" at the same time. The detected signal is decomposed to the different LED contributions, for example by using matched filter or fast Fourier transform (FFT), as known to those skilled in the art.

FDM may be preferable with respect to TDM as FDM can provide lower peak current than TDM for the same average power, thus improving the efficiency of the LEDs. The higher efficiency allows for lower LED temperatures, which in turn provide better LED spectrum stability. Another advantage of FDM is that FDM has lower electromagnetic interference than TDM (since slower current slopes can be used), and smaller amplification channel bandwidth requirement than TDM.

In some instances, the modulation/demodulation may be achieved by amplitude modulation, each at a different frequency.

When the LED array uses a shared-electrodes architecture, a single LED can be turned "on" when the corresponding row and column are connected (e.g., anode to power and cathode to GND). However, when more than one row and one column is switched "on", all the LEDs sharing the connected rows and columns will be switched on. This can complicate the modulation/demodulation scheme. In order to resolve such a complication, TDM may be used, wherein a single row and a single column is enabled at each "on" time slot. Alternatively, combined TDM and FDM may be used, wherein a single row is selected with TDM, and FDM is applied on the columns (or vice versa). Alternatively, a 2-level FDM may be used, wherein each row and each column is modulated at different frequencies. The LEDs can be decoupled using matched filter or spectrum analysis, while taking special care to avoid overlapping harmonics of base frequencies.

Referring again to FIG. 12, the illumination module 140 can be configured to produce an optical beam 10, which may comprise a visible aiming beam 20 and a measurement beam 30. As described herein, the visible aiming beam 20 and measurement beam 30 may be partially or completely overlapping, aligned, or coaxial (e.g., around co-axial aiming beam axis 25 and measurement beam axis 35). The aiming beam 20 and measurement beam 30 may be produced by the same light source, which may comprise two or more LEDs 210. One or more of the two or more LEDs 210 may produce light in the visible spectrum, and output enough visible light to form the aiming beam 20. All or a portion of the light output from the one or more LEDs in the visible range may form the visible aiming beam 20. Optionally, operation of one or more of the LEDs 210 may be adjusted such that the visibility of the aiming beam 20 is enhanced.

Figure 16A:
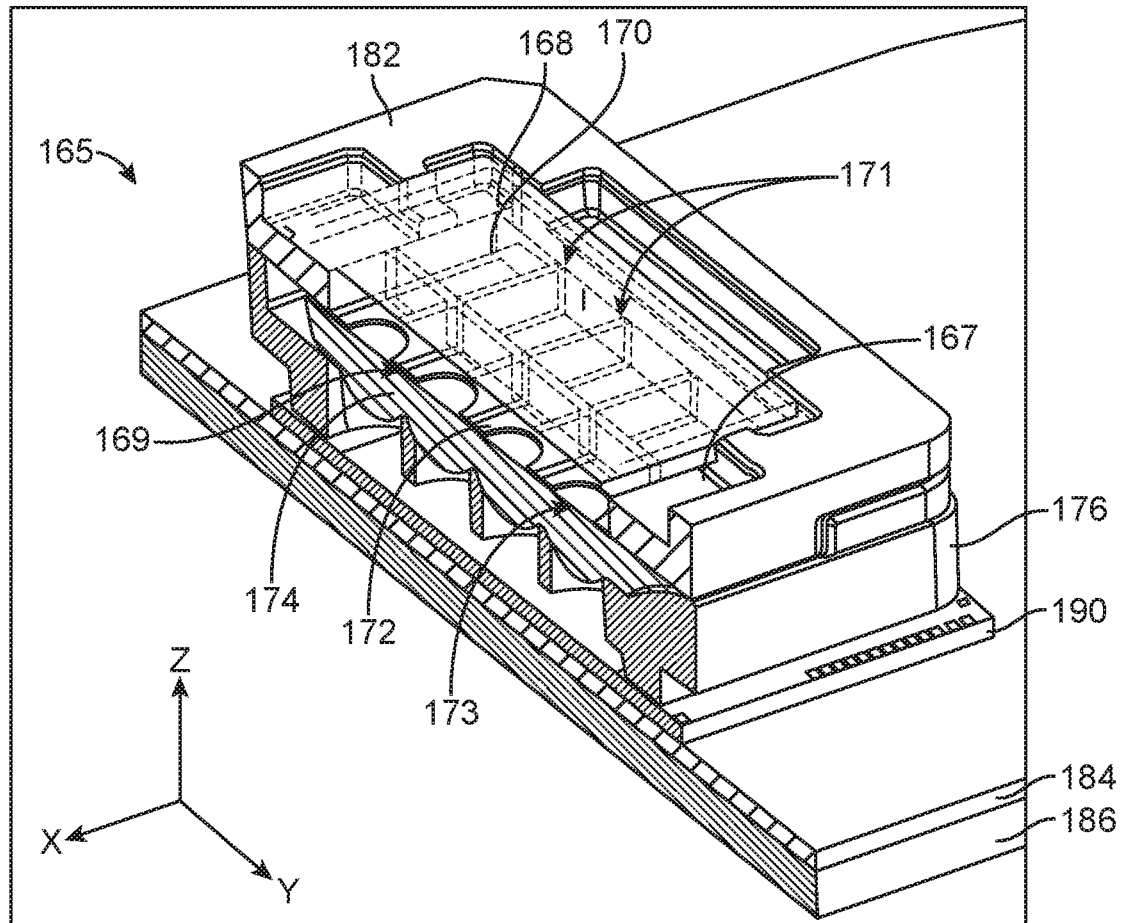
FIGS. 16A and 16B are schematic drawings of cross-sectional views of an optical subassembly of a spectrometer module, in accordance with configurations.
Figure 16B:
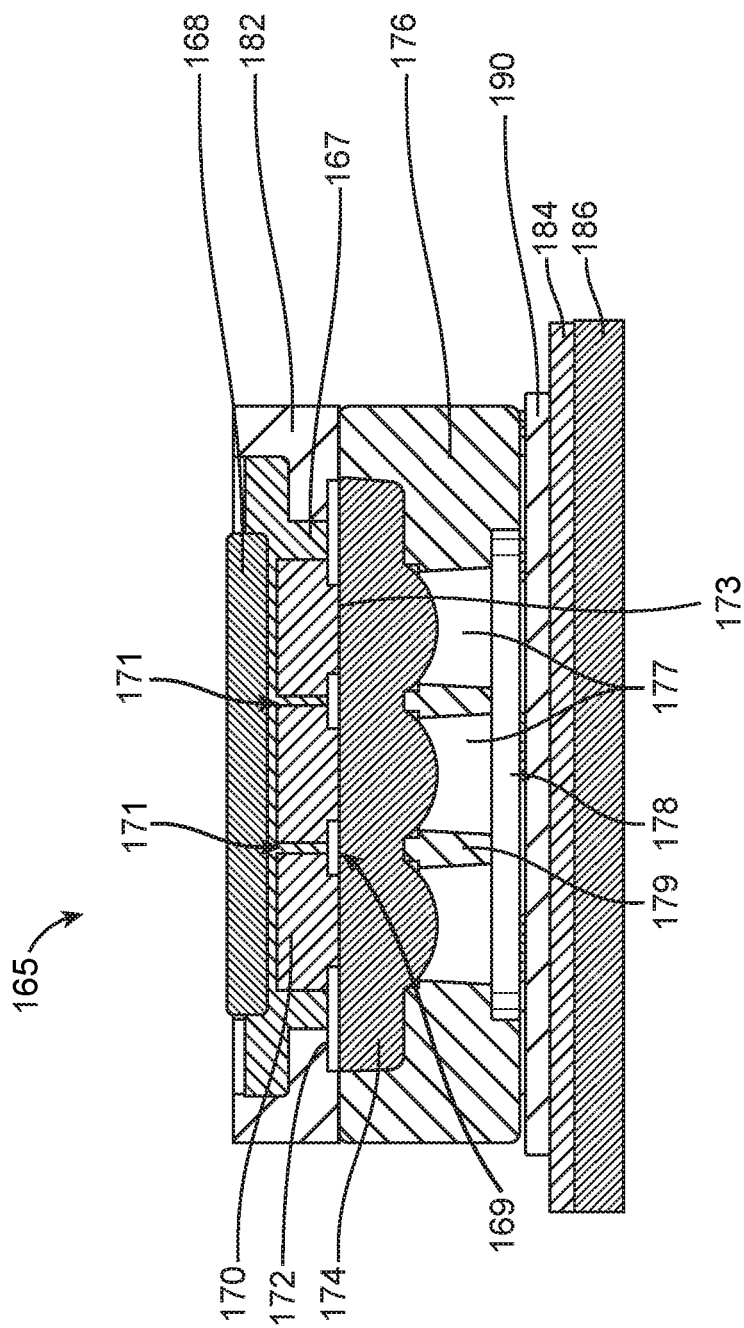

Additional Disclosure Relating to Spectrometer Using Secondary Emission Illumination with Filter-Based Optics FIGS. 16A and 16B are schematic drawings of cross-sectional views of an optical subassembly 165 of spectrometer module 160, in accordance with configurations. FIG. 16A shows an isometric cross-sectional view, while FIG. 16B shows a cross-sectional view of the optical subassembly. The optical subassembly 165 comprises a filter array 170, aperture array 172, lens array 174, and support array 176 as described herein. The optical subassembly may be adhesively coupled to the image sensor 190, which may further coupled to a PCB 184 and/or a stiffer 186 as described herein.

The coated side 173 of the filter array 170 and the aperture array 172 may be configured to have as small a gap 169 as possible. In preferred embodiments, the gap is substantially zero, such that the coated side of the filter array is in contact with the aperture array. The elements of the optical subassembly 165 may be designed such that the position of the filter array 170 along the optical axis (Z-axis) is determined by the thickness of the lens array 174 and the aperture array 172, such that the filter array physically contacts the lens array, and the subassembly comprising the filter array, lens array, and aperture array can be bonded to the support array 176.

The spaces 171 between the filters of the filter array 170 can be filled with an index-matched material to enable homogeneous illumination at the plane of the coated side 173 of the filter array. This can accomplished, for example, using an optical adhesive 167 that can also encapsulate and thereby provide structural support to the filter array. The optical adhesive 167 may be optically clear and comprise an index of refraction similar to the substrate material of the filter array 170 (e.g., fused glass). The optical adhesive 167 may comprise one or more of a variety of chemicals such as silicone and epoxy, and may be cured using one or more curing mechanisms known in the art, such as UV-curing.

Preferably, the positions of the filter array 170, aperture array 172, and lens array 174 are tightly controlled, so as to reduce chipping and peeling of the filter coating at the edges of the filters, and to minimize the necessary filter area in order to reduce cost. For example, the positions of the filter array, aperture array, and lens array may be substantially fixed relative to one another. The support array 176 may be configured to align the lens array, the aperture array, and the filter array, for example.

The filter array 170 can be configured to have top and bottom surfaces that are parallel to one another, such that the filter array can support the assembly of additional elements of the spectrometer module (e.g., referring again to FIG. 7, light filter 188 sandwiched between the diffusers 164 and 166, spectrometer window 162). For example, a glass plate 168 may be placed above the filter array 170. The filter frame 182 may be configured to support and thereby determine the position of the glass plate 168, such that the position of the glass plate is independent of any differences in the thickness of the filters within the filter array 170.

Figure 17:
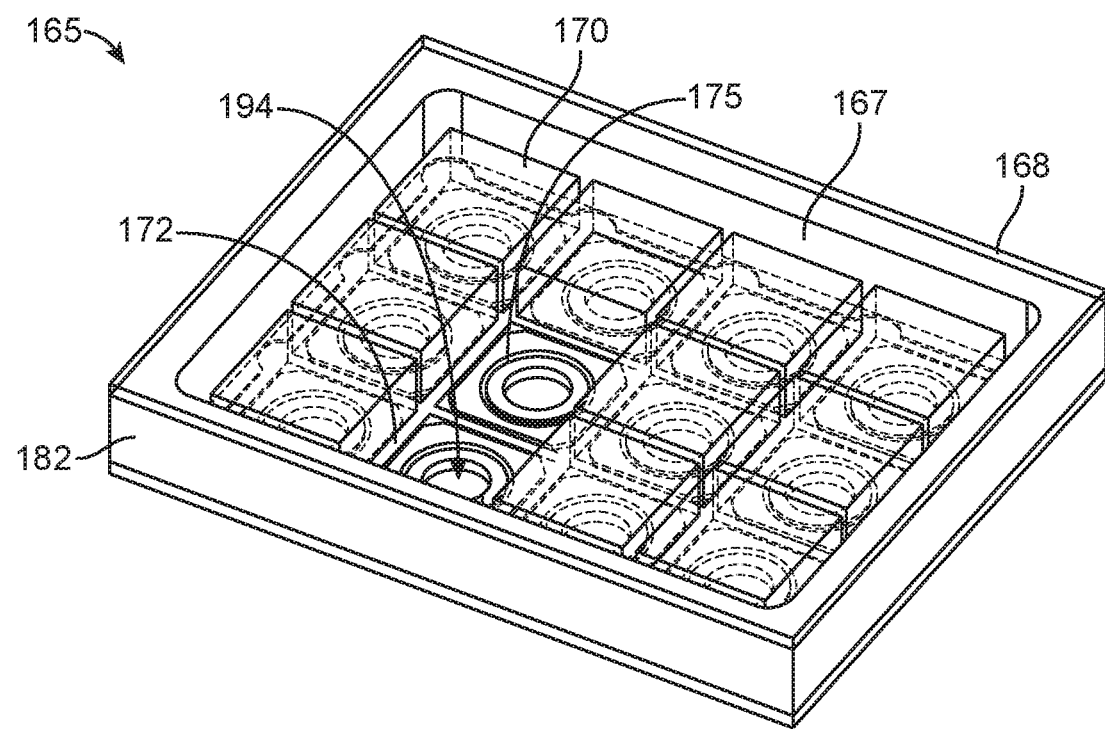
FIG. 17 is a schematic drawing of a portion of an optical subassembly of a spectrometer module, in accordance with configurations.

FIG. 17 is a schematic drawing of a portion of an optical subassembly 165, assembled according to one of many exemplary methods. To assemble the optical subassembly 165, the filter array 170 may be bonded to a rigid aperture array 172 via an adhesive. The aperture array can have grooves 175 on the surface facing the filter array, the grooves configured to collect excess adhesive and prevent the adhesive from reaching into the apertures 194. Grooves 175 may comprise, for example, circular grooves positioned about the circumference of each aperture 194. The filter array may be bonded to the aperture array using a pick-and-place machine, for example. The filter frame 182 may be coupled to the subassembly comprising the bonded filter array and aperture array, and frame may be filled with an optical adhesive 167 as described herein.

Alternatively, in embodiments comprising a filter array 170 having filters of uniform thickness, the optical subassembly 165 may be assembled such that the filter array 170 is in direct contact with the glass plate 168. For example, the top surface of the filter array may be placed flush against the bottom surface of the glass plate. Such an assembly configuration can eliminate the need to bond the filter array to the aperture array 172, since the filter array can be retained in a substantially fixed position by the glass plate 168. Without the need to support bonding of the filter array, the aperture array can be simplified in construction and/or have fewer constraints on design. For example, the aperture array can be made without the grooves 175, and/or be made from a more flexible material.

Filter Coatings

Referring again to FIG. 4, an exemplary optical layout for the compact spectrometer system 100 herein disclosed comprises a diffuser 164, filter array 170, lens array 174, and detector 190. Incident light 200, comprising light reflected from a sample being measured by the spectrometer, is diffusely scattered by diffuser 164, and then filtered by filter array 170. As described herein, each of the filters in the filter array can be tuned to filter a specific wavelength band, based on the incidence angle of the light 200. Therefore, the light emerging from the filters can be spectrally resolved according to the incidence angle. Lens array 174 can then focus the light onto detector 190, such that the image formed on the detector from a particular filter in filter array 170 is a set of concentric rings, each ring corresponding to the intensity of light at a particular wavelength range.

It is helpful when the intensity of light in each ring, corresponding to light of a particular wavelength, is affected by the intensity of illumination at that wavelength on diffuser 164, but does not depend on the position of the illumination on the diffuser 164. In order to reduce the dependence of measured light intensity on the position of the light hitting the diffuser, the diffuser 164 may be placed at the aperture plane of the lens array 174. Placing the diffuser farther from the lens aperture plane may result in variations in the spatial distribution of light on the diffuser, translating into variations in the intensity distribution in the ring images on the image sensor 190. Such an effect can decrease the accuracy of the spectrometer.

To reduce the system's sensitivity to the spatial distribution of light on the diffuser, the lens array 174 may be configured to account for the thickness of the interference filter substrate, such that the aperture plane of the lens of the array is one or more of near, adjacent or coincides with the plane of the diffuser The entrance pupil defined with aperture plane may comprise a virtual plane that coincides with the plane of the diffuser, for example with a lens comprising a plurality of components such as a multicomponent lens. The aperture plane can be physically located between each of a plurality of lens components such that the entrance pupil of the lens coincides with the plane of the diffuser, for example. Alternatively or in combination, the substrate of the filter may comprise a diffusing material such as an opal glass, for example which can place the diffuser near to the aperture, for example adjacent or coinciding with the apertures.

Figure 18:
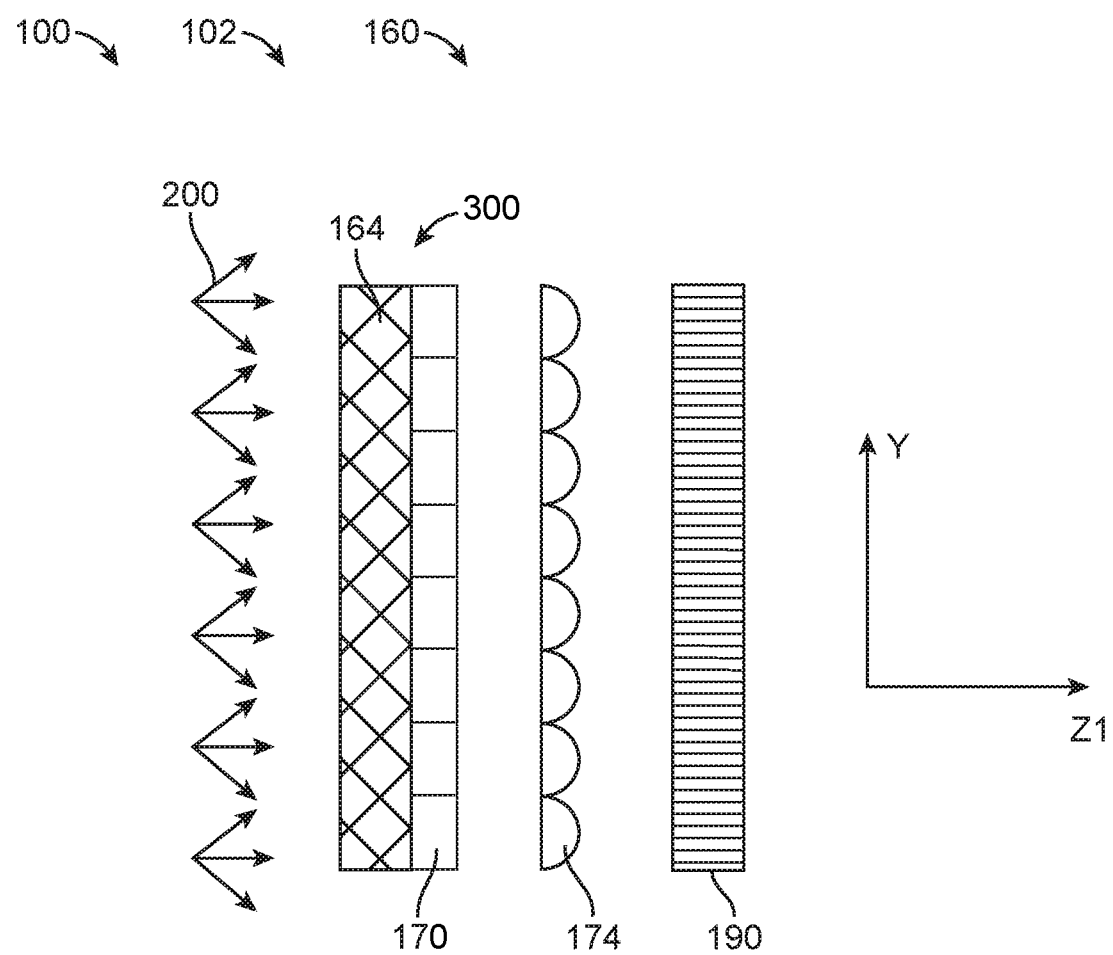
FIG. 18 shows a schematic diagram of an optical layout in accordance with configurations.

Alternatively or in combination, to reduce the system's sensitivity to the spatial distribution of light on the diffuser, the functions of the diffuser and filter may be combined. FIG. 18 shows a schematic diagram of an exemplary optical layout, comprising a filter assembly 300. The filter assembly 300 can comprise a diffuser 164 and a filter coating comprising the filter array 170 coupled to the diffuser. The diffuser 164 may comprise any material well-known in the art to have light-diffusing properties, such as opal glass, Spectralon™, Polytetrafluoroethylene (PTFE), sandblasted glass, and ground glass. The diffuser 164 may comprise a diffusing layer deposited, coated, fused, or otherwise coupled to an optical substrate such as glass. An integrated optical component such as the filter assembly 300 as shown in FIG. 18 can simplify the design of the lens, as well as significantly reduce the dependence of detected intensity distributions of incident light on spatial variations of the light intensity in the diffuser plane. Further, combining the diffuser with an interference filter substrate can allow for using a thicker substrate, providing more durability to the substrate against the stresses that can be related to the interference filter coating process.

Referring again to FIG. 7, a spectrometer 102 in accordance with embodiments may further comprise a bulk light filter 188, configured to block at least a portion of visible radiation included in the incident light. The light filter 188 can comprise, for example, an infrared high-pass filter (e.g., Hoya R72 bulk filter glass). Bulk filter 188 can improve the function of each filter in the filter array 170, by blocking out those wavelengths that are undesirable for all channels, such as wavelengths that are outside the operational range of the spectrometer. Such wavelengths can produce undesirable stray light, since the wavelengths may not be effectively blocked by the interference filters of the filter array 170.

To further simplify the design and production of the spectrometer, a bulk visible light filter, such as light filter 188 of FIG. 7, may be combined with a diffuser and/or an optical filter such as an interference filter, to form an integrated filter assembly that provides one or more of bulk visible light filtering, diffusing, and/or optical filtering. For example, a thin layer of diffuser (e.g., opal coating) may be deposited, coated, fused, or otherwise coupled to an optical substrate comprising a bulk light filter (e.g., colored glass), configured to block at least a portion of the incident light spectrum, and an optical filter configured to pass only a narrow band of the spectrometer's spectrum may also be deposited or coated on the diffuser layer. Such a design, integrating the functions of a visible light filter, diffuser, and/or interference filter into one component, can reduce the total cost of production and the size of the spectrometer. Further, combining the bulk light filter with the interference filter coating can also be advantageous in the design of interference filters in a filter array. A filter array can be configured such that each filter in the array comprises a bulk filtering substrate that is specifically configured based on the passband of the filter. Such a configuration can allow the use of a narrower passband for the individual filters of the filter array, thereby improving the performance of the interference filters (e.g., via better passband transmission, narrower passband) and reducing the cost of production. Furthermore, the use of individual bulk light filters as substrates for filters of a filter array can reduce the number of interference filter layers needed, thereby reducing the stress generated on the substrate during the coating process. Reduced stress during the coating process can, in turn, potentially allow the use of a thinner substrate and hence reduce the cost of dicing the substrate and provide improved reliability with decreased weight.

FIGS. 19A-19F illustrate exemplary configurations of a filter assembly 300 suitable for incorporation with a compact spectrometer as described herein. A filter assembly may comprise a combination of two or more optical elements selected from an optical substrate 305, a diffusing layer 310, and an optical filter 315. The optical substrate 305 may comprise one or more of many optically transmissive materials such as one or more of glass, colored glass, sapphire, quartz, plastic, or polycarbonate, for example. The diffusing layer 310 may comprise a diffuser 164 as described herein, such as cosine diffuser having an output intensity invariant with input angle. The optical filter 315 may comprise a filter array 170 as described herein, comprising a plurality of optical filters configured to transmit a specific wavelength band, based on the incidence angle of the light. The bulk light filter 320 may comprise a visible light filter 188 as described herein, for example.

Figure 19A:
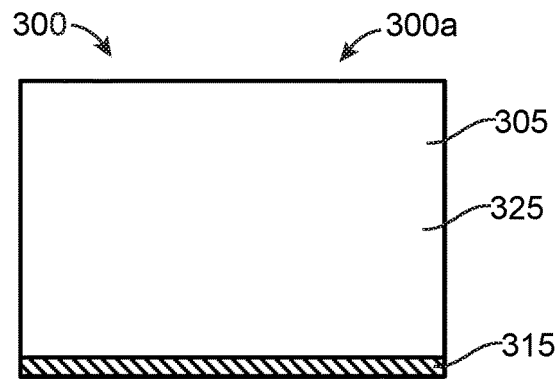
FIGS. 19A-19F illustrate exemplary configurations of a filter assembly suitable for incorporation with a compact spectrometer.

FIG. 19A illustrates a filter assembly 300a, comprising an interference filter 315 coated on an optical substrate 300 comprising clear glass 325.

Figure 19B:
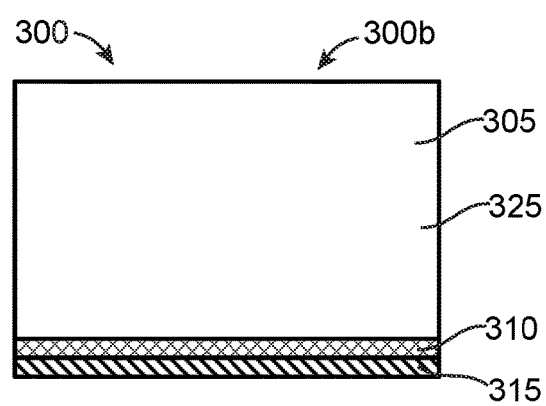

FIG. 19B illustrates a filter assembly 300b, comprising an interference filter 315 coated on of a diffusing layer 310 deposited, coated, fused, or otherwise coupled to an optical substrate 305 comprising clear glass 325.

Figure 19C:
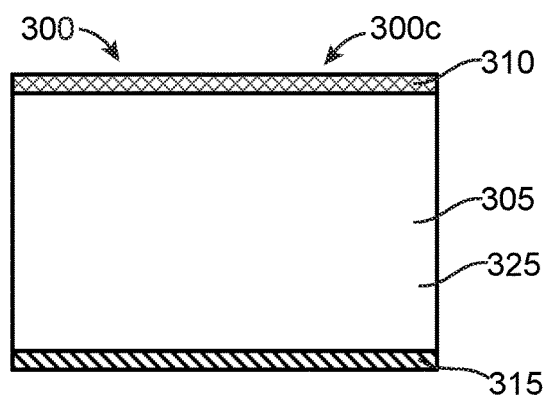

FIG. 19C illustrates a filter assembly 300c, comprising an interference filter 315 coated on one side of an optical substrate 305 comprising clear glass 325, the clear glass substrate comprising a diffusing layer 310 deposited, coated, fused, or otherwise coupled to the opposite side of the clear glass substrate.

Figure 19D:
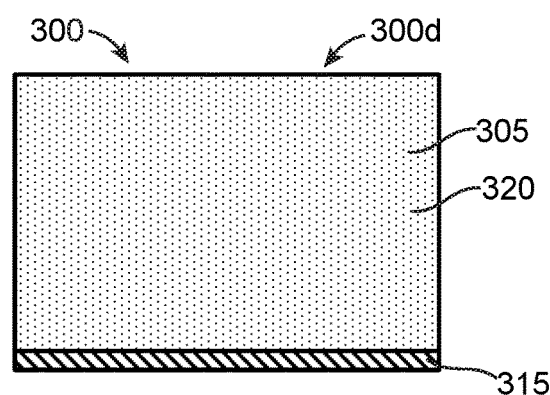

FIG. 19D illustrates a filter assembly 300d, comprising an interference filter 315 coated on one side of an optical substrate 305 comprising a bulk light filter 320 (e.g., colored glass).

Figure 19E:
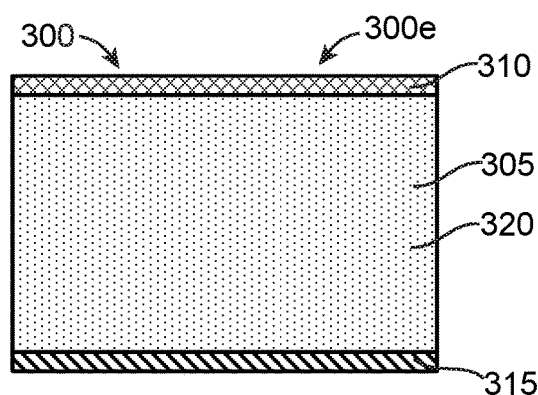

FIG. 19E illustrates a filter assembly 300e, comprising an interference filter 315 coated on one side of the optical substrate 305 comprising a bulk light filter 320, the bulk light filter comprising a diffusing layer 315 deposited, coated, fused, or otherwise coupled to the opposite side of the bulk light filter.

Figure 19F:
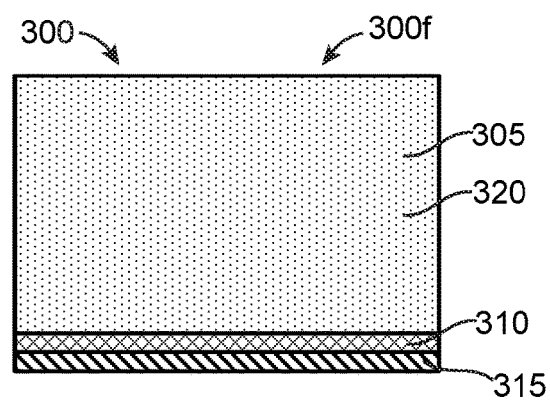

FIG. 19F illustrates a filter assembly 300f, comprising an interference filter 305 coated on top of a diffusing layer 310 deposited, coated, fused, or otherwise coupled to one side of an optical substrate 305 comprising a bulk light filter 320.

The optical elements shown in the configurations of FIGS. 19A-19F may be combined using any suitable method, or in any suitable order or orientation.

In configurations with an optical component comprising an interference filter coated on a substrate with a diffuser, such as the configurations shown in FIGS. 19B, 19C, 19E, and 19F, testing of filter performance can be designed in a way that takes the diffuser into account. In testing the performance of interference filters combined with a diffuser, providing input light to the diffuser side may make the testing procedure less than ideal, since the diffuse light incident on the filters will generally hit the filters at many different angles. In such a configurations, an incident angle-independent detection system (such as the spectrometer described herein) may be provided to accurately determine the output of the filters. A filter testing procedure can be designed such that light is provided to the filter-coated side instead, such that the light passes first through the filters and subsequently through the diffuser, for example light having a controlled angle of incidence on the filter such as collimated light. A commercially available spectrometer comprising a detector may be placed on the other side of the filter assembly to measure the intensity and spectrum of the transmitted light. Alternatively or in combination, light of a controlled wavelength such as light from a grating can be transmitted onto the filter and the light energy of a specific narrow band of wavelengths measured with a detector such as a photodiode for each of a plurality of wavelengths in order to determine the optical transmission profile of the filter as described herein.

The surface of the substrate supporting the filter coating may comprise an optically flat surface. As used herein an optically flat surface encompasses having a wavelength to root mean square (RMS) ratio that is surface sufficiently small, such as having an RMS of no more than one or more of lambda ($\lambda$) over 5 ($\lambda/5$), lambda ($\lambda$) over 10 ($\lambda/10$), for example. The specified wavelength lambda ($\lambda$) may comprise one or more of the shortest wavelength measured with the spectrometer, longest wavelength measured with the spectrometer, or an average wavelength measured with the spectrometer.

Each of the components shown in FIGS. 19A to 19E may comprise single piece optical components. Each of the single piece optical components may comprise one or more of a filter deposited on the substrate or a diffuser deposited on a substrate, and combinations thereof. One or more single piece optical components can be assembled with one or more other components as described herein to assemble the spectrometer. Alternatively or in combination, a lens can be formed on the substrate, the lens comprising one or more of a geometric lens with a curved surface, a diffractive lens with chelates formed on the substrate surface, a lens lithographically formed on the substrate, a Fresnel lens, or a gradient index lens, and combinations thereof, for example.

Figure 20:
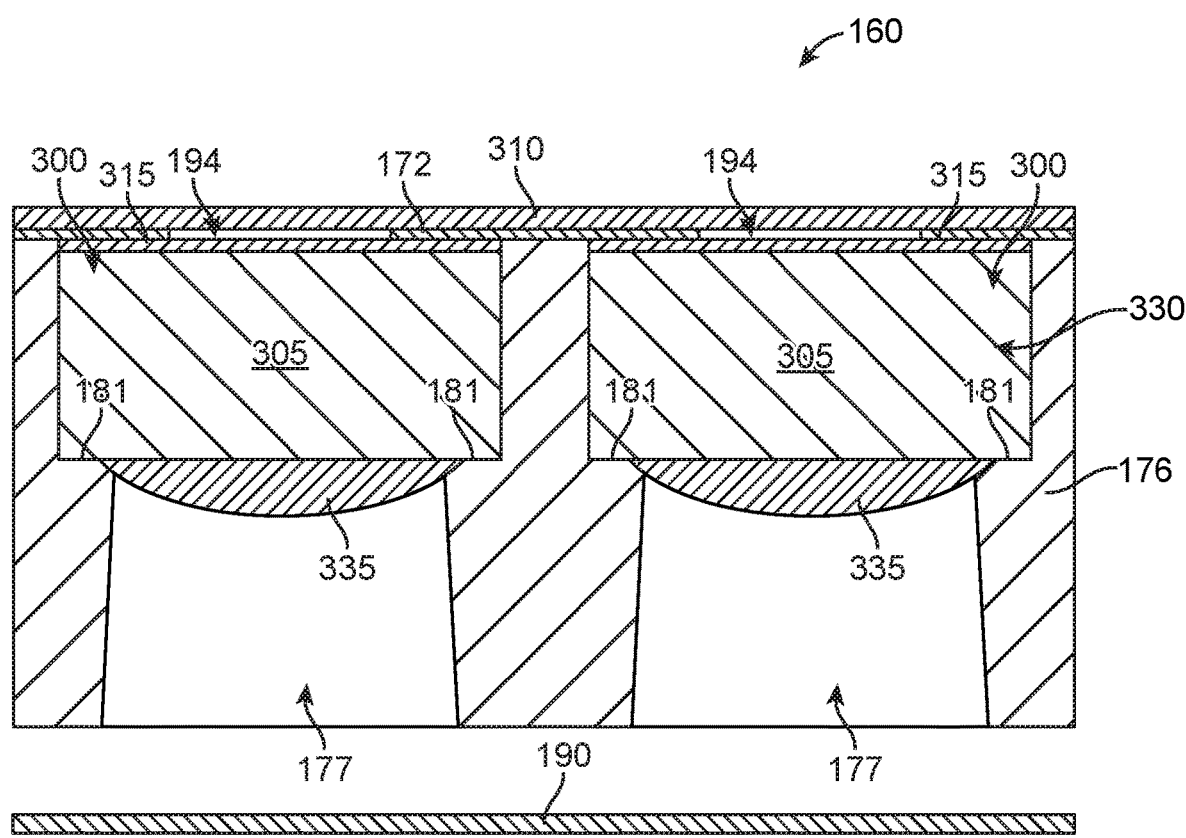
FIG. 20 shows a schematic drawing of a cross-section of an exemplary spectrometer module, comprising an array of filter assemblies.

FIG. 20 shows a schematic drawing of a cross-section of an exemplary spectrometer module 160 as described, comprising an array 330 of filter assemblies 300. The cross-section shows two channels 177 of the support 176 configured to support the array 330, each channel configured to direct light transmitted through each filter assembly 300 towards the detector 190 as described herein. The support 176 can comprise a plurality of shoulders 181 configured to support the filter assemblies 300. Each filter assembly 300 comprises an optical substrate 305 and an optical filter 315 coupled to one side of the optical substrate. The optical substrate can be simple glass or a bulk light filter, such as an infrared (IR)-pass filter glass. An aperture array 172 comprising a plurality of apertures 194 is located on top of the array of filters 315, and a diffuser 310 is located on top of the aperture array 172. A lens 335 is coupled to each filter assembly 300 on the side of the substrate 305 opposite the side coated with the filter 315.

The lenses 335 can be an array of refractive lithographic lenses grown at the uncoated side of the substrate before the substrate is cut into individual filter assemblies. Alternatively or in combination, the lenses can be an array of Fresnel lenses, either etched into the optical substrate before the substrate is cut into individual filter assemblies, or built separately from a thin plate, adhered to the optical substrate, and cut together with the substrate into individual filter assemblies, as in wafer level packaging techniques. Other methods may be used for building lenses onto the optical substrate, as known in the art. For example, techniques commonly used in the optical wafer-level industry, such as using drops of glue with well controlled volumes to build the lenses, may be used. The lenses can be configured such that the diffuser is placed at the entrance pupil defined with aperture plane of the lens.

Lenses that are attached to or built directly onto the filter substrate are not limited to the configuration of FIG. 20, and may be incorporated with one or more spectrometer module components and arrangements as described herein. The interference filter can be configured to account for the index of refraction of the lens that is attached to or formed on the substrate. Transmission properties of the interference filter supported with the substrate comprising the lens can change in relation to the index of refraction of the substrate, and the interference filter can be configured in response to the index of refraction of the substrate supporting the filter such as an interference filter, for example.

The aperture array 172 as shown in FIG. 20 is configured to restrict the amount of light passing through the filters 315 to areas of the filters that are functional for the collection of light by the lens 335 corresponding to each channel 177. Such a configuration can suppress the contribution of stray light to detected light intensity. The size of each aperture 194 of the aperture array may be configured to collect as much light as possible while inhibiting stray light transmission among the aperture channels, in order to increase the signal-to-noise ratio of the spectrometer system as described herein and with reference to FIGS. 16B and 20, for example. The aperture array may comprise a plurality of apertures having a uniform cross-sectional size, a plurality of apertures having a plurality of different cross-sectional sizes, or a combination thereof. Apertures having a plurality of different cross-sectional sizes may comprise, for example, circular apertures of different diameters, or apertures having any other shape (e.g., star shape) to control the aperture area while keeping the aberrations in the different channels similar.

An aperture array comprising a plurality of apertures having different sizes can be advantageous in controlling the balance between the intensities of light collected by the different channels in the filter array. Different channels of the filter array may provide light to the filter array with different throughput, due to factors such as the illumination spectrum intensity, image sensor spectral response curve, and spectrometer system geometry. The balancing of the spectral illumination intensity with the transmission efficiency of the filters can provide a more uniform amount of intensity on the detector elements for an object with a uniform spectral response, e.g. white, in order to increase the signal to noise ratio of the spectrometer. A channel with one or more of a relatively lower light intensity or a relatively lower transmission efficiency may be provided with an aperture of a relatively larger size, such that the intensity of the illumination of the detector can be increased. A channel with one or more of a relatively higher light intensity or a relatively higher transmission efficiency may be provided with an aperture of a relatively smaller size, such that the intensity of the illumination on the detector array can be decreased. This balancing of the intensities of different channels using apertures of different sizes, the light intensity detected by the lower optical throughput channels may be increased without saturating the signal detected by the higher-efficiency channels. The light intensity detected by the relatively higher optical throughput channels may be decreased without decreasing the signal detected by the relatively lower optical throughput channels. Balancing the intensities of different channels can also help to balance cross-channel disturbances, so that disturbances or cross-talk between the different channels can be better compensated.

Modulated Light Beam

When performing spectroscopy in ambient lighting conditions, the reduction of noise, such as that from ambient light impingent on the detector can be helpful. An approach suitable for reduction of noise is to record a "dark frame," comprising a signal taken with the optical beam turned off, in addition to a "probe frame," comprising an signal taken with the optical beam turned on. The dark frame represents a recording of the portion of the signal illumination that is due to external sources, such as ambient light. By subtracting the dark frame from the probe frame, a signal showing the net effect of the optical beam can be isolated.

This approach can reduce noise but may not account for changes in ambient light intensity or pattern over time in some instances. For example, if a probe frame is recorded followed by a dark frame, the dark frame is supposed to represent the ambient light at the time the probe frame was taken, but is a measurement of the ambient light some time later. If the ambient light changed in intensity or pattern during that time, the dark frame will fail to properly account for it, resulting in a higher level of noise.

In some examples, to account for the possibility of changes in ambient lighting and other sources of noise, more than one dark frame may be recorded. For example, two dark frames may be recorded, one before and one after a probe frame. The average of the two dark frames will then be a more accurate approximation of the "true" dark frame that would have been recorded during the probe frame, had the probe light not been turned on. In further examples, a plurality of dark frames may be recorded and used to determine a trend in ambient noise, for example by fitting with a polynomial curve or other suitable function. While this method of noise reduction will typically lead to greater accuracy with greater number of dark frames, it also may lead to inefficient amounts of data acquisition and processing.

Modulation effects of the light beam can be used to filter out noise from ambient sources. By modulating the probe beam at a known frequency, then demodulating the recorded signal using the same frequency as a reference, noise can be reduced. However, the choice of modulation frequency is helpful. Noise sources that vary at frequencies close to or the same as the chosen modulation frequency may provide less than ideal results. Thus, if a modulation frequency is chosen that matches the characteristic frequency of some ambient source, demodulation may fail to effectively eliminate that noise.

Figure 21:
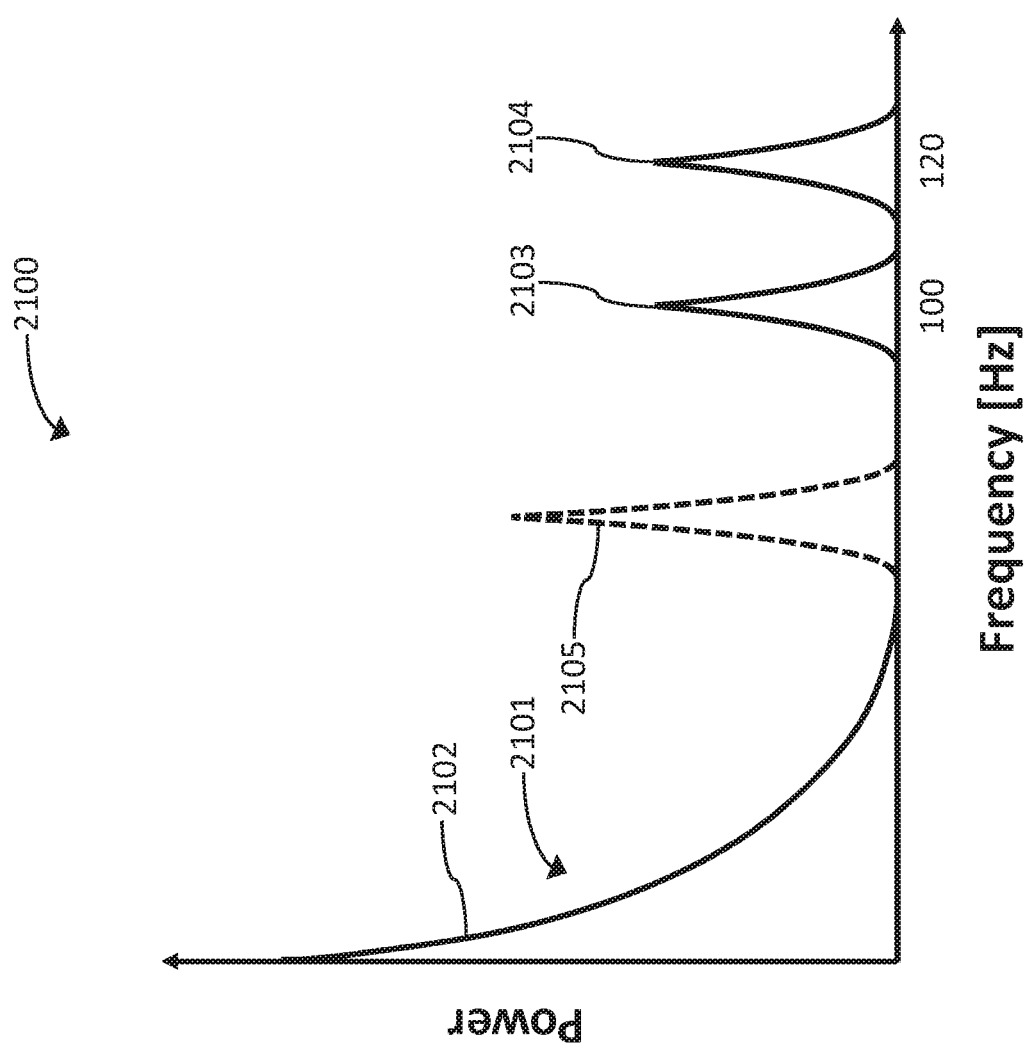
FIG. 21 shows an example of a noise spectrum.

FIG. 21 shows an exemplary noise spectrum 2100 that may be the result of ambient light as measured by a detector apparatus. The curve 2101 demonstrates a characteristic 1/f noise curve 2102, and which may be due to ambient light changes as well as intrinsic noise sources in the device. Also illustrated are noise peaks 2103 and 2104 at 100 Hz and 120 Hz. These peaks may be due to flicker at those frequencies, from light sources such as fluorescent or incandescent lighting, for example. Choosing a modulation frequency near either peak 2103 or 2104 will result in a noisier signal, as will choosing low modulation frequency subject to 1/f noise 2102. The spectrometer circuitry as disclosed herein can be configured to emit a modulation frequency 2105 that decreases overlap with noise peaks. The light beam modulation can be configured in response to the available sensor frame rate.

The light source may be configured to provide the modulated optical beam incident on the sample with an illuminance ($E_v$) of no more than about 100,000 lux ($lm/m^2$), or within a range from about 20 lux ($lm/m^2$) to about 100,000 lux ($lm/m^2$). The light source may be configured to provide the modulated optical beam incident on the sample with an irradiance of no more than about 100 $mW/cm^2$, or within a range from about 0.1 $mW/cm^2$ to about 100 $mW/cm^2$.

Figure 22:
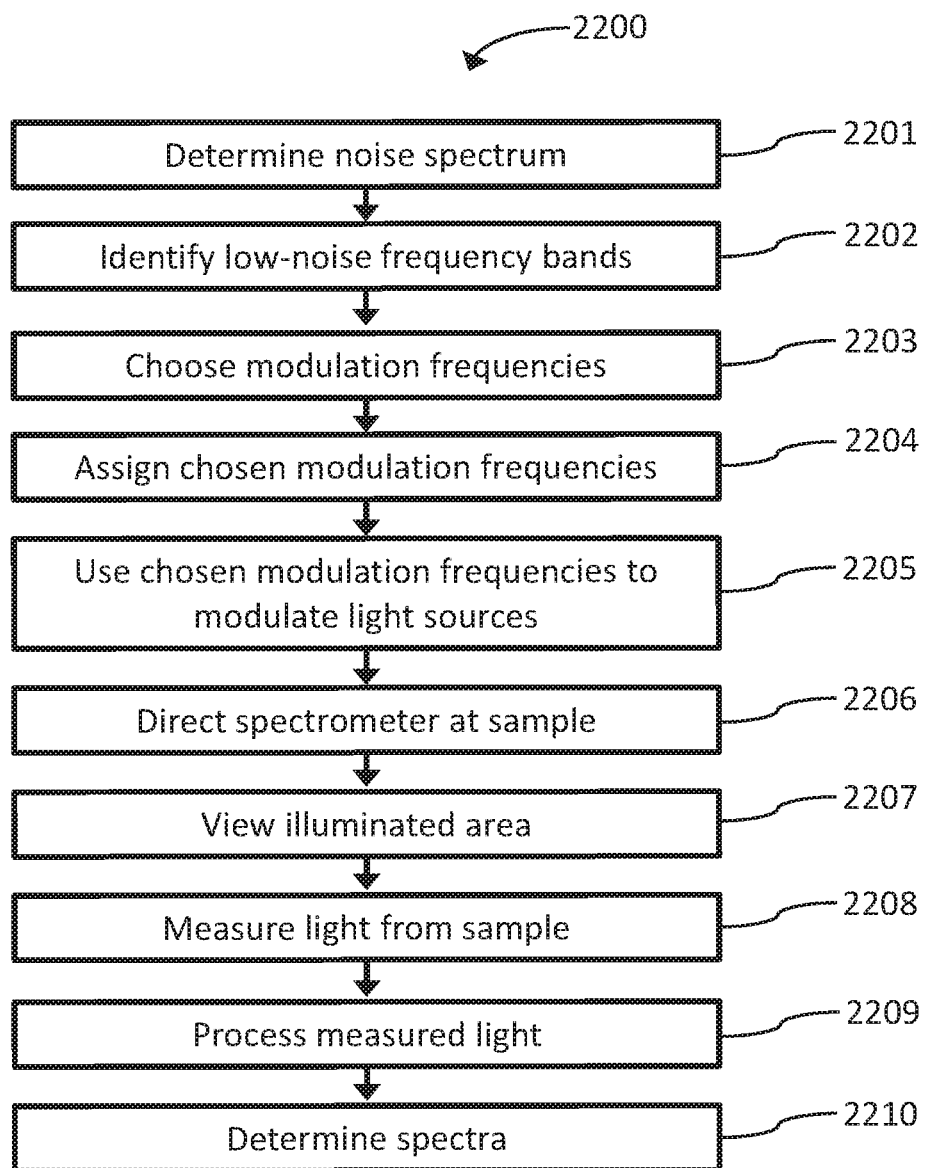
FIG. 22 shows an exemplary method of measuring a spectrum.

FIG. 22 illustrates a method 2200 of measuring a spectrum, by which frequencies may be used to inhibit one or more of ambient noise, intrinsic noise, or other sources of noise. In some method 2200 may be performed automatically by a processor associated with a computer readable memory, and coupled to the spectrometer with communication circuitry. In some cases, method 2200 may be performed as calibration step to select modulation frequencies for future use, and in some cases method 2200 may be performed during operation to determine modulation frequencies based on ambient conditions in use.

In step 2201, a noise spectrum is determined. This determination may be made by performing a Fourier transform on a plurality of sequential dark frames. An FFT may be used to generate a noise spectrum in this manner. The frequency resolution of this measurement will be proportional to the number of frames used to generate it; for this reason, it may be desired to record a large number of frames. The noise spectrum may in some cases identify pixel-by-pixel noise spectra, and may in some cases identify noise spectra averaged over a plurality of pixels, including for example all pixels. Further implementations may record data at only a small number of pixels to increase the speed at which frames may be recorded. Alternatively or in combination, the ambient noise spectrum may be generated using measurements from an independent sensor. The noise spectrum generated by step 2201 may relate measured noise as a function of frequency, for example as depicted in FIG. 21. The sensor data can be transmitted to a remote server and the noise determined and processed with the spectral data remotely, for example. The modulation of the measurement beam can be performed in response to instructions from the remote server, for example. Alternatively, the modulation of the measurement beam may comprise preset instructions to avoid sources of noise as disclosed herein.

In step 2202, one or more frequency bands are identified in which noise is relatively low. These bands may correspond to local minima in the noise spectrum, as can be found for example by a peak finding algorithm. In some cases, the frequency bands may be identified by finding local maxima in the measured noise, then choosing frequencies that are at least a minimum desired distance away from the noise maxima in order to substantially decrease noise. In many cases, it may be preferred to choose a frequency high enough to avoid 1/f noise, and this may be accomplished in many ways, such as designating a band of low frequencies as undesirable, or by weighting a plurality of candidate frequency bands to favor those at higher frequencies. In some cases, certain frequencies may be pre-designated as undesirable; for example, frequencies near certain multiples of 50 or 60 Hz may be designated as undesirable to avoid electronic or light noise due to AC power sources.

In step 2203, a modulation frequency is chosen from one of the identified bands. This choice may be made on a variety of bases, such as choosing the global minimum of noise, or choosing the maximum distance from noise maxima, or choosing among a set of local minima, for example. The chosen frequency may further comprise a set of chosen frequencies, which may be useful, for example, when multiple light sources are to be modulated at different frequencies. When choosing more than one frequency, the chosen frequencies may be selected from a set of frequencies within one band, of from more than one band, and the differences in frequencies may be adjusted to improve accuracy in future demodulation.

In step 2204, the chosen frequencies are assigned to be used in modulation. This assignment may be performed automatically by setting a variable modulation frequency to a chosen frequency, and may in some cases involve an optional user confirmation. This step may also be performed by defining a fixed set of frequencies for future use, for example in the process of manufacturing the spectrometer.

In step 2205, the one or more chosen frequencies are used to modulate one or more light sources, for example, in Frequency Division Modulation. By recording images or other sensor data taken during light modulation, then demodulating the recorded data, detected signals may be retrieved, allowing each light source to be identified by its corresponding frequency. When multiple different light sources are used, such as a plurality of LEDs, each light source may be modulated at a different frequency. In some cases, the different frequencies may be selected from separate bands, and in some cases one or more frequencies may be selected from the same band.

In step 2206, the user directs the spectrometer at a sample. This allows the modulated light sources to illuminate the sample.

In step 2207, the user directs the detector of the spectrometer to view the illuminated sample. This step may include the user confirming that the modulated light sources are illuminating the correct portion of the sample, as well as confirming that the sample is within the field of view of the detector.

In step 2208, the spectrometer records signals such as images to measure the light scattered from the sample. In some cases, this measurement will comprise a plurality of signals. Data representing these signals may be stored in memory for processing, processed on-the-fly, or processed remotely as described herein.

In step 2209, the associated processor processes the measured light. This step may include one or more demodulation steps for each modulation frequency, to recover a spectrum corresponding to each modulated light source while eliminating noise. This may alternatively or additionally include a step of subtracting a recorded dark frame, or a combination of multiple dark frames, from one or more recorded signals. This step allows the isolation of one or more signals corresponding to one or more light frequencies.

In step 2210, one or more spectra are determined from the signals isolated in step 2209. These spectra may correspond to measured powers at one or more frequencies of emitted and/or scattered light. In some cases, the spectra may be corrected for the relative strengths of different illuminating beams; for example, the amplitudes corresponding to each of a plurality of light sources may be divided by the intensities of each respective light source, then combined to create a normalized spectrum.

Another method of modulation that may alternatively or additionally be employed involves spatial recording of modulation data. In sensors such as CMOS sensors comprising a rolling shutter architecture, the rolling shutter may be exploited to allow modulation at frequencies much higher than the sensor frame rate. Because a rolling shutter exposes different pixel columns to incident light at different times, a single frame such as an image frame may comprise a spatial encoding of time information.

Each pixel column may then be treated as an independent frame measurement, separated by an amount of time given by the rate at which the shutter exposes pixels. A spatial Fourier transform along the direction of shutter movement may then be used to extract frequency information, giving a column of frequency spectra, one for each row of pixels. When performed on one or more dark frames, this sequence of measurements may then be used in conjunction with method 2200 to achieve a noise spectrum at higher frequencies and/or with fewer frames recorded. Similarly, use of a rolling shutter in conjunction with a probe beam may allow spectroscopy to be performed with high modulation frequency, due to the high effective frame rate. Because rolling shutter measurements encode temporal data spatially, light with substantial spatial inhomogeneity may give rise in some cases to false frequency measurements. For this reason, rolling shutter measurements is most useful in situations where incident light is more spatially uniform.

Support Array

Referring again to FIGS. 7-9 and 16A-B, a compact spectrometer as described herein may comprise a plurality of optical channels 177, each channel corresponding to a filter of a filter array 170, a lens of a lens array 174, and a sensor area of an image sensor 190. A support array 176, comprising the plurality of optical channels, can be placed between the lens array and the image sensor to provide the correct separation distance between the lens array and the image sensor, and to prevent stray light from entering or exiting each channel, as described herein. As best seen in FIGS. 8 and 9, each channel 177 of the support array 176 can be defined by a first opening 1771 adjacent the lens array, a second opening 1772 adjacent the image sensor, and a channel wall 179 extending between the first opening and the second opening. Each channel can provide a controlled light path from the lens to the sensor, wherein the channel wall may be configured to absorb light (e.g., via black coating) such that light does not pass between channels or reflect back from the wall into the channel. Light exiting from the second opening of each channel can reach a sensor area, wherein the sensor area may comprise one or more sensor elements configured to detect the light exiting the channel.

The spectrometer can be configured to inhibit cross-talk. Referring again to FIGS. 7-9 and 16A-B, a channel 177 may extend from the lens array 174 to a stopper mounting 178, wherein the stopper mounting secures the support array 176 to the image sensor 190. In this configuration, the second opening 1772 of each optical channel is separated from the image sensor by a distance substantially corresponding to the thickness of the stopper mounting, such that the wall each channel does not extend all the way to the image sensor. Consequently, light exiting from the second opening of a channel may not only reach the sensor area corresponding to the channel, but may also "crosstalk" or reach into one or more adjacent sensor areas corresponding to one or more neighboring channels. The extent of the crosstalk between adjacent channels may be controlled by controlling the distance between the channels and the image sensor, for example by varying the thickness of the stopper mounting.

Figure 23:
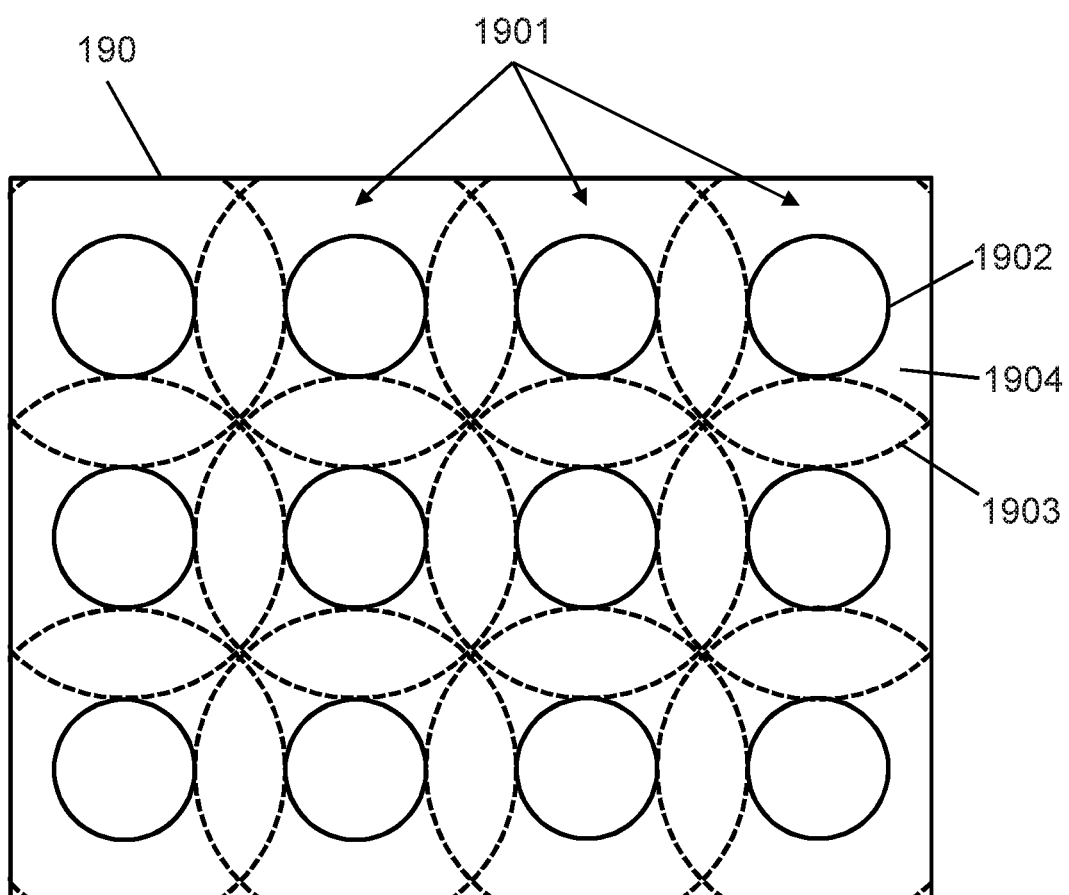
FIG. 23 schematically illustrates the crosstalk between channels of a sensor array.

FIG. 23 schematically illustrates the crosstalk between channels detected by an image sensor as described herein. The image sensor 190 can comprise a plurality of sensor areas 1901 configured to detect light arriving at the image sensor through the plurality of channels formed by the support array. Each sensor area 1901 can comprise an imaging portion 1902 comprising the sensor elements from which data is collected. As shown in FIG. 23, the imaging portion can have a round or substantially circular shape, to match a round or substantially circular shape of the second opening of the channel facing the image sensor. Light exiting from the second opening of each channel may hit the image sensor in a pattern 1903, whose area can depend on the distance between the second opening of the channel and the image sensor area. As this distance is increased, the area of the pattern of light incident on the image sensor can increase. As this distance approaches zero, the area of the pattern of light incident on the image sensor can approach the area of the second opening of the channel. The distance between the second channel opening and the image sensor may be adjusted and configured such that light exiting from one channel hits the image sensor with a pattern 1903 that does not overlap with the imaging portions of sensor areas corresponding to neighboring channels, as shown in FIG. 23. In such a configuration, even though there is some crosstalk at the image sensor between adjacent sensor areas corresponding to neighboring channels, this crosstalk is limited to non-imaging portions 1904 of the image sensor, disposed about the periphery of the imaging portions. The non-imaging portion 1904 may comprise a portion of the sensor array from which sampled pixels are excluded from the analysis of the spectral data. Since the stray light from adjacent channels does not encroach the imaging portion that forms the image of the detected light from one channel, interference among signals detected from different sensor areas of the image sensor can be inhibited, for example minimized.

In the example shown in FIG. 23, the image sensor 190 may have a length within a range from about 3-6 mm, for example about 4.8 mm, and a width within a range from about 2 mm to about 4 mm, for example about 3.6 mm. The image sensor may comprise an array of 12 sensor areas 1901, each having a circular, central imaging portion 1902 with a diameter of about 0.8 mm. Each imaging portion may be separated from an adjacent imaging portion a distance within a range from about 0.3 to about 1 mm, for example about 0.8 mm. The distance between the second openings of the channels and the image sensor may then be configured such that light exiting from the second opening of a channel hits the image sensor in a circular pattern 1903 having a diameter of about 1.6 mm. In this way, the pattern of light from one channel incident on a sensor area may cross over into only non-imaging portions of adjacent sensor areas.

Increasing the area of the imaging portion of each sensor area can have important advantages for a compact spectrometer as described herein. For example, larger imaging portions can allow light of higher angles of incidence to be detected by the image sensor, thus extending the spectral range covered by each optical channel. However, in configurations as described wherein the channel walls do not extend all the way to the image sensor, the size of each imaging portion of a sensor area can be limited by the crosstalk between channels. For example, in the configuration shown in FIG. 23, increasing the area of the imaging portion 1902 of each sensor area 1901 would result in the increase in interference among signals detected from different sensor areas of the image sensor, due to the crosstalk between adjacent sensor areas.

Figure 24B:
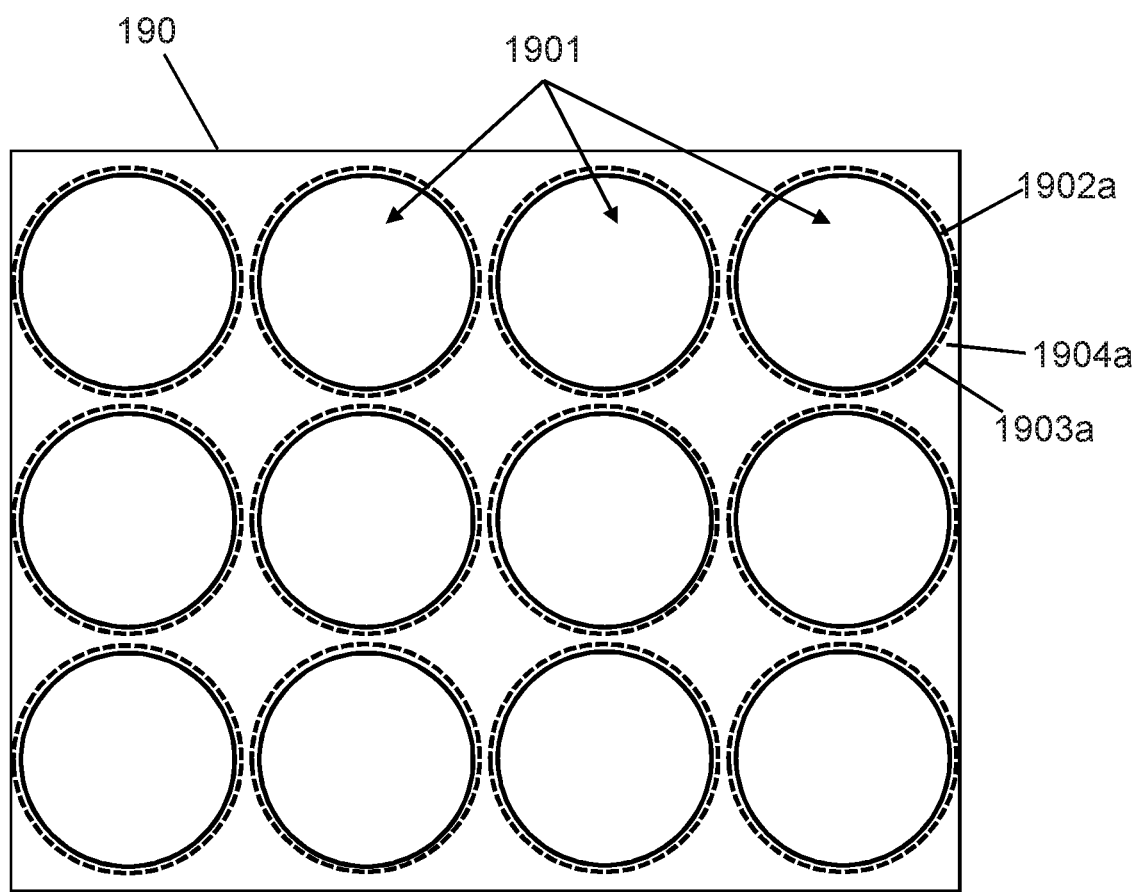
FIG. 24B schematically illustrates the light pattern detected by the image sensor for the support array configuration of FIG. 24A.

To increase the area of imaging portions of an image sensor without increasing crosstalk between optical channels, a support array may be configured such that the channel walls extend all the way to the image sensor. FIG. 24A shows a cross-sectional view of an optical subassembly comprising an exemplary embodiment of a support array. The optical subassembly 165a comprises a filter matrix 170, aperture array 172, lens array 174, and image sensor 190 as described herein. The optical subassembly further comprises a support array 176a having a plurality of optical channels 177a, each optical channel defined by a first opening 1771a adjacent the lens array, a second opening 1772a adjacent the image sensor, and a channel wall 179a extending between the first opening and the second opening. As shown, the channel walls can extend all the way to the image sensor, such that each channel is optically isolated from other channels through the entire light path from the lens array to the image sensor. In this configuration, light exiting each channel from the second opening 1772a directly hits the corresponding sensor area of the image sensor, such that the pattern of light incident on the sensor area can substantially correspond to and match the size and shape of the second opening of the channel. FIG. 24B schematically illustrates the light pattern detected by the image sensor for the support array configuration of FIG. 24A. As shown, the pattern 1903a of light incident on each sensor area 1901 of the image sensor 190 does not overlap with the patterns of light incident on adjacent sensor areas. Thus, the imaging portion 1902a of each sensor area can be increased in size to substantially overlap with the area of the pattern of light incident on each sensor area, and the area of non-imaging portions 1904a of the image sensor can be substantially reduced.

Alternatively to or in combination with extending the channel walls all the way to the image sensor, a support array may be modified in shape to further increase the size of the imaging portions of the image sensor. As described herein, each channel of a support array may comprise a first opening adjacent the lens array, a second opening adjacent the image sensor, and a channel wall extending between the first opening and the second opening. Both the first opening 1771 and the second opening 1772 of each channel 177 may be round or substantially circular in shape, thereby defining a substantially cylindrical channel therebetween, for example as shown with reference FIGS. 8-9. In many embodiments, the first opening adjacent the lens array can be round in order to provide an aperture stop to control the optical performance of the system. The second opening adjacent the image sensor may have any shape, which can be optimized to maximize the area of the imaging portions at the image sensor.

Figure 25A:
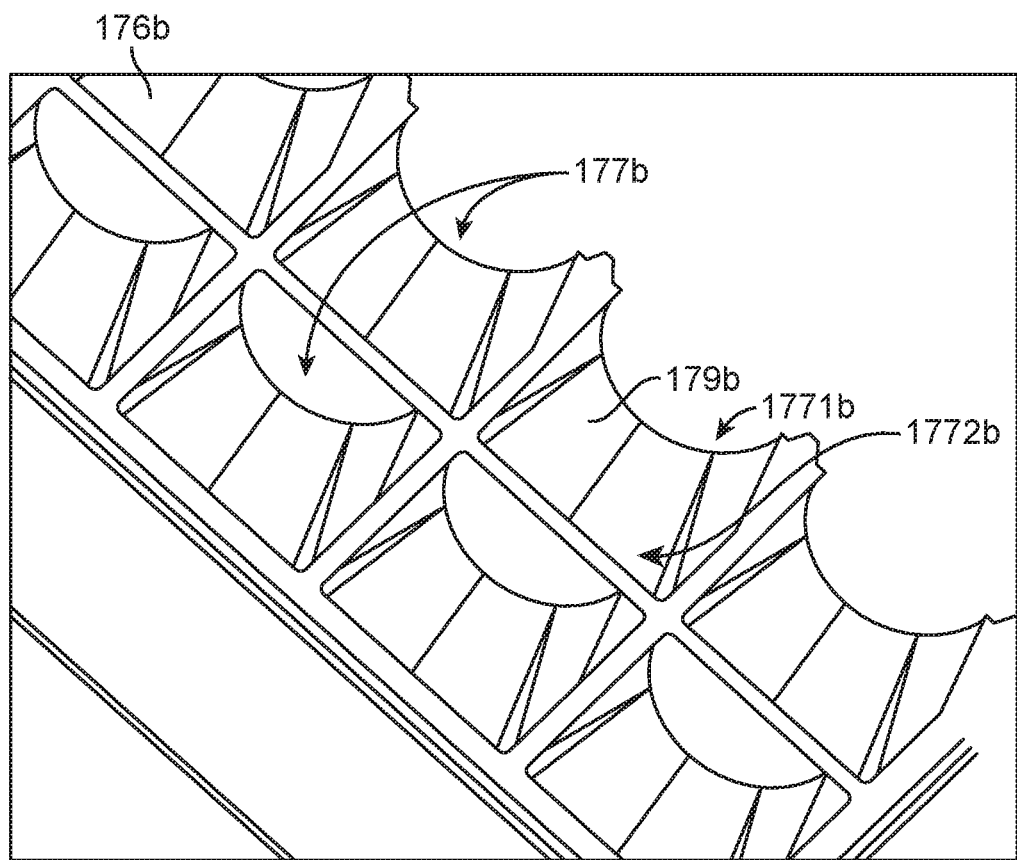
FIGS. 25A-25C illustrate an exemplary embodiment of a support array comprising channels having square-shaped openings facing the image sensor.
Figure 25B:
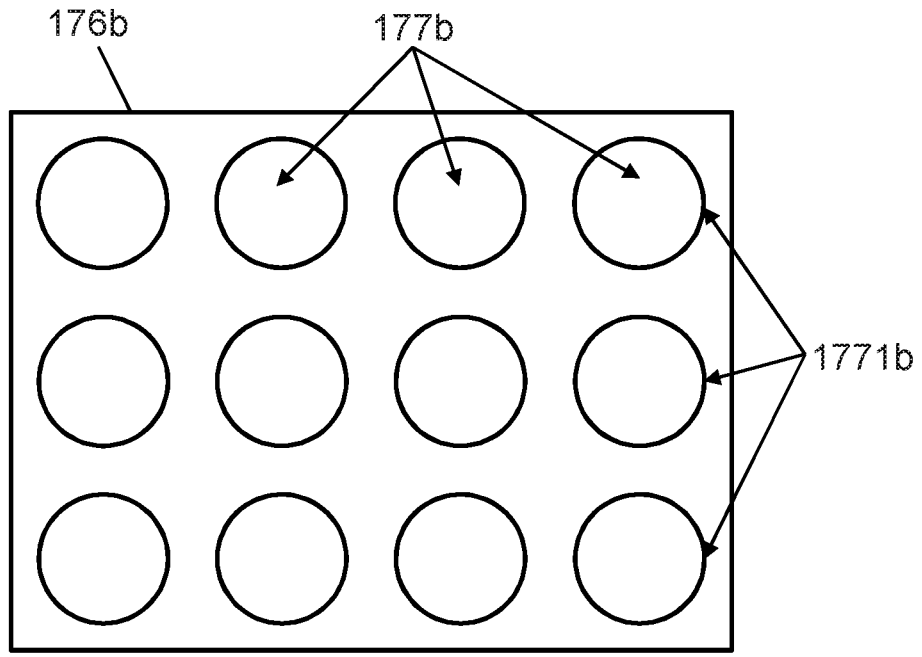
Figure 25C:
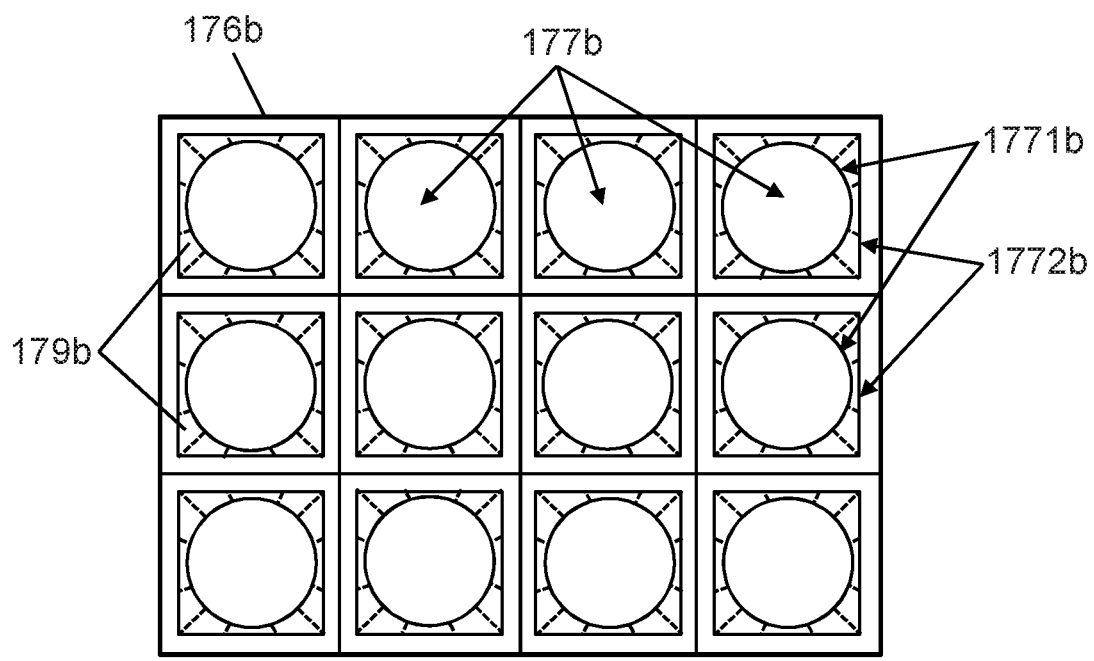

FIGS. 25A-C illustrate an exemplary examples of a support array comprising channels having rectangular openings facing the image sensor, for example square-shaped openings facing the image sensor. FIG. 25A shows a sectional view; FIG. 25B shows a top view; and FIG. 25C shows a bottom view of the support array 176b. The support array 176b comprises a plurality of channels 177b each defined by a first opening 1771b facing the lens array, a second opening 1772b facing the image sensor, and a channel wall 179b extending between the first opening and the second opening. As illustrated in FIG. 25B showing the top view of the support array 176b, wherein the top view comprises the view from the lens array side, the first opening 1771b may have a round shape to provide an aperture stop at the lens. As shown in FIG. 25C showing the bottom view of the support array 176b, wherein the bottom view comprises the view from the image sensor side, the second opening 1772b may have a rectangular or substantially square shape, for example. Accordingly, the channel walls 179b may transition from a round shape to a rectangular or square shape over the length of the channel.

Figure 25D:
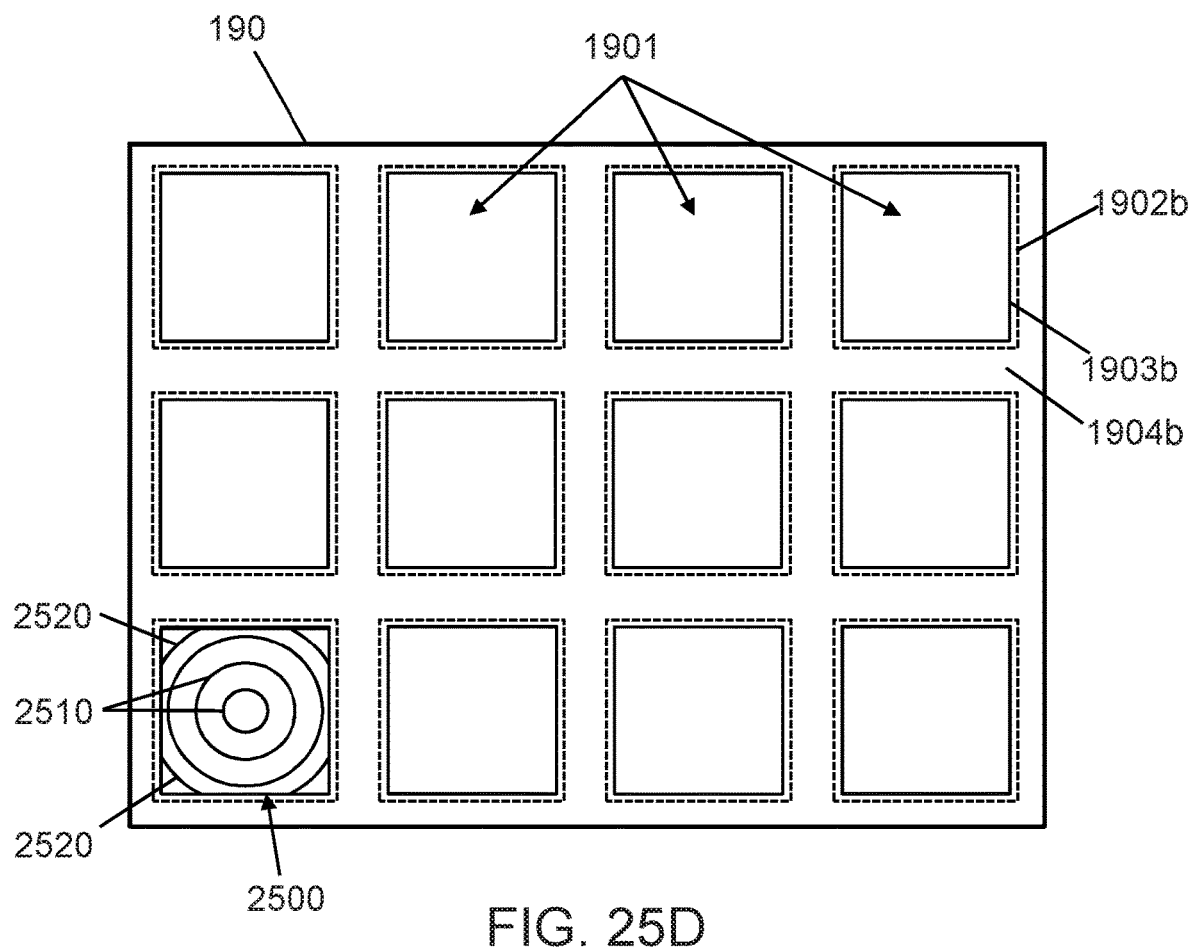
FIG. 25D schematically illustrates the light pattern detected by the image sensor for the support array configuration of FIGS. 25A-C.

FIG. 25D schematically illustrates the light pattern detected by the image sensor for the support array configuration of FIGS. 25A-C. Light exiting from the square-shaped second openings of the channels can create substantially a square-shaped pattern 1902b of light on each sensor area 1901 the image sensor 190. Accordingly, the image sensor can be configured to have square-shaped imaging portions 1903b to detect the intensity of the incident light having the square-shaped patterns. A square-shaped imaging portion can have a larger area compared to a round-shaped imaging portion of an image sensor having approximately the same size and number of sensor areas (such as imaging portion 1902a of FIG. 24B). The square images thus created on the image sensor can provide additional information compared to round images created by round-shaped imaging portions, for example at the corners of the square images. This additional information can increase the spectral range of light detected at each sensor area, since the additional area of the square-shaped imaging portions can capture incident light with higher angles of incidence. In embodiments wherein the channel walls extend all the way to the image sensor, the square-shaped pattern of light incident on the image sensor can have an area that is similar to the area of the second opening of the channel, such that the pattern of light on each sensor area does not overlap with the patterns of light incident on adjacent sensor areas. Thus, the imaging portion 1903b of each sensor area can be increased in size to substantially overlap with the area of the pattern of light incident on each sensor area, and the area of non-imaging portions 1904b of the image sensor can be substantially reduced.

While the spectrometer can be configured in many ways, the filter and lens array as described herein can be configured to provide an annular spectral pattern 2500 on each rectangular sensor area. For example, the filters many comprise interference filters with coatings or etalons and combinations thereof. The annular spectral pattern may comprise annular variations in intensity 2510 corresponding to spectral lines of the spectrum from the object. The annular patterns may comprise segments 2520 extending into the corner portions of imaging portion 1903b of each sensor area. These annular segments provide additional spectral data and information that can increase the resolution of the spectrometer. The processor coupled to the detector can be configured to receive the spectral data from the corner portions. The processor as described herein can be configured to measure the spectrum of the object in response to the annular segments extending into the corner portions of the imaging portions. The processor may comprise a remote processor such as a cloud based server, for example.

Figure 26:
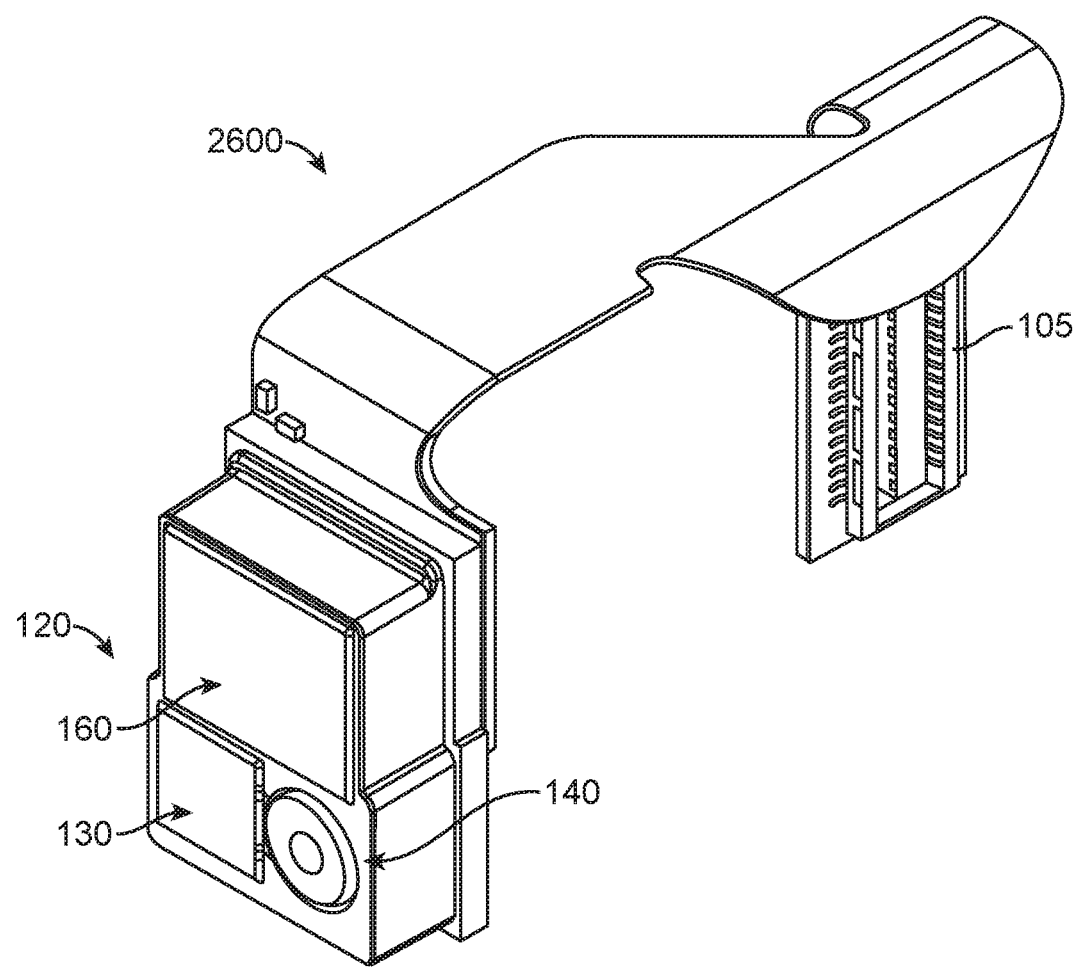
FIG. 26 shows an oblique view of an exemplary optical module assembly of a compact spectrometer.

FIG. 26 shows an oblique view of an exemplary optical module assembly of a compact spectrometer. The optical module assembly 2600 comprises a spectrometer head 120 and a control board 105 as described herein, wherein the spectrometer head is configured to measure a sample material, and the circuit board is configured to receive data from the spectrometer head and transmit, store, and/or analyze the data. The spectrometer head comprises a spectrometer module 160 and an illumination module 140, and may optionally comprise a sensor module 130 as described herein. For example, the spectrometer module may comprise a filter matrix, lens array, and a 2-dimensional image sensor as described herein, wherein the lens array may be coupled to the image sensor via a support array comprising a plurality of channels having round-shaped openings facing the lens array and square-shaped openings facing the image sensor, as described herein. The data generated the imaging portions of the image sensor may be transmitted to the circuit board for processing. The control board 105 may comprise circuitry to process the signal from the sensor as described herein. A flex circuit board may extend from the spectrometer head 120 to the control board 105. A support comprising an extension can extend between the spectrometer head and control circuitry. Alternatively or in combination, the processor circuitry can be mounted on the flex printed circuit board, for example.

Lateral Diffuser

Referring again to FIG. 1A, in some cases, light emanating from a sample S can reach the input port of the spectrometer module 160 (e.g., spectrometer window 162) such that the sample light is distributed evenly or unevenly across the front surface of the input port. The sample light may include light originated from the integrated light source of the spectrometer (e.g., at least a portion of the optical beam 10 generated by the illumination module 140 that is reflected back by the sample), and/or light originated from the environment (e.g., ambient light). The light that is originated from the integrated light source and reflected from the measured sample may be affected by various geometrical deviations related to the measured sample and/or configurations of the spectrometer. For example, the geometrical deviation may comprise uneven light distribution across the surface of the spectrometer input port, or different angles of incidence of the sample light with respect to the surface of the input port.

Sources of geometrical deviations may include, for example: 1) Differences in distances between various portions of the sample and the integrated light source of the spectrometer, combined with differences in distances between the illuminated portions of the sample and different locations of the spectrometer input port (differences in distances between various portions of the sample and the light source lead to uneven illumination of the sample surface, especially as the distance between the sample surface and the light source decreases; differences in distances between illuminated portions of the sample and the spectrometer input port leads to uneven distribution of input light intensity across the input port, especially as the distance between the sample surface and the light source decreases); 2) Uneven reflection of light from sample may cause uneven spread of light across the front surface of the spectrometer input port; 3) Measuring a sample while holding the spectrometer tilted with respect to the sample surface; 4) Dirt and particles on the outside surface of the spectrometer input port, blocking some of the incoming light with a non-uniform geometrical distribution; 5) Uneven illumination when using the device with various accessories. One or more of these reasons, in addition to various other reasons not listed, may result in geometrical deviations of light incident on the spectrometer input port.

Disclosed herein are methods and devices for spatially spreading the incoming sample light before the light reaches the optical detector of the spectrometer, to improve the uniformity of the spatial distribution of light on the detector. For example, the methods and devices can spatially distribute the light from the sample substantially evenly across a front surface of the spectrometer configured to receive the light, such as across a lateral dimension of a filter array. The substantially even spatial distribution of light can be uniform across the front surface of the spectrometer to within about 25%, or to within about 10%. For example, light can be distributed substantially even across a lateral dimension of the filter array such that the light transmitted to each filter of the filter array can be substantially homogenous with respect to the spatial distribution profile. These methods and devices may be incorporated with any embodiment of a compact spectrometer as described herein.

Figures 27A, 27B:
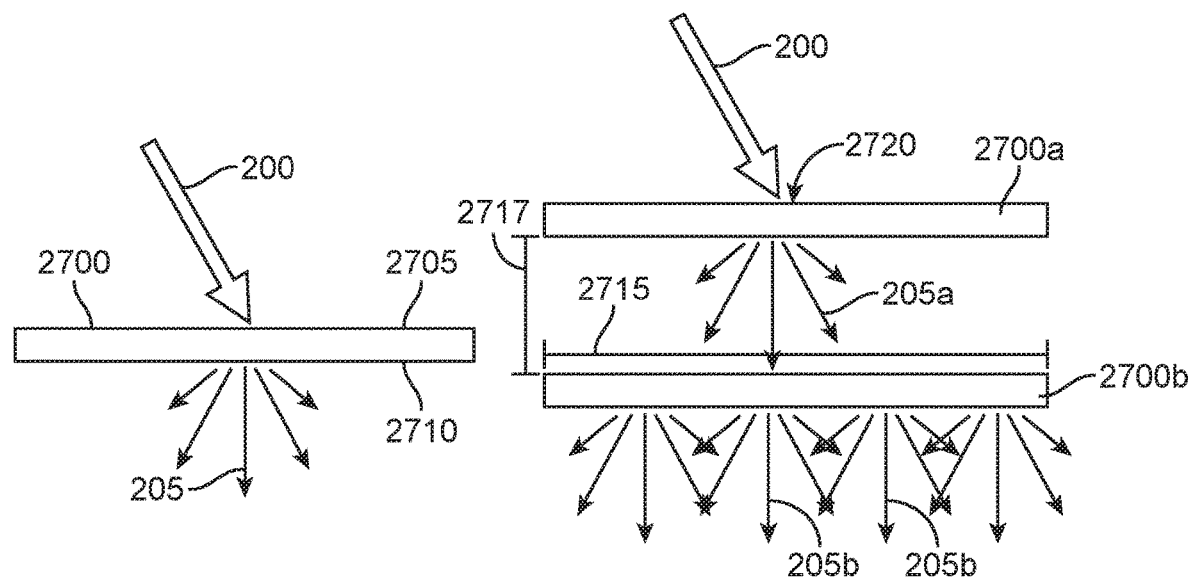
FIGS. 27A and 27B schematically illustrate the lateral distribution of light transmitted through one or more cosine diffusers.

FIGS. 27A and 27B schematically illustrate the lateral distribution of light transmitted through one or more cosine diffusers 2700. In some cases, the spectrometer may comprise one or more cosine diffusers configured to receive the input light from the sample and transmit diffuse light. For example, a single cosine diffuser may be placed adjacent to or may be attached to the front or back surface of the spectrometer input port (such as spectrometer window 162 shown in FIG. 1A and FIG. 7), to spread the input light emanating from the sample before the light enters the spectrometer module. The cosine diffuser may comprise a thin flat polymer, an engineered diffuser, or any other type of diffuser known in the art, preferably having a Lambertian transmittance function. FIG. 27A illustrates the configuration with a single cosine diffuser 2700, wherein the incident light 200 from the sample impinges on front or outer input surface 2705 of the cosine diffuser that faces the sample. Light is transmitted through the diffuser such that diffuse output light 205 exits the diffuser from the back or inner output surface 2710 of the diffuser that faces away from the sample. For example, cosine diffuser 2700 may be equivalent to first diffuser 164 as shown in FIG. 7, wherein light from the sample enters the spectrometer module 160 through the spectrometer window 162 and is transmitted through the diffuser 164 to enter the light filter 188 and/or remaining optical components of the spectrometer module. As illustrated in FIG. 27A, the distribution of the transmitted diffuse light can be substantially Lambertian, such that the light is scattered to all directions of the hemisphere above the output surface. An ideal or perfect Lambertian diffuser would have a true cosine function output, wherein the incident light is scattered equally to all directions of the hemisphere on the side of the output surface 2710. However, existing Lambertian diffusers typically do not have an ideal or perfect Lambertian output due to one or more of many reasons. For example, depending on the diffusing properties of the diffuser, some of the input light may be transmitted through the diffuser without scattering, such that input light of a certain angle of incidence may translate to output light having a corresponding angle of transmission. Additionally, the output angles of the transmitted diffuse light may not have a true cosine distribution. Therefore, the distribution of output light from the diffuser may have a relatively higher intensity at small angles of transmission (e.g., perpendicular to the diffuser surface), and relatively lower intensity at large angles of transmission (e.g., 45° with respect to the normal to the diffuser surface).

FIG. 27B illustrates a configuration with two cosine diffusers 2700a and 2700b. Incorporating two or more cosine diffusers into the spectrometer can help reduce the variation in the lateral distribution of output light across a width 2715 of the diffuser, thereby providing a more laterally uniform distribution of diffuse output light. For example, as shown in FIG. 27B, the output light 205a from the first cosine diffuser 2700a can be have a relatively narrow lateral distribution that is focused about the location 2720 on the first diffuser where the incident light 200 impinges on the first diffuser. The diffuse output light 205a from the first diffuser can subsequently enter the second diffuser 2700b at various locations across the width of the diffuser, such that the output light 205b from the second diffuser can have a relatively wider lateral distribution.

Output light 205b from the second diffuser can have an intensity distribution that varies across the width or the area of the diffuser. For example, output light exiting the second diffuser at locations relatively farther from the location 2720 on which the incident light 200 impinges on the first diffuser can have a relatively lower intensity compared to output light exiting the diffuser at locations relatively closer to the location 2720. To reduce this spatial variation in the intensity of output light, the separation distance 2717 between the two diffusers can be increased. The spectrometer can be configured with two or more diffusers that are separated by a distance 2717 that is greater than or substantially similar to a width of the desired light output area. For example, the two diffusers can be separated by a distance that is approximately half of the output lateral dimension of the filter array (e.g., half of the width of filter matrix 170 shown in FIG. 7; ~4-5 mm in some exemplary configurations), but greater than 3 times the lateral dimension of the lens aperture (e.g., diameter of an aperture 194 of the aperture array 172, as shown in FIG. 9; ~0.8 mm in some exemplary configurations). Greater separation distance between the diffusers can provide better uniformity in the intensity distribution of the output light. Greater separation distance between the diffusers can also result in decreased overall intensity of the output light. One exemplary configuration of the first cosine diffuser 2700a and second cosine diffuser 2700b in an optical stack is shown in FIG. 7. The first cosine diffuser 2700a may correspond to the first diffuser 164, and the second cosine diffuser 2700b may correspond to the second diffuser 166, wherein a light filter 188 or other optical component may be disposed between the two cosine diffusers in the optical stack in order to place the two diffusers at a desired separation distance. The light filter 188 or other optical component positioned between the two cosine diffusers may have a thickness that matches a desired separation distance between the two diffusers to achieve a specific lateral distribution profile.

The spectrometer can be configured with more than two cosine diffusers, such as three or more diffusers, arranged sequentially along the optical path of the light from the sample.

Alternatively or in addition to the cosine diffusers as shown in FIGS. 27A-B, which can angularly distribute transmitted diffuse light in a cosine manner, lateral diffusers configured to spatially distribute light in the lateral dimension can also be incorporated into the spectrometer. A lateral diffuser can be configured to receive input light having a first lateral distribution along a lateral dimension of the diffuser (e.g., width of the diffuser), and transmit output light having a second lateral distribution that is greater than the first lateral distribution. A lateral diffuser can have a greater thickness and/or comprise microstructures configured to diffuse incoming light laterally across its width.

Figure 27C:
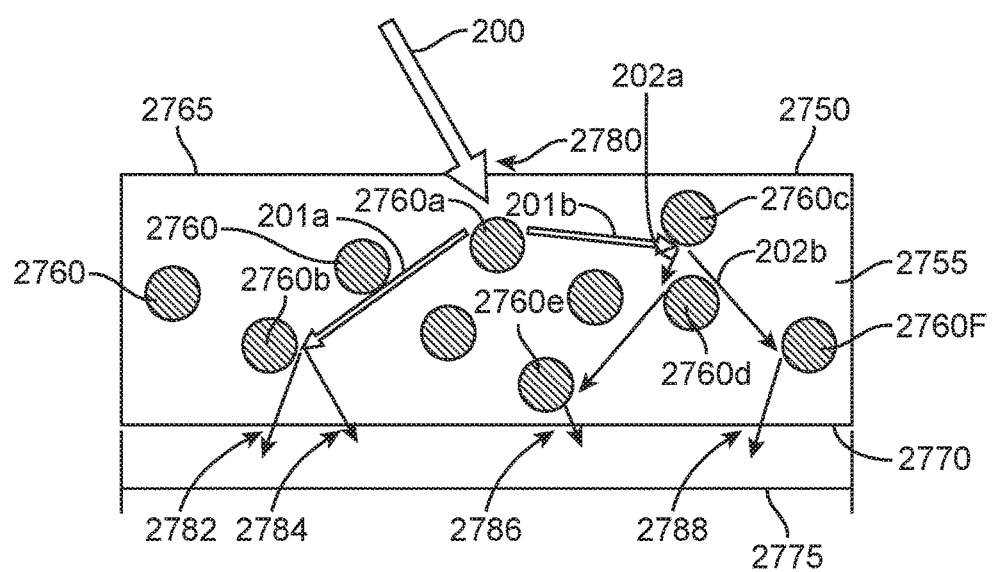
FIG. 27C illustrates an exemplary configuration of a lateral diffuser.

FIG. 27C illustrates an exemplary configuration of a lateral diffuser 2750. The lateral diffuser 2750 may comprise a support material 2755 and a plurality of scattering structures 2760 disposed within the support material. The refractive index of the scattering structures may be greater than the refractive index of the support material surrounding the scattering structures, in order to effectively scatter the light that impinges upon each scattering structure. For example, the support material may comprise a plurality of plates made from transparent resin, and the plurality of scattering structures may comprise a plurality of particles having a refractive index greater than the refractive index of the resin to efficiently scatter the incident light. Alternatively, the lateral diffuser may comprise a porous diffuser wherein the support material comprises polytetrafluoroethylene)(PTFE/Teflon®, polystyrene, or other diffusive material, and the plurality of scattering structures comprises a plurality of pores. The plurality of scattering structures may be non-overlapping or partially overlapping.

The diffusivity of a lateral diffuser and hence the extent of lateral distribution of input light exiting the lateral diffuser may be controlled by varying one or more of the refractive index of the scattering structures, refractive index of the support material, the size of the scattering structures, the number or density per unit volume of the scattering structures, and the overall thickness of the diffuser. The thickness of the lateral diffuser and the size and density of the plurality of scattering structures may be arranged such that a majority of light exiting the lateral diffuser is scattered by at least two light scattering structures. One or more properties of the lateral diffuser can be controlled to configure the diffuser such that for input light having any full-width half maximum (FWHM) value, the FWHM of the output light is in a range which is relatively large compared to the size of each optical channel or each filter of the filter array. For example, in a lateral diffuser having a thickness of about 100 um, comprising scattering particles having a diameter of about 10 um at a particle concentration of about 2.5%, assuming ideal scatter wherein the light is very efficiently scattered in substantially all directions, input light of any spot size may result in output light having a FWHM of at least about 0.3 mm.

In operation, the input light 200 incident on the input surface 2765 of the lateral diffuser hits one or more of the plurality of scattering structures as the light is transmitted through the diffuser. The scattering structures can scatter the incident light in a plurality of directions, as shown in FIG. 27C, and the scattered light can subsequently hit one or more additional scattering structures before exiting the diffuser from the output surface 2770. The input light can eventually exit the diffuser from the output surface 2770 at various locations along the width 2775 of the diffuser depending on their direction of scatter. Thus, the input light 200 impinging upon the input surface of the lateral diffuser at a first location 2780 along the width of the diffuser can eventually exit the diffuser from the output surface at a plurality of locations along the width of the diffuser (e.g., second location 2782, third location 2784, fourth location 2786, and fifth location 2788), such that the transmitted diffuse light is scattered along the lateral dimension (e.g., width of the diffuser).

For example, the input light can hit a first scattering structure 2760a, scattering the light in a first direction 201a and in a second direction 201b. The light scattered in the first direction 201a can subsequently hit a second scattering structure 2760b, and light scattered in the second direction 201b can subsequently hit a third scattering structure 2760c. Light impinging on the second scattering structure 2760b can scatter in a plurality of directions and exit the diffuser from the output surface 2770 at the second location 2782 and third location 2784 along the width of the lateral diffuser. Light impinging on the third scattering structure 2760c can be further scattered in a first direction 202a and a second direction 202b. The light scattered in the first direction 202a can hit a fourth scattering structure 2760d, subsequently scatter in another direction to hit a fifth scattering structure 2760e, then exit the diffuser from the output surface 2770 at the fourth location 2786. The light scattered in the second direction 202b can hit a sixth scattering structure 2760f, and subsequently scatter in another direction to exit the diffuser from the output surface at a fifth location 2788.

Examples of commercially available lateral diffusers and additional details regarding the principle of operation of a lateral diffuser as herein described may be found on the Internet, for example, at http://www.entire.com.tw/english/product1.htm (Entire Technology Co. LTD diffuser plate) and http://www.chimeicorp.com/en-us/products/electronic-materials/optical-grade-diffuser-plate/(CHIMEI optical grade diffuser plate).

Optionally, a lateral diffuser may also be a cosine diffuser, configured to angularly distribute light according to a cosine function. In such a case, the same diffuser can both angularly and spatially distribute input light, such that the profile of transmitted diffuse light is substantially uniform both along a spatial or lateral dimension, as well as in the angular dimension.

Referring again to FIG. 7, the first diffuser 164 and/or the second diffuser 166 may comprise lateral diffusers, such as the lateral diffuser shown in FIG. 27C, configured to spatially distribute the input light along the lateral dimension. The lateral distribution of light by one or more of these first and second diffusers can improve the spatial uniformity of the sample light that enters the filter matrix 170. As described herein with respect to FIG. 7, diffusers 164 and 166 may also be cosine diffusers configured to angularly distribute light to generate output light having a substantially Lambertian distribution. In configurations wherein at least one of these diffusers is also a lateral diffuser, the thickness of the light filter 188 may be reduced, as less separation distance may be needed between the first and second diffusers to spatially distribute output light along the lateral dimension as described in reference to FIG. 27B. Both the first and second diffusers may be both cosine and lateral diffusers configured to distribute light angularly and spatially, or one of the two diffusers may be cosine diffuser while the other may be a lateral diffuser. Alternatively, the configuration as shown in FIG. 7 may be modified to have only a single diffuser that is both a cosine diffuser and a lateral diffuser. In such a configuration, the thickness of the light filter 188 may be significantly reduced as the light filter no longer needs to provide a separation distance between two diffusers. Optionally, the light filter 188 may be eliminated altogether, with one or more other optical components in the optical stack configured to provide the light-filtering function performed by the filter 188. For example, the spectrometer window 162 or the filter matrix 170 may comprise a material or coating configured to filter out wavelengths in the UV or visible region of the light spectrum.

One exemplary configuration of the first cosine diffuser 2700*a* and second cosine diffuser 2700*b* in an optical stack is shown in FIG. 7. The first cosine diffuser 2700*a* may correspond to the first diffuser 164, and the second cosine diffuser 2700*b* may correspond to the second diffuser 166, wherein a light filter 188 or other optical component may disposed between the two cosine diffusers in the optical stack in order to place the two diffusers at a desired separation distance. The light filter 188 or other optical component positioned between the two cosine diffusers may have a thickness that matches a desired separation distance between the two diffusers to achieve a specific lateral distribution profile.

Stray Light Reduction

Figure 28:
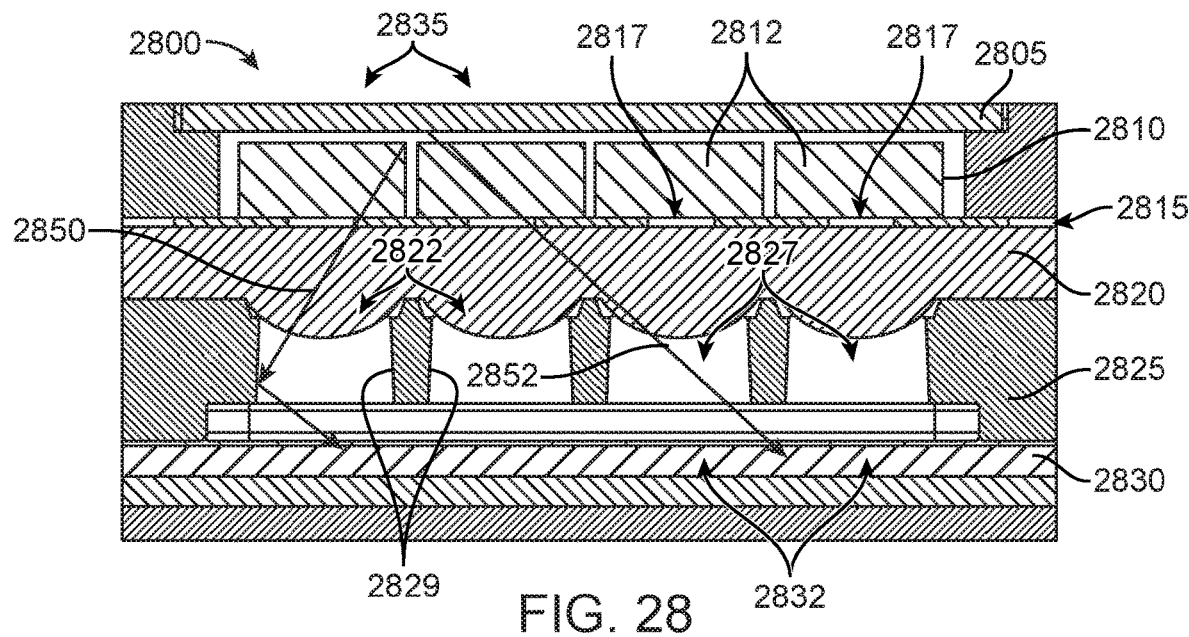
FIG. 28 illustrates an exemplary configuration of an optical stack of a filter array-based spectrometer, and the passage of stray light through the optical stack to the detector.

FIG. 28 illustrates an exemplary configuration of an optical stack of a filter array-based spectrometer, and the passage of stray light through the optical stack to the detector. Optical stack 2800 can be a portion of a spectrometer module as described herein (such as spectrometer module 160 as shown in FIG. 7). The optical stack 2800 may comprise a diffuser 2805, a filter array 2810 comprising a plurality of filters 2812, an aperture array 2815 comprising a plurality of apertures 2817, a lens array 2820 comprising a plurality of lenses 2822, a support array 2825 comprising a plurality of channels 2827, and a detector or image sensor 2830 comprising a plurality of sensor areas 2832. Each optical component can be similar in many aspects to a corresponding, similarly named optical component described elsewhere herein (e.g., diffusers 162 and/or 166, light filter 188, filter matrix 170, aperture array 172, lens array 174, support array 176, detector 190, etc., as shown in FIG. 7). The diffuser can be configured to receive light emanating from the sample being measured with the spectrometer, the filter array can be configured to receive the light transmitted through the diffuser, the lens array can be configured to receive the light transmitted through the filter array, and finally the image sensor can be configured to receive the light transmitted through the lens array. The aperture array can be disposed between the diffuser and the lens array, such that the light from the sample passes from the diffuser to the lens array through the apertures of the aperture array. The support array can be disposed between the lens array and the image sensor, such that the light passes from the lens array to the image sensor through the channels of the support array. The optical stack can comprise a plurality of optical channels 2835 corresponding to the plurality of filters, apertures, lenses, channels, and image sensor areas.

Diffuse light transmitted through the diffuser can enter the optical stack at many angles. Light that enters the optical stack at large angles with respect to the normal to the plane of the optical stack may be reflected from one or more channel side walls defining the channels of the support array, and reach the image sensor at unintended angles such that the light may be difficult to resolve spectrally. Alternatively or additionally, light entering the optical stack at large angles may pass from one channel to an adjacent channel, causing mixing of light between different optical channels and consequently ambiguity in the spectral resolution of the input light. Arrow 2850 illustrates stray light caused by the reflection of light from the channel side walls 2829 of the support array. Arrow 2852 illustrates stray light caused by the passing of light between adjacent channels.

The spectrometer can be configured in one or more of many ways to reduce or eliminate the amount of stray light that reaches the image sensor. For example, the aperture array may comprise a first aperture array layer and a second aperture array layer configured to limit the angles of light that can pass through the aperture array; the filter array may comprise an opaque material disposed between adjacent filters; the channel side walls of the support array may comprise micro features configured to redirect or absorb light having large angles; the support array may comprise channel bottom walls having a central openings therethrough; the optical stack may comprise angle limiting layers configured to limit the angles of light that enter the optical stack, such as a micro-louver film or a prism film. Each of these elements or features may be incorporated into a spectrometer as described herein alone or in combination with one or more other elements or features, to achieve the desired reduction of stray light as well as improved light transmission efficiency.

Figure 29A:
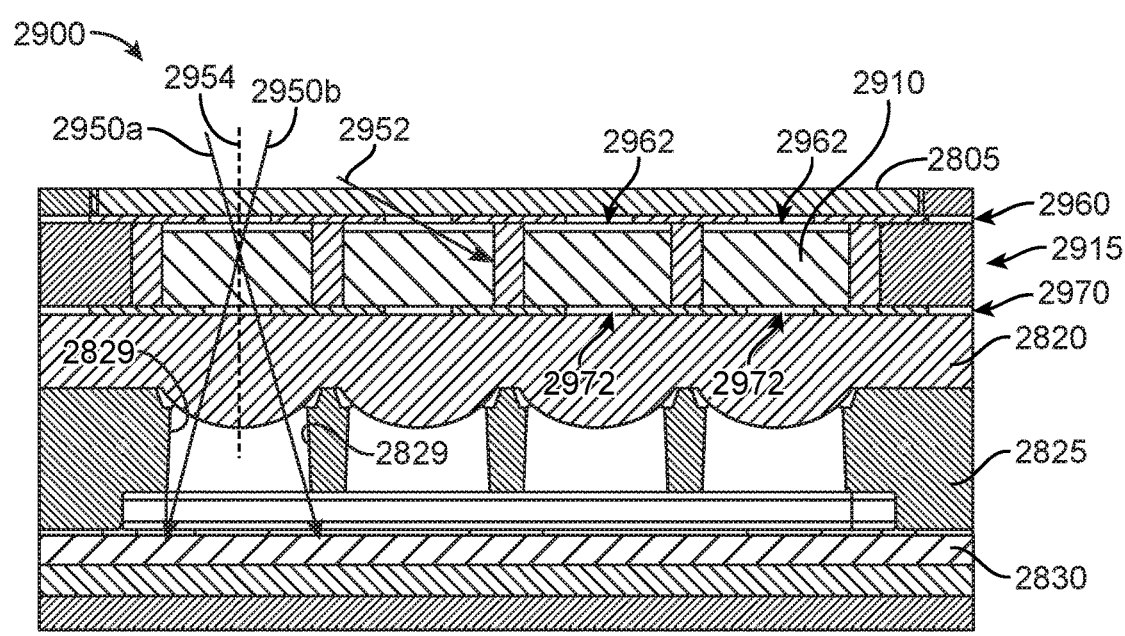
FIG. 29A illustrates an optical stack comprising two aperture array layers and an opaque material disposed between adjacent filters of the filter array.

Filter Array with Opaque Material, Aperture Array Comprising Two Aperture Array Layers FIG. 29A illustrates an optical stack comprising two aperture array layers and an opaque material disposed between adjacent filters of the filter array. Optical stack 2900 comprises a diffuser 2805, lens array 2820, support array 2825, and image sensor 2830 as described in reference to FIG. 28. The optical stack 2900 further comprises a filter array 2910 including an optional opaque material 2914 disposed between adjacent filters 2912 of the filter array. The optical stack 2900 further comprises an aperture layer 2915 comprising a first aperture array layer 2960 and a second aperture array layer 2970. As shown, the first aperture array layer may be disposed between the diffuser and the filter array, and the second aperture array layer may be disposed between the filter array and the lens array. The first aperture array layer comprises a first plurality of apertures 2962, and the second aperture array layer comprises a second plurality of apertures 2972 aligned with the first plurality of apertures.

The opaque material 2914 can comprise any material configured to prevent cross-talk of light between adjacent filters of the filter array, such as an opaque glue or coating configured to substantially absorb light that impinges upon the material. Arrow 2952 shows light entering the optical stack at a large angle of incidence, such that the light, if uninterrupted, would cross between two or more adjacent filters while traveling through the filter array. In the configuration of FIG. 29A, the light hits the opaque material disposed between two adjacent filters, and is substantially absorbed by the opaque material. Thus, the opaque material can prevent light entering the optical stack at large angles of incidence from reaching the image sensor. While FIG. 29A shows the opaque material 2914 used in combination with the two aperture array layer configuration, the opaque material may also be used with any other configuration of the optical stack, such as the single aperture array configuration shown in FIG. 28.

The first and second aperture array layers can be arranged to block light entering the optical stack at an angle of incidence outside a predetermined range that is deemed acceptable for the normal operation of the spectrometer. Arrows 2950*a* and 2950*b* show light entering the optical stack at the maximum angle of incidence 2954 allowed to pass through the aperture array 2915. As illustrated in FIG. 29A, light entering the optical stack at angles smaller than or equal to angle 2954 do not hit the channel side walls 2829 of the support array before reaching the image sensor. Thus, the double aperture array layer configuration can prevent the reflection of light from the channel side walls shown in FIG. 28.

Figure 29B:
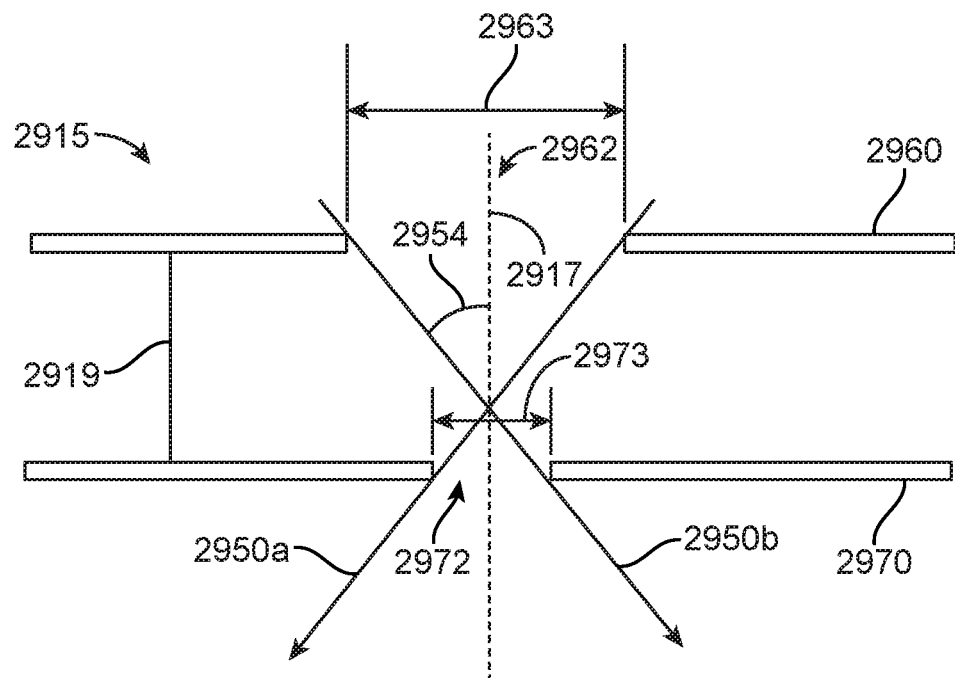
FIG. 29B schematically illustrates the passage of light through the first and second aperture array layers of FIG. 29A.

FIG. 29B schematically illustrates the passage of light through the first and second aperture array layers of FIG. 29A. A first aperture 2962 of the first aperture array layer 2960 and a corresponding second aperture 2972 of the second aperture array layer 2970 are aligned about a common central axis 2917 of the first and second apertures. Arrows 2950a and 2950b show light entering the optical stack at the maximum angle of incidence 2954 allowed to pass through the aperture array 2915. The first aperture can have a first diameter 2963 and the second aperture can have a second diameter 2973, wherein the ratio between the first diameter and the second diameter may be adjusted to control the maximum angle of light allowed to pass through both apertures. For example, the first diameter may be greater than the second diameter, the second diameter may be greater than the first diameter, or the first diameter and the second diameter may be equal. The first and second aperture arrays layers may separated by a separation distance 2919. The maximum angle of incidence 2954 allowed to pass can be controlled by arranging the first and second aperture array layers according to the following equation:

$$\alpha = \tan^{-1} \frac{\frac{L}{2} + \frac{S}{2}}{D}$$

wherein $\alpha$ is the maximum angle of incidence 2954 of light allowed to pass through the aperture array, L is the first diameter 2963 of the first aperture, S is the second diameter 2973 of the second aperture, and D is the effective separation distance between the first and second aperture array layers, or the free-space separation distance 2919 divided by the refractive index of the medium. Thus, one or more of the first diameter, the second diameter, and the separation distance may be adjusted to achieve a predetermined, desired value of the maximum angle of incidence 2954. For example, to achieve a maximum allowed angle of incidence of 40°, the first plurality of apertures can be configured to have a first diameter of about 1 mm, the second plurality of apertures can be configured to have a second diameter of about 0.68 mm, and the first and second aperture array layers can be disposed at a separation distance of about 1 mm. In many cases, the predetermined range for the angles of incidence of input light allowed to pass through the aperture array can be from about −40° to about 40° with respect to the normal to the plane of the optical stack. Depending on the specific configuration of the optical stack, the predetermined range can be increased to a wider range (e.g., from about −50° to about 50°), or decreased to narrower range (e.g., from about −30° to about 30°).

Support Array Channel Side Walls Comprising Micro Features

Figure 30A:
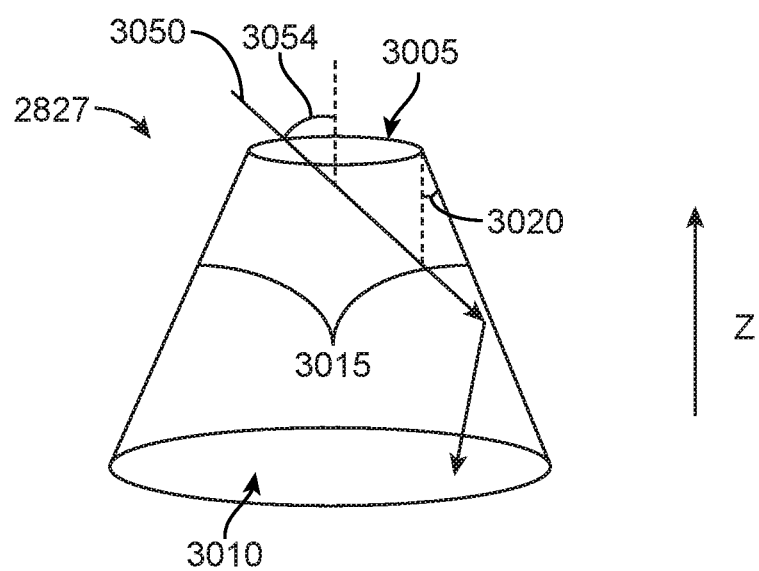
FIG. 30A illustrates an exemplary configuration of a channel of a support array.

FIG. 30A illustrates an exemplary configuration of a channel 2827 of a support array (e.g., support array 2825 shown in FIG. 28). The channel may have a frustum shape, such as the substantially frustoconical shape shown in FIGS. 28 and 30A, wherein a top opening 3005 of the channel is smaller than a bottom opening 3010 of the channel. Light 3050 entering the channel through the top opening at an angle 3054 with respect to the normal to the plane of the top opening that is outside a predetermined range of allowable angles may be reflected one or more times from the channel side wall 3015 before exiting the channel through the bottom opening. For example, light entering the channel at an angle 3054 that is greater than an angle 3020 (between a plane of the channel side wall 3015 and the normal to the plane of the top opening) may be reflected one or more times from the side wall. The side wall can be configured to reduce an intensity of light by at least about 90% after a single reflection of the light from the side wall. For example, the side wall can comprise a material or a coating configured to absorb at least about 90% of light hitting the side wall.

FIGS. 30B and 30C illustrate horizontal cross-sections of exemplary configurations of the channel of FIG. 30A. As shown in FIG. 30B, the channel 2827a can be defined by a continuous, rounded side wall 3016, such that the horizontal cross-section of the channel forms a circle. In this configuration, the light 3050 entering the channel at a large angle typically experiences a single reflection 3052 from the side wall before exiting the channel. Alternatively, the channel can be defined by two or more side walls connected at an angle relative to one another. For example, as shown in FIG. 30C, the channel 2827b can be defined by three or more straight side walls 3017 connected at one or more angles relative to one another, such that the horizontal cross-section forms a polygon. The polygon can have the shape a five-point star as shown in FIG. 30C, or can be any other polygon comprising any number of sides. In this configuration, the light 3050 entering the channel at a large angle may experience two or more reflections 3054, 3056 from two or more side walls before exiting the channel. Since each reflection of light from a side wall can result in the absorption of greater than 90% of the light energy by the side wall, each additional reflection of light can significantly reduce the total amount of reflected stray light. For example, assuming that the side walls 3017 of the channel 2827b of FIG. 30C absorb about 90% of the light hitting the side wall, light 3050 entering the channel can be reduced to about 10% of its original power after a first reflection 3054, and subsequently be reduced to about 1% of its original power after a second reflection 3056. After two or more reflections, the stray light that reaches the image sensor, if any, can typically comprise a very small amount of energy, thereby significantly reducing the effect of stray light on the spectral resolution of input light.

The side walls of the plurality of channels may be configured to provide substantially specular reflection of light from the side walls, for example by providing polished side walls. Alternatively or in combination, side walls of the plurality of channels may be configured to provide substantially diffusive reflection of light from the side walls, such that the reflected light may be scattered to many directions.

Support Array Channels Comprising Bottom Wall with Central Opening

In the configurations shown in FIGS. 30A-30C, light entering the channel at an angle that is outside a predetermined range of allowable angles may be reflected one or more times from one or more side walls of the channel, but in many cases can still exit from the channel at a low intensity. The channel may be configured in a different way to prevent at least some of the stray light from exiting the channel and traveling towards the image sensor.

FIG. 31 illustrates a configuration of a support array channel 3100 comprising a bottom wall 3105 having a central opening 3110. The channel may comprise one or more side walls 3115 extending from a top end 3120 of the channel to a bottom end 3125 of the channel. The bottom wall 3105 can extend over the bottom end of the channel. The central opening 3110 can have an area that is smaller than the cross-sectional area of the channel at the bottom end. Light 3150a entering the channel at a large angle outside the predetermined range of allowable angles can hit an internal surface of the bottom wall, such that the light is reflected back away from the bottom end and does not exit the channel through the central opening. Alternatively, light 3150b entering the channel at an angle outside the predetermined range can be reflected one or more times from the side wall of the channel and subsequently exit the channel through the central opening of the bottom wall, or be reflected back from an internal surface of the bottom wall.

The performance characteristics of the channel comprising the bottom wall can depend on the ratio between the cross-sectional area of the channel and the area of the central opening. Large ratios, corresponding to relatively larger areas of the bottom wall that can block light traveling towards the bottom end of the channel, can allow a smaller range of angles of light to pass through the channel. In exemplary configurations, the ratio between the cross-sectional area of the channel and the area of the central opening can be in a range from about 1.1 to about 1.5, in a range from about 1.2 to about 1.4, or about 1.3. In one exemplary configuration, a channel may have an internal diameter of about 576 um, and a center opening with a diameter of about 500 um, corresponding to a ratio of about 1.33 between the cross-section area of the channel and the area of the central opening. In some configurations, the cross-sectional area of the channel may be increased by reducing the thickness of the channel side walls.

Angle Limiting Layer

Alternatively to or in combination with one or more of the configurations discussed in reference to FIGS. 29A-31, the spectrometer may further comprise an angle limiting layer configured to restrict the angles of light allowed to pass from the diffuser towards the filter array.

Figure 32A:
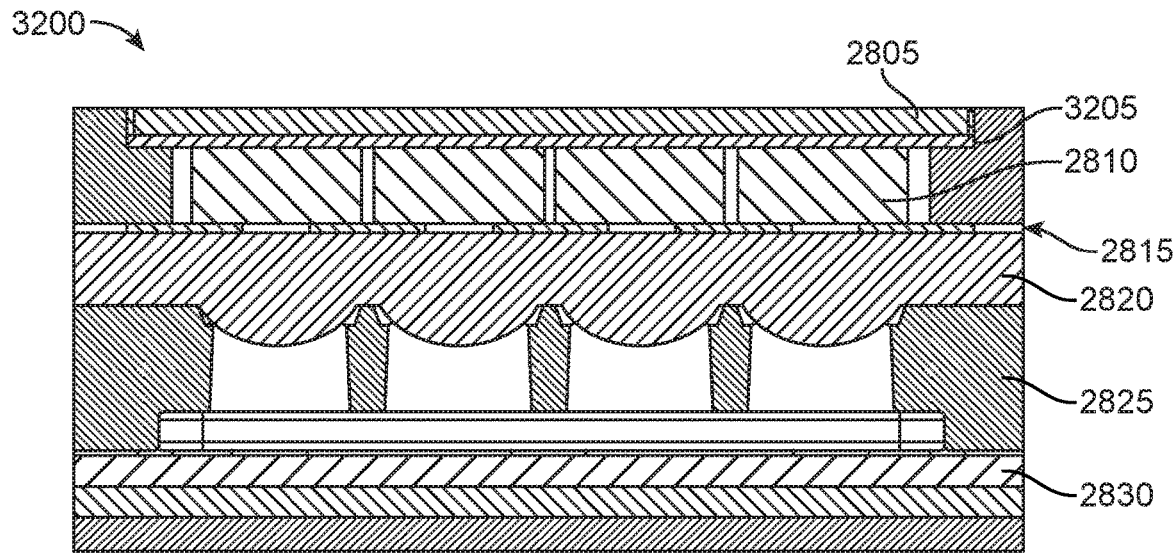
FIG. 32A illustrates an exemplary configuration of an optical stack comprising an angle limiting layer.

FIG. 32A illustrates an exemplary configuration of an optical stack 3200 comprising an angle limiting layer 3205. Optical stack 3200 comprises a diffuser 2805, filter array 2810, aperture array 2815, lens array 2820, support array 2825, and image sensor 2830 as described in reference to FIG. 28. The optical stack 3200 further comprises the angle limiting layer 3205, which may be disposed between the diffuser and the filter array as shown in FIG. 32A. The angle limiting layer may be configured in one of many ways to selectively allow light having an angle of incidence within a predetermined range to pass through the layer.

Figure 32B:
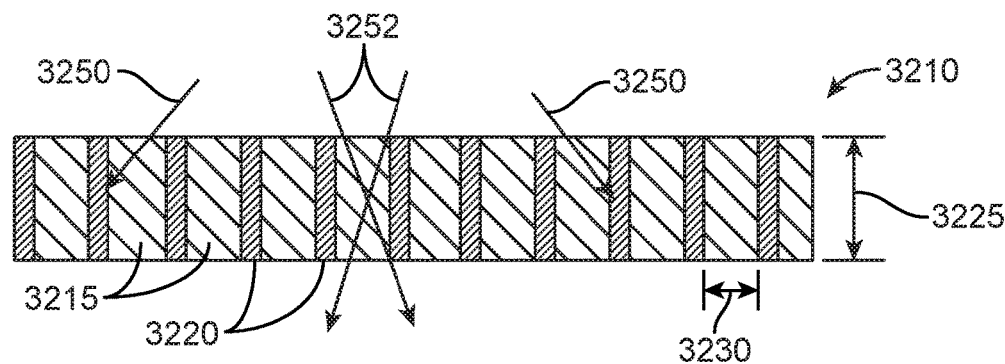
FIG. 32B schematically illustrates an exemplary angle limiting layer comprising a micro-louver film.

FIG. 32B schematically illustrates an exemplary angle limiting layer comprising a micro-louver film 3210. The micro-louver film 3210, having a thickness 3225, may comprise a plurality of light transmissive sections 3215 and a plurality of light blocking sections ("louvers") 3220, arranged alternatingly along a length of the micro-louver film. Adjacent light blocking sections or louvers may be separated by a distance 3230. The light transmissive sections can allow light to pass therethrough, while the light blocking sections can substantially absorb incident light. Light 3250 entering a light transmissive section of the micro-louver film at a large angle outside of the predetermined range of allowable angles can hit a light blocking section before exiting the micro-louver film, wherein the majority of the light may be absorbed by the light blocking section. Light 3252 entering a light transmissive section at an angle within the predetermined allowable range can exit the micro-louver film without hitting a light blocking section, thereby passing through to the filter array.

The maximum angle of incidence of light allowed to pass through the micro-louver film may be calculated using the following equation:

$$\alpha = \tan^{-1}\frac{D}{T}$$

wherein α is the maximum angle of incidence of light allowed to pass, D is the distance between adjacent light blocking sections, and T is the effective thickness of the micro-louver film, or the free-space thickness divided by the index of refraction of the film. Thus, the maximum allowed angle of incidence may be controlled by adjusting one or more of the thickness of the micro-louver film and the distance between adjacent light blocking sections. For example, to achieve a maximum allowed angle of incidence of 40°, assuming the light transmissive sections of the micro-louver film have an average index of refraction of about 1.3, the micro-louver film can be arranged to have a thickness of about 500 um, and a distance between adjacent light blocking sections of about 322 um. In many cases, the predetermined range for the angles of incidence of input light allowed to pass through the micro-louver film can be from about −40° to about 40° with respect to the normal to the plane of the optical stack. Depending on the specific configuration of the optical stack, the predetermined range can be increased to a wider range (e.g., from about −50° to about 50°), or decreased to narrower range (e.g., from about −30° to about 30°). An example of a commercially available micro-louver film suitable for incorporation with a spectrometer as described herein may be found on the Internet, for example, at http://multimedia.3m.com/mws/media/793096P/3mtm-privacy-filter-alcf-p-abr0-film-data-sheet.pdf?fn=ALCF-P_ABR0_Control_Film_DS.pdf (3M Advanced Light Control Film).

Figure 32C:
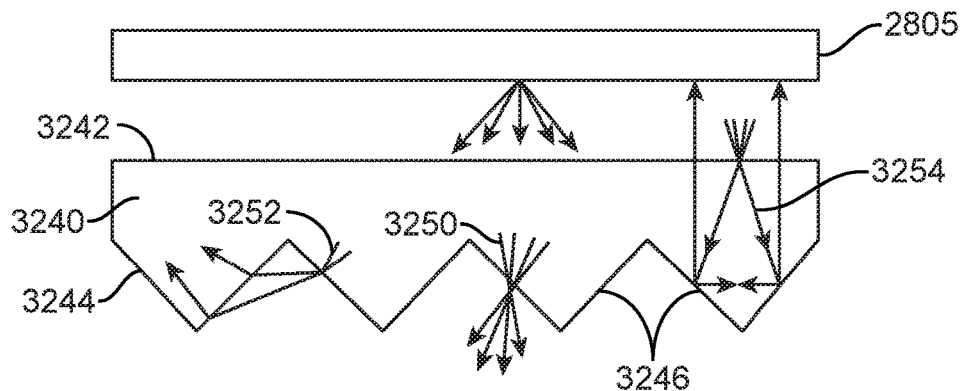
FIG. 32C schematically illustrates another exemplary angle limiting layer comprising a prism film.

FIG. 32C schematically illustrates another exemplary angle limiting layer comprising a prism film 3240. The prism film may comprise an input surface 3242 configured to receive light from the diffuser 2805 and an output surface 3244 configured to output the light transmitted through prism film. The output surface may comprise a plurality of microstructures 3246, such as engineered microstructures on a polymeric film. The plurality of microstructures may comprise a plurality of pyramid shaped structures, as shown in FIG. 32C. The plurality of microstructures can be configured to guide the light entering the prism film at large angles to exit from the film at a smaller angle span. As light 3250 that has entered the prism film at a large angle exits through the microstructures, the angle of transmission of the output light can be modified by the microstructures, such that the output light selectively comprises light having an angle of incidence within a predetermined range of acceptable angles (e.g., −40° to 40° with respect to the normal to the plane of the prism film). At least some of the light that enters the prism film at an angle of incidence outside the predetermined acceptable range may be redirected or reflected, enabling reuse of the light and thereby helping to improve the efficiency of the spectrometer. For example, as shown in FIG. 32C, light 3252 reaching a surface of a microstructure at a large angle may be redirected by the microstructure into an adjacent microstructure. Light 3254 reaching a surface of a microstructure at a large angle may be reflected from the microstructure surface back towards the diffuser 2805, wherein the light may be diffusively recycled and fed back into the prism film.

To control the maximum angle of incidence of light allowed to pass through the prism film, one or more of the thickness of the film, the angle between adjacent microstructures, and the pitch of each microstructure may be adjusted. For example, for a maximum angle of incidence of about 35° with respect to the normal to the plane of the prism film, the prism film may be configured to have a thickness of about 62 um, an angle of about 90° between adjacent microstructures, and a pitch of about 24 um for each microstructure. To achieve better uniformity, the pitch of each microstructure may be minimized. An example of a commercially available prism suitable for incorporation with a spectrometer as described herein may be found on the Internet, for example, at http://multimedia.3 m.com/mws/media/1574080/vikuiti-tm-t-bef.pdf?fn=T-BEF.pdf (3M Vikuiti™ Thin Brightness Enhancement Film).

Control of Input Light Entering Spectrometer Module

In embodiments of the spectrometer comprising an integrated illumination module, light generated by the illumination module and directed towards the sample is generally reflected back from the sample towards the spectrometer in a known, limited range of angles of reflection. Accordingly, light that reaches the spectrometer module or optical stack of the spectrometer at angles that are outside the known range of angles of reflection for the illumination light may be assumed to have originated from sources other than the illumination module (e.g., ambient light, stray light), and may be prevented from entering the optical stack in order to improve the spectral resolution of sample light by the spectrometer. For example, an optical shading configured to block the undesired angles of light may be incorporated into the spectrometer. Alternatively or additionally, a micro-louver film or a prism film as described herein may be incorporated into the spectrometer. For example, referring again to the spectrometer module 160 shown in FIG. 7, the angle-limiting film can be disposed between the sample and the first diffuser 164, so as to limit the angles of input light that enter the optical stack. The angle-limiting film may be oriented such that the film maximally transmits the desired range of angles. For example, in cases wherein the desired range of angles are not centered about the normal to the spectrometer front face or plane of the optical stack, a special micro-louver film may be used in which the louvers or light blocking sections are tilted at an angle that substantially matches the angle of the axis about which the desired range of angles is centered.

The methods and apparatus disclosed herein can be incorporated with components from spectrometers known in the art, such as spectrometers described in U.S. Pat. Nos. 8,284,401, 7,236,243, U.S. Publication No. 2015/0036138, U.S. Pat. No. 9,060,113, and U.S. Publication No. 2014/0061486, the entire disclosures of which are incorporated herein by reference.

Although the detailed description contains many specifics, these should not be construed as limiting the scope of the disclosure but merely as illustrating different examples and aspects of the present disclosure. It should be appreciated that the scope of the disclosure includes other embodiments not discussed in detail above. Various other modifications, changes and variations which will be apparent to those skilled in the art may be made in the arrangement, operation and details of the method and apparatus of the present disclosure provided herein without departing from the spirit and scope of the invention as described herein.

While preferred embodiments of the present disclosure have been shown and described herein, it will be obvious to those skilled in the art that such embodiments are provided by way of example only. Numerous variations, changes, and substitutions will be apparent to those skilled in the art without departing from the scope of the present disclosure. It should be understood that various alternatives to the embodiments of the present disclosure described herein may be employed without departing from the scope of the present invention. Therefore, the scope of the present invention shall be defined solely by the scope of the appended claims and the equivalents thereof.

What is claimed is:

1. An apparatus to measure spectra of a sample, comprising:
   a lens array comprising a plurality of lenses, the lens array configured to receive light from the sample;
   an image sensor comprising a plurality of sensor areas, the image sensor configured to receive light transmitted through the lens array;
   a support array disposed between the lens array and the image sensor, the support array comprising a plurality of channels configured to optically isolate light within each channel;
   wherein each channel comprises a first opening facing the lens array, a second opening facing the image sensor, and a channel wall extending between the first opening and the second opening, and
   wherein the channel wall of each channel is disposed between a lens of the lens array and a sensor area of the image sensor, such that light exiting from the second opening of each channel forms a pattern of light on each sensor area that substantially matches the size and shape of the second opening of the channel,
   wherein the channel wall of a channel from the plurality of channels does not extend all the way to the image sensor.

2. An apparatus as in claim 1, wherein the light exiting from the second opening of each channel forms a pattern of light on each corresponding sensor area that does not overlap with adjacent patterns of light formed on adjacent sensor areas.

3. An apparatus as in claim 1, wherein the first opening of a channel has a round shape to provide an aperture stop at a corresponding lens of the lens array.

4. An apparatus as in claim 1, further comprising an aperture array comprising a first aperture array layer and a second aperture array layer, wherein the lens array is disposed between the aperture array and the support array.

5. An apparatus as in claim 1, wherein a side wall of a channel from among the plurality of channels is configured to reduce an intensity of light by at least about 90% after a single reflection of the light from the side wall.

6. An apparatus as in claim 1, wherein the image sensor is further configured to demodulate a signal generated from light transmitted through the lens array.

7. An apparatus to measure spectra of a sample, comprising:
   a lens array comprising a plurality of lenses, the lens array configured to receive light from the sample;
   an image sensor comprising a plurality of sensor areas, the image sensor configured to receive light transmitted through the lens array;
   a support array disposed between the lens array and the image sensor, the support array comprising a plurality of channels configured to optically isolate light within each channel;

wherein each channel comprises a first opening facing the lens array, a second opening facing the image sensor, and a channel wall extending between the first opening and the second opening, and wherein the channel wall of each channel is disposed between a lens of the lens array and a sensor area of the image sensor, such that light exiting from the second opening of each channel forms a pattern of light on each sensor area that substantially matches the size and shape of the second opening of the channel, wherein the light exiting from the second opening of each channel forms a pattern of light on each corresponding sensor area that substantially overlaps with adjacent patterns of light formed on adjacent sensor areas.

8. An apparatus as in claim 7, wherein the channel wall of a channel from the plurality of channels extends from the lens of the lens array to the sensor area of the image sensor.

9. An apparatus as in claim 7, wherein the channel wall of a channel from the plurality of channels does not extend all the way to the image sensor.

10. An apparatus as in claim 7, further comprising an aperture array comprising a first aperture array layer and a second aperture array layer, wherein the lens array is disposed between the aperture array and the support array.

11. An apparatus as in claim 7, wherein the image sensor is further configured to demodulate a signal generated from light transmitted through the lens array.

12. An apparatus to measure spectra of a sample, comprising:
- a lens array comprising a plurality of lenses, the lens array configured to receive light from the sample;
- an image sensor comprising a plurality of sensor areas, the image sensor configured to receive light transmitted through the lens array;
- a support array disposed between the lens array and the image sensor, the support array comprising a plurality of channels configured to optically isolate light within each channel;
- wherein each channel comprises a first opening facing the lens array, a second opening facing the image sensor, and a channel wall extending between the first opening and the second opening, and
- wherein the channel wall of each channel is disposed between a lens of the lens array and a sensor area of the image sensor, such that light exiting from the second opening of each channel forms a pattern of light on each sensor area that substantially matches the size and shape of the second opening of the channel,
- wherein the image sensor is further configured to demodulate a signal generated from light transmitted through the lens array.

13. An apparatus as in claim 12, wherein the light exiting from the second opening of each channel forms a pattern of light on each corresponding sensor area that does not overlap with adjacent patterns of light formed on adjacent sensor areas.

14. An apparatus as in claim 12, further comprising an aperture array comprising a first aperture array layer and a second aperture array layer, wherein the lens array is disposed between the aperture array and the support array.

15. An apparatus as in claim 12, wherein a first channel from among the plurality of channels is offset from a second channel from among the plurality of channels by at least 3 degrees.

* * * * *